United States Patent
Watanabe et al.

(10) Patent No.: US 9,794,546 B2
(45) Date of Patent: Oct. 17, 2017

(54) VIDEO DISPLAY DEVICE

(75) Inventors: Tatsumi Watanabe, Osaka (JP);
Nobuyuki Kunieda, Osaka (JP); Ken Mashitani, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 855 days.

(21) Appl. No.: 14/112,415

(22) PCT Filed: Oct. 26, 2011

(86) PCT No.: PCT/JP2011/005994
§ 371 (c)(1),
(2), (4) Date: Oct. 17, 2013

(87) PCT Pub. No.: WO2012/147140
PCT Pub. Date: Nov. 1, 2012

(65) Prior Publication Data
US 2014/0036047 A1 Feb. 6, 2014

(30) Foreign Application Priority Data

Apr. 28, 2011 (JP) ................................. 2011-102300

(51) Int. Cl.
*H04N 13/04* (2006.01)
*H04N 13/02* (2006.01)
(Continued)

(52) U.S. Cl.
CPC ..... *H04N 13/0409* (2013.01); *G02B 27/2214* (2013.01); *H04N 13/0037* (2013.01);
(Continued)

(58) Field of Classification Search
CPC .......... H04N 13/0497; H04N 13/0239; H04N 13/0037; H04N 13/0055
See application file for complete search history.

(56) References Cited

U.S. PATENT DOCUMENTS 6,055,013 A * 4/2000 Woodgate .......... G02B 27/0093
348/59
7,268,943 B2 9/2007 Lee
(Continued)

FOREIGN PATENT DOCUMENTS

EP 2 312 375 A1 4/2011
JP 2005-045821 2/2005
(Continued)

OTHER PUBLICATIONS

International Search Report issued Feb. 7, 2012 in corresponding International Application No. PCT/JP2011/005994.
(Continued)

*Primary Examiner* — Shawn An
(74) *Attorney, Agent, or Firm* — Wenderoth, Lind & Ponack, L.L.P.

(57) ABSTRACT

A video processing device is provided, in which the crosstalk is prevented from increasing while the Moiré pattern is diminished. A video display device displays multiple-parallax video using a parallax barrier method, the video display device comprising: a display unit displaying pixel columns of a given image and pixel columns of one or more parallax images corresponding to the given image, all of the pixel columns being arranged in predetermined order; and a parallax barrier arranged at a predetermined distance from an image display face of the display unit, and having a plurality of elongated passing regions passing light rays from the display unit, wherein at least one of the passing regions has a waveform formed at a longitudinal edge thereof, and at least one waveform includes two wave units that differ in terms of wave height or wave width.

14 Claims, 43 Drawing Sheets

(51) Int. Cl.
*H04N 13/00* (2006.01)
*G02B 27/22* (2006.01)

(52) U.S. Cl.
CPC ..... *H04N 13/0055* (2013.01); *H04N 13/0239* (2013.01); *H04N 13/0415* (2013.01); *H04N 13/0422* (2013.01); *H04N 13/0447* (2013.01); *H04N 13/0497* (2013.01)

(56) References Cited

U.S. PATENT DOCUMENTS

| 2005/0073472 | A1 | 4/2005 | Kim et al. |
| 2005/0117216 | A1* | 6/2005 | Lee .................. G02B 27/2214 359/464 |
| 2005/0280602 | A1 | 12/2005 | Tzschoppe et al. |
| 2011/0187832 | A1* | 8/2011 | Yoshida .................. A63F 13/02 348/46 |
| 2012/0249543 | A1* | 10/2012 | Hyodo ............... H04N 13/0418 345/419 |

FOREIGN PATENT DOCUMENTS

| JP | 2006-515934 | | 6/2006 | |
| JP | 2010-282098 | * | 12/2010 | ............ G02B 27/22 |
| WO | 2004/077839 | | 9/2004 | |
| WO | 2007/107347 | | 9/2007 | |
| WO | 2010/007787 | | 1/2010 | |

OTHER PUBLICATIONS

Goo Hamagishi et al., "Autostereoscopic 3D Displays using Image-Splitter Method", The Journal of the Institute of Image Information and Television Engineers, ISSN: 1342-6907, vol. 51, No. 7, 1997, pp. 1070-1078 (with English abstract).

Ken Mashitani et al., "Parallax Step-Barrier 3D Display", The Journal of The Institute of Image Information and Television Engineers, ISSN: 1342-6907, vol. 62, No. 4, 2008, pp. 608-610 (with English abstract).

Extended European Search Report issued Sep. 29, 2014 in corresponding European Application No. 11864329.5.

* cited by examiner

FIG.12
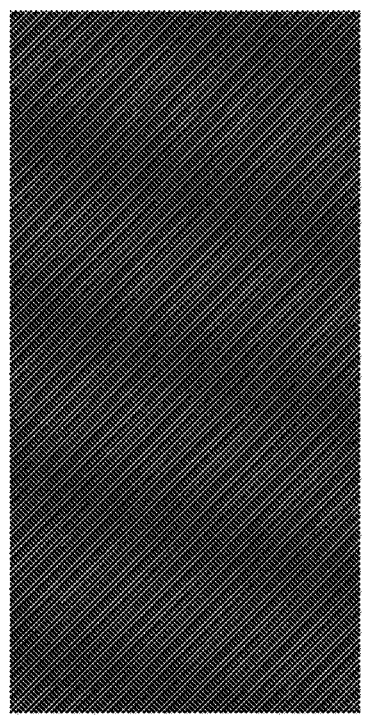
(a) Reference 1 (18.435° slant)
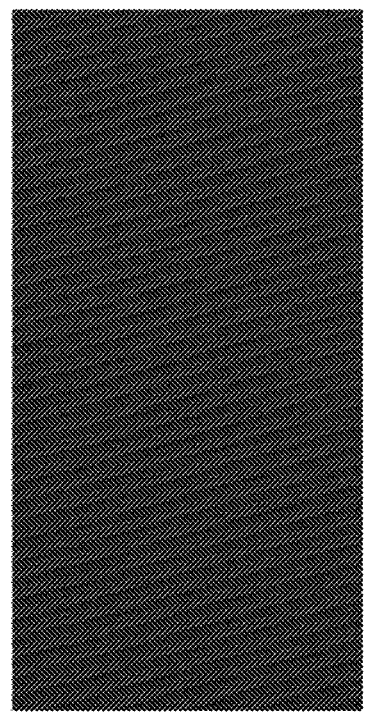
(b) Reference 2 (23° slant)

VIDEO DISPLAY DEVICE

TECHNICAL FIELD

The present invention relates to a video display device enabling naked-eye viewing of video that employs multiple-parallax viewing.

BACKGROUND ART

Conventionally, a device enabling naked-eye viewing of multiple-parallax video, such as stereoscopic video, involves a display device such as a liquid-crystal display panel (hereinafter, LCD panel) or a plasma display panel (hereinafter, PDP) having a parallax barrier, a lenticular lens, or the like (i.e., a spectral dispersion unit) disposed on a viewer-facing side thereof. Accordingly, light from left-view and right-view images displayed by the display device is split into left and right components to produce the stereoscopic images.

FIG. 38 illustrates the principles of a stereoscopic video display device using a parallax barrier without 3D glasses, as disclosed by Non-Patent Literature 1. As shown, a parallax barrier 2 is arranged to face a user 4 of a video display panel 1. The video display panel 1 has vertically-aligned left-view pixels L and likewise vertically-aligned right-view pixels R, disposed in alternating columns. Also, the parallax barrier 2 has vertically-oriented slit-shaped apertures 2a formed in plurality thereon, the apertures 2a being separated by screening portions 2b extending vertically between the apertures 2a. With the left-eye image arranged in the left-view pixels L and the right-eye image arranged in the right-view pixels R at an appropriate binocular disparity, the viewer perceives a single stereoscopic image. A viewer wishing to view the stereoscopic image having their head at a proper position (i.e., a forward viewing position) has left-view images 3L reach their left eye 4L via the apertures 2a, and has right-view images 3R reach their right eye 4R via the apertures 2a, such that the user perceives stereoscopic images. Here, the left eye 4L is prevented from seeing right-view image light by the screening portion 2b, and the right eye 4R is likewise prevented from seeing left-view image light by the screening portion 2b. Accordingly, the viewer 4 is able to view naked-eye stereoscopic video.

However, in such a stereoscopic video display device, an interference pattern (i.e., a Moiré pattern) is produced between a pattern of the parallax barrier 2 and a pixel pattern of the video display panel 1 in the plasma display device or the like. This Moiré pattern varies according to the shape and width of the apertures in the parallax barrier. Typically, a region termed a black matrix is arranged between each RGB sub-pixel in order to cancel any colour mixing. Such a region is present in LCD televisions and in PDPs. In addition to the black matrix between sub-pixels, auxiliary electrodes and the like are disposed over the sub-pixels. As such, the black matrix and auxiliary electrodes are visible through the slits in the parallax barrier and produce a difference in brightness between apertures having a higher or lower proportion of black matrix and auxiliary electrode portions visible therethrough. As a result, uneven screen brilliance (i.e., a Moiré pattern) is produced and greatly diminishes image quality.

FIGS. 39A and 39B illustrate examples of Moiré patterns perceived when the full screen of the display is white, with FIG. 39A showing a situation where the display screen has step barriers formed of slits in step form, and FIG. 39B showing a situation where the display screen has oblique slant barriers formed therein. Here, the horizontal width of the aperture slits is equivalent to the width of the sub-pixels (i.e., aperture ratio×1). For a step barrier as shown in FIG. 39A, the horizontal and vertical area of pixels visible through the step barrier slits and the ratio of combination thereof with black matrix portions varies according to viewing position, thus increasing the tendency of a lattice-like Moiré pattern being produced. For a slant barrier as shown in FIG. 39B, the variation in pixel area is smaller than the equivalent variation for the step barrier, regardless of the positional relationships involved. Thus, the Moiré pattern contrast tends to be less than occurs with the step barrier. Particularly, the Moiré pattern is less perceptible in the horizontal direction. However, the Moiré pattern is nevertheless present for both types of pattern, and causes perceptible reduction in image quality during 2D, rather than 3D, viewing. In order to eliminate the Moiré pattern during 3D display, Patent Literature 1 proposes a method of alternating, at a predetermined angle, between a first plate having a pattern formed at a first periodicity and a second plate having a pattern formed at a second periodicity. FIG. 40 schematically represents such an approach, indicating the barrier pattern being slanted by an angle within 20° to 30° relative to the pixels, in order to diminish the Moiré pattern.

Also, as shown in FIG. 41, a tooth-shaped vertical stripe pattern having a barrier pitch of ½ is disclosed (Patent Literature 2). In such a case, the pixels and the black matrix are greatly averaged out. Aside from this shape, FIG. 42 discloses zig-zag and curved patterns that are also applicable (Patent Literature 3).

CITATION LIST

Patent Literature

[Patent Literature 1]
United States Patent Application Publication No. 2005/0073472
[Patent Literature 2]
U.S. Pat. No. 7,268,943
[Patent Literature 3]
International Patent Application Publication No. 2010/007787

Non-Patent Literature

[Non-Patent Literature 1]
Autostereoscopic 3D Displays using Image-Splitter Method, Journal of the Institute of Image Information and Television Engineers, Vol. 51, No. 7, pp. 1070-1078, 1997

SUMMARY OF INVENTION

Technical Problem

Patent Literature 1 discusses a large slant, such as shown in FIG. 40, that enables the Moiré pattern to be made less obvious by constraining the change in pixel area visible from the viewing position. However, when the angle of the actual parallax barrier is slanted, neighbouring pixels are prone to becoming simultaneously visible through a common slit. As such, while this approach does decrease the Moiré pattern, the cross-talk is correspondingly increased.

Also, as described in Patent Literature 2, a parallax barrier as illustrated in FIG. 41 greatly evens out the pixels and the black matrix, but enlarges the average aperture ratio. This, in turn, intensifies video blur by increasing the cross-talk.

Furthermore, as disclosed in Patent Literature 3, a parallax barrier such as shown in FIG. 42 provides apertures with edges formed as elliptical arcs. Thus, mixing of neighbouring parallax pixels occurs, producing a relaxation of jump points. However, as in the above-described conventional technology, this tends to intensify image blur by increasing the cross-talk.

According to the above, decreasing the Moiré pattern contrast entails an increase in cross-talk. As such, a trade-off relationship is established between the Moiré pattern intensity and the amount of cross-talk. Improvements to one increase the problems in the other.

In consideration of the above, the present disclosure aims to provide a video processing device in which the cross-talk is prevented from increasing while the Moiré pattern is diminished.

Solution to Problem

In order to acheieve the above-stated aim, the present invention provides a video display device displaying multiple-parallax video using a parallax barrier method, the video display device comprising: a display unit displaying pixel columns of a given image and pixel columns of one or more parallax images corresponding to the given image, all of the pixel columns being arranged in predetermined order; and a parallax barrier arranged at a predetermined distance from an image display face of the display unit, and having a plurality of elongated passing regions passing light rays from the display unit, wherein at least one of the passing regions has a waveform formed at a longitudinal edge thereof, and at least one waveform includes two wave units that differ in terms of wave height or wave width.

Advantageous Effects of Invention

According to this configuration, the passing regions of a parallax barrier in a video processing device have two different waveforms that differ in width or in height. Thus, the width or the height of unit waves differ at positions of the passing regions appearing to be bright and dark, enabling adjustments to the pixels hidden by the unit waves. This enables the Moiré pattern to be reduced with no increase in cross-talk.

BRIEF DESCRIPTION OF DRAWINGS

FIG. 12A illustrates estimated data when the aperture slant is 18.435°, and

FIG. 12B illustrates estimated data when the aperture slant is 23°.

DESCRIPTION OF EMBODIMENTS

Embodiments of the present invention are described below with reference to the accompanying drawings.
1. Embodiment 1

Embodiment 1 describes a device with a barrier configuration having a barrier pattern with fine notches enabling periodic modification of lateral symmetry in the width of an aperture, so as to control the blurring and range of a pixel viewable through a waveform barrier having an aperture edge.

Figure 1:
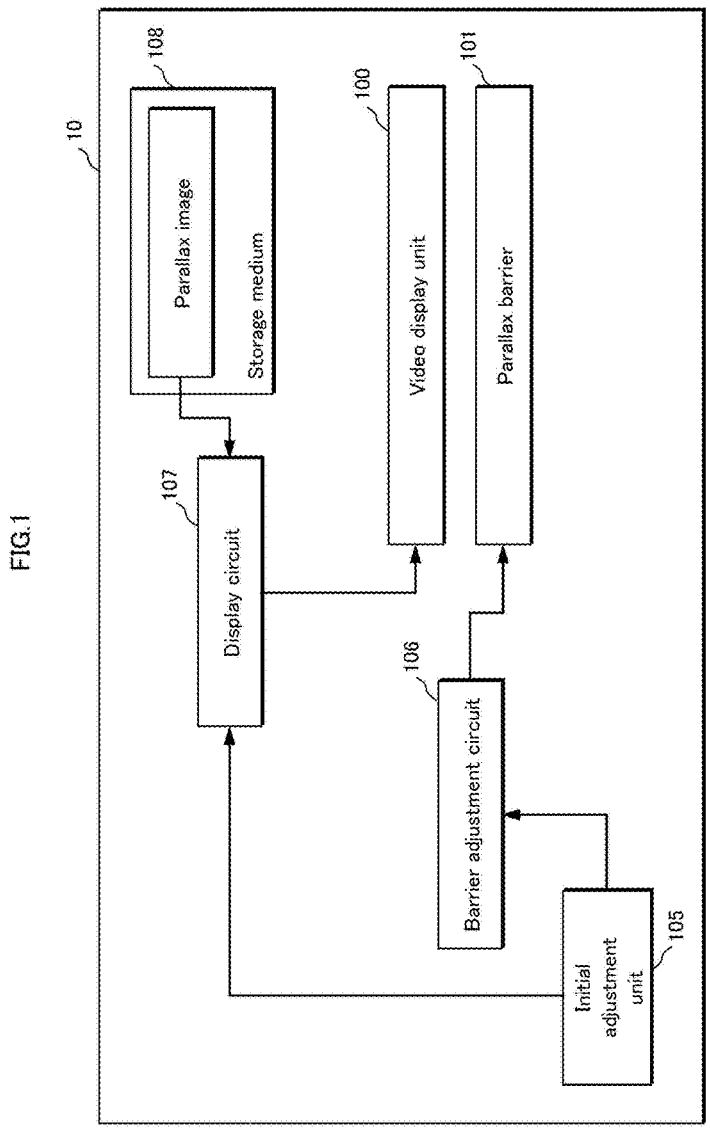
FIG. 1 is a block diagram illustrating the configuration of a video display device 10.
Figure 2:
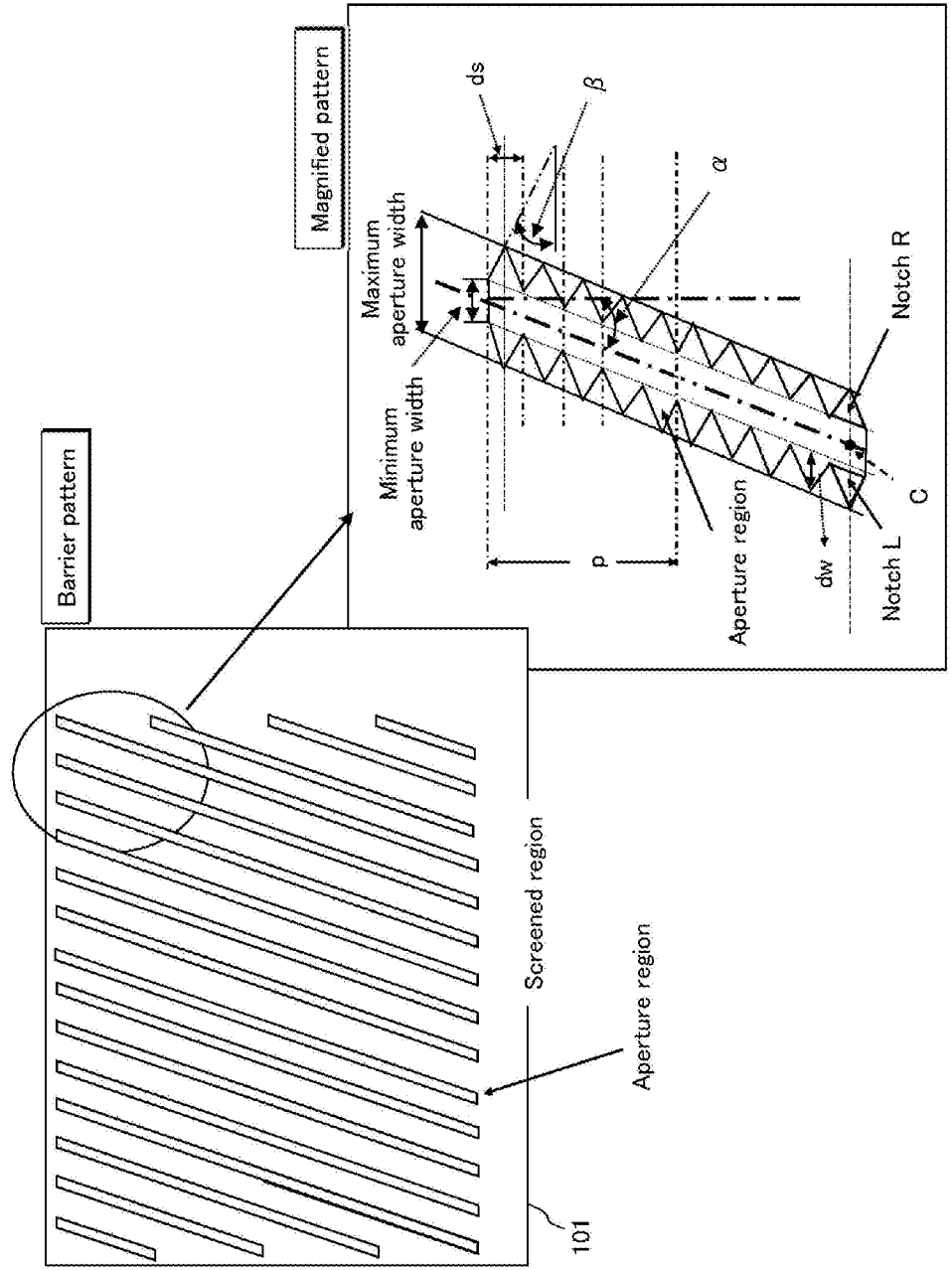
FIG. 2 illustrates an example of a barrier pattern for a parallax barrier 101.
Figure 3:
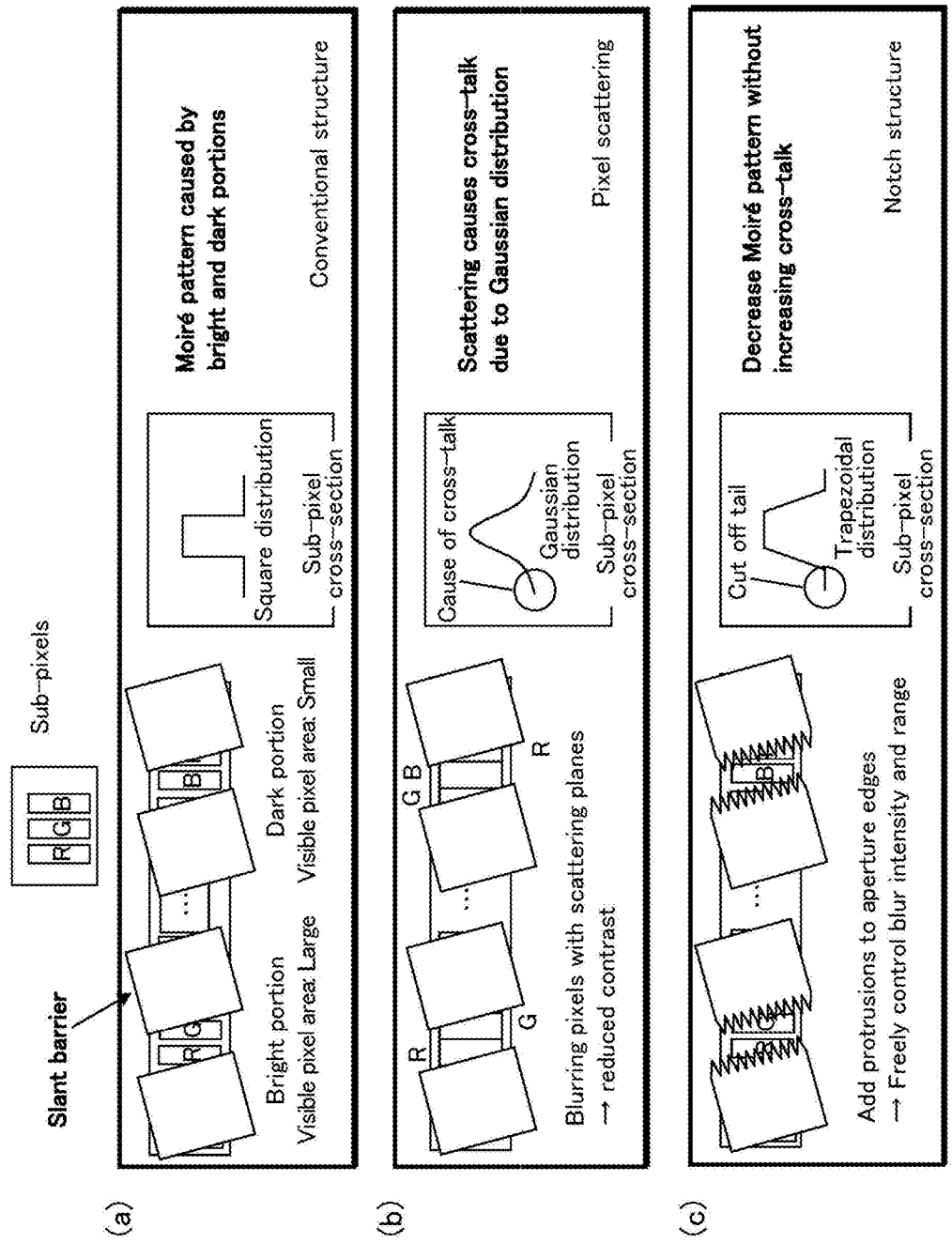
FIGS. 3A, 3B, and 3C illustrate overall effects of various barrier patterns.

FIG. 1 illustrates the configuration of a video display device 10 pertaining to the disclosure. Also, FIG. 2 schematically represents a magnified portion of a passing region formed in a barrier aperture, and FIGS. 3A, 3B, and 3C illustrate overall effects of having a waveform aperture edge. The video display device 10 is described with reference to the aforementioned drawings.
1.1 Video Display Device 10 Configuration As shown in FIG. 1, the video display device 10 includes a video display unit 100, a parallax barrier 101, an initial adjustment unit 105, a barrier adjustment circuit 106, a display circuit 107, and a storage medium 108.

The storage medium 108 stores a plurality of parallax composite images for stereoscopic display.

In order to perform stereoscopic display using the parallax barrier method, the video display unit 100 displays a two-dimensional parallax image (i.e., video for the left eye and video for the right eye) in which vertically-oriented columns of left-view pixels L and vertically-oriented columns of right-view pixels R are arranged in alternation.

In order to cause the video display unit 100 to display the video for the left eye and the video for the right eye, the display circuit 107 includes circuits respectively allocated to the left-view pixels in the video display unit 100 of the video for the left eye and to the right-view pixels in the video display unit 100 of the video for the right eye.

The parallax barrier 101 has a plurality of passing regions that allow light from the pixels of the video display unit 100 to pass, as well as a non-passing region. The parallax barrier 101 is disposed in front of a display screen of the video display unit 100 at a predetermined distance, and presents a parallax image to a viewer. The parallax barrier 101 may be a fixed parallax barrier generated from a thin film membrane or a high-transparency material (e.g., glass), or may be an active parallax barrier formed by a device (e.g., a thin-film transistor liquid crystal panel) that opens and closes (i.e., changes in optical transmittance) in response to voltage or the like.

The barrier adjustment circuit 106 is a circuit performing adjustments in terms of the distance between the video display unit 100 and the parallax barrier 101, of the parallax barrier 101 position (i.e., in the up, down, left, and right directions), and so on.

The initial adjustment unit 105 causes the display circuit 107 and the barrier adjustment circuit 106 to perform device adjustments (i.e., to colour, brightness, and so on) and parallax barrier adjustments (i.e., to distance, position, and so on) as instructed by a user when the viewer (i.e., the user) purchases and installs the video display device 10, and upon beginning the viewing of a video. For example, when an active parallax barrier is used, adjustments are performed to the pitch, width, and position of the parallax barrier with respect to a predetermined optimal viewing distance (i.e., realising control of aperture regions and screened regions in pixel or sub-pixel units). When a fixed parallax barrier is used, adjustments are performed to the distance between the parallax barrier 101 and the video display unit 100 and to the slant of the barrier, using a predetermined adjustment image.

The initial adjustment unit 105 also performs stereoscopic video visibility evaluation using a test image taken from an optimal viewing distance, and then performs tuning and the like on tone properties of the display circuit 107 while also adjusting the visibility and viewing fusion. In some circumstances, the degree of parallax within the parallax image (i.e., linear coefficient intensity control and horizontal shift adjustment) may also be adjusted.

Figure 39:
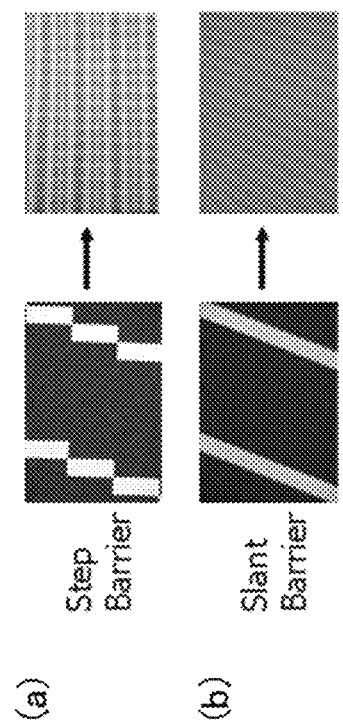
FIG. 39A illustrates an example of a Moiré pattern perceived when a step barrier is used.
FIG. 39B illustrates an example of a Moiré pattern perceived when a slant barrier is used.
Figure 40:
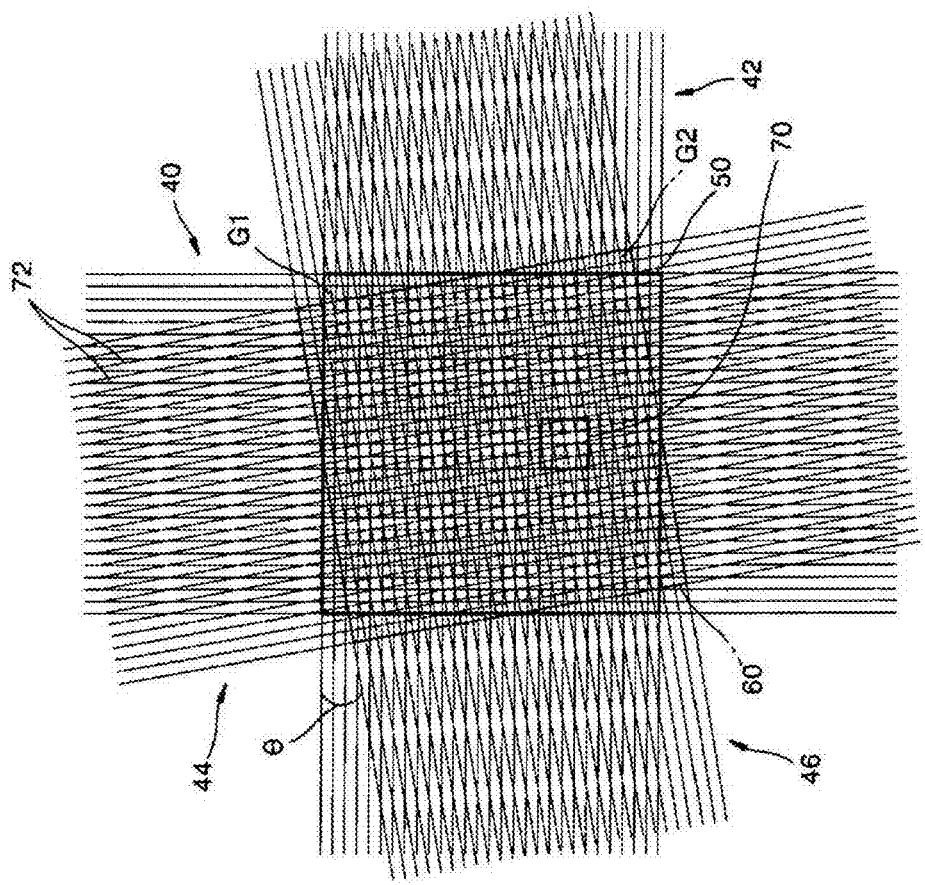
FIG. 40 illustrates a situation where a first plate having a pattern formed with a first period and second plate having a pattern formed with a second period intersect at a predetermined angle.
Figure 41:
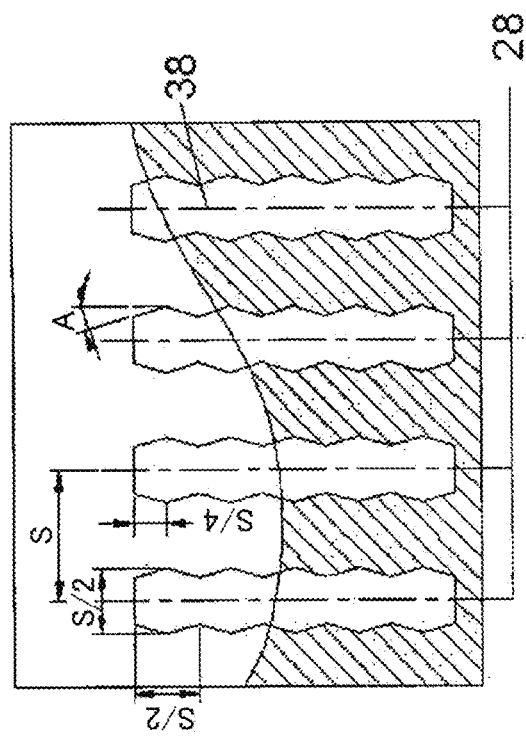
FIG. 41 illustrates a vertical stripe pattern having tooth-like shapes formed therein at ½ the barrier pitch.
Figure 42:
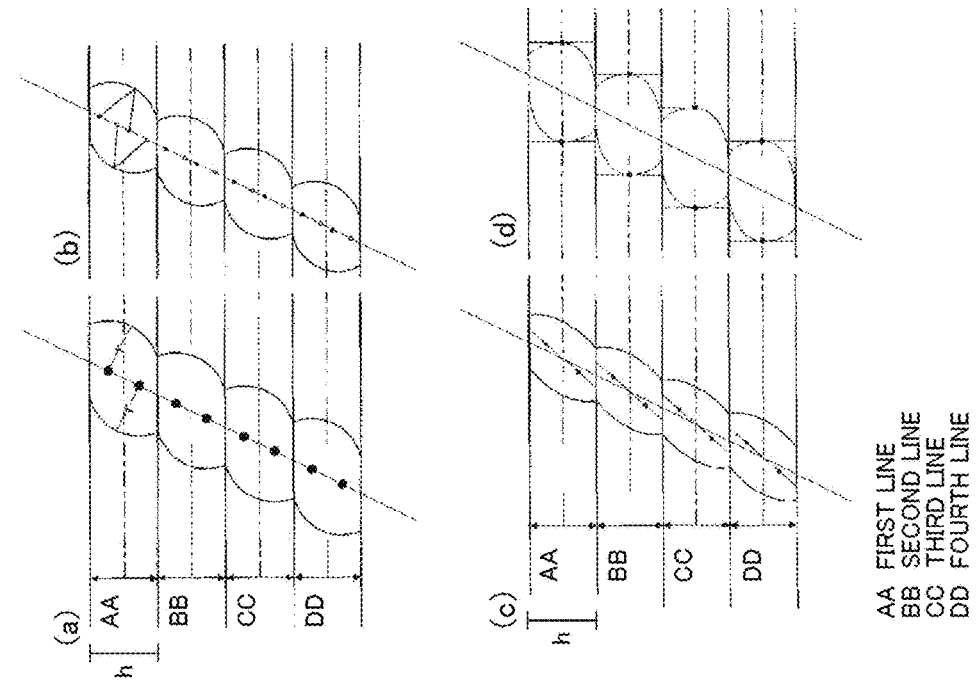
FIG. 42 illustrates situations where a curved pattern is used.

The parallax-adjusted image displayed by the video display unit is separated such that a predetermined parallax image is viewable at a predetermined position from the parallax barrier 101, and a stereoscopic video is viewable by having the left eye and the right eye each view a different parallax image according to the position of the viewer.
1.2 Parallax Barrier 101 Configuration The parallax barrier 101 is made up of a passing region that allows video to pass (i.e., an open portion) and a non-passing region (i.e., a screened portion). As shown in FIG. 39B, the open portion is a slant barrier disposed at a predetermined pitch and slanted diagonally. A step barrier configuration in which rectangular portions are disposed to suit the sub-pixel size is also applicable.

The inter-barrier pitch is determined geometrically according to the pixel pitch, the optimal viewing distance, the distance between the barrier and panel, and the parallax value. Typically, the size of the aperture (i.e., the width, given a horizontal parallax) is adjusted so as to diminish the Moiré pattern and achieve reduction of cross-talk and blurring that occur when neighbouring parallax images are mixed together. However, there is a trade-off between the Moiré pattern intensity and the amount of cross-talk, as described above. As such, improvements to one effect cause greater problems in the other effect.

The parallax barrier 101 has apertures shaped as shown in FIG. 2, producing a slant barrier configuration, and further shaped as a waveform with predetermined fineness. This enables the Moiré contrast to be reduced without increasing the cross-talk effect.

In FIG. 2, the waveform is depicted as having a triangular structure (hereinafter termed a notch structure) changing linearly and periodically between a maximum aperture width hmax and a minimum aperture width hmin, where slant barriers having the minimum aperture width are connected to form a continuous aperture. Triangular portions of opposing waveforms display point symmetry with respect to a point C along a central axis of the barrier (see notch R and notch L). As indicated in FIG. 2, this pattern is defined by four parameters, namely a slant angle α with respect to the vertically-oriented central axis of the barrier, a slant angle β with respect to a horizontal axis of the notch (i.e., triangular) structure, a notch width ds, and a notch height dw. The value of ds is expressible as ds=p/n, using the number of notch structure partitions n relative to the pixel pitch p. The notch structure width ds is given as a vertical width. However, the width may also be measured along a slant angle θ of the barrier pattern. In such a case, the notch structure width is a value resulting from dividing ds by cos θ. When a single pixel is formed by three sub-pixels R, G, and B, the value of p is expressible as p=3×sp, using the sub-pixel size sp. FIGS. 3A, 3B, and 3C show the overall effect of using the waveform. The video display device 10 is described with reference to this drawing. The notch structure height dw is, for example, given as follows (see Math. 1).

[Math. 1]

$$dw = 0.5 \times ds \times \left(\frac{1}{\tan\beta} + \tan\alpha\right) \quad \text{(Math. 1)}$$

Although FIGS. 3A, 3B, and 3C describe a slant barrier configuration, the same applies to a typical vertical stripe barrier configuration.

As shown in FIG. 3A, when a conventional stripe barrier is used, certain portions appear bright when the pixel surface area visible through the aperture is greater, and other portions appear dark when the pixel surface area visible through the aperture is smaller. Typically, the barrier pitch is a value slightly smaller than N multiples of a parallax value of the sub-pixel size, so as to collect the pixels of a predetermined parallax direction for the entire image at a predetermined optimal viewing distance. Thus, changes occur in the positional relationship of pixels visible through the barrier when viewed from a given viewing position. As such, the pattern of brightness and darkness seen in FIG. 3A is produced. This pattern is viewed as a Moiré pattern, and the intensity of the brightness and darkness therein is perceived as Moiré intensity.

In contrast, as shown in FIG. 3B, the effect of black matrix portions (a.k.a. rib portions) and auxiliary electrodes is reduced by blurring the bright and dark portions of light with a scattering plate or scattering film that scatters the light of these portions, and the Moiré pattern is made less noticeable by reducing the width of the bright and dark portions. However, scattering frequently has a modifying effect similar to that of a Gaussian distribution on the horizontal direction with respect to the centre of the aperture. This causes blurring and cross-talk to occur in the parallax image near the edges, and is not beneficial in terms of image quality.

Also, as shown in FIG. 3C, when the notch structure shown in FIG. 2 is shown, for example, the aperture edge is made into a waveform that increases the pixel area hidden by the notch structure at bright portions and increases the pixel area seen through the notch structure at dark portions, thus controlling the blur amount and range. That is, as shown by the sub-pixel cross-section of FIG. 3C, this adjustment produces a trapezoidal distribution in which both edges of the rectangular distribution from the sub-pixel cross-section shown in FIG. 3A have been cut off.

In such circumstances, these properties plausibly enable the effect discussed above when the notch structure width is rather narrow (beneficially, the period of the notch structure is rather large). However, the appropriate value for the notch structure width is dependent on the pixel configuration (particularly on the metal auxiliary electrodes vertically dividing the pixels, and other factors). For example, when one pixel is divided m times, the Moiré effect is decreased most intensely when the number of notch structure partitions n is in the vicinity of a natural number multiple k (where k>1) of m, in other words approximately n=k×m. Also, when the number of notch structure partitions n does not satisfy n=k×m and one pixel is divided m times, the number of notch structure partitions n beneficially has a value greater than or equal to nn=m+(m−1)+2, derived from the number of divisions m, the number of metal electrodes produced when the pixel is divided m−1, and from the number of black matrix portions, which is two. In other words, a value obtained from the number of repeating effective pixel portions producing a predetermined brightness of light and dark portions such as black matrix and metal electrodes producing no light, when viewed along the vertical direction, is beneficially used as the number of partitions n.

When such a notch structure is used, a ratio rH of aperture width relative to the sub-pixel size (i.e., aperture ratio), used as a baseline for cross-talk, varies along with the aperture width. Here, an average aperture ratio Ave_rH is defined within a predetermined range (e.g., a range of u pixels). Accordingly, considering the narrow notch structure properties, the stroke properties of an aperture having the notch structure have an aperture ratio identical to the average aperture ratio, being approximately the same as those of a slant barrier having a slant angle α with respect to the central axis of the barrier. Given the above, taking the average aperture ratio to be a predetermined value of ThAve_rH enables the cross-talk increase to be constrained to be as slow as possible while also averaging the visible pixel surface area by constraining the amount of blurring produced when the notch structure is used with the waveform configuration.

Although FIG. 2 shows a configuration where the waveform is formed using the notch structure, the waveform may also be formed trapezoidally, or formed of line segments that change into ovoid arcs, or formed of parallel quadrilaterals. Also, in the present Embodiment, a diagonal barrier configuration is described. However, the Embodiment is also applicable to a vertical stripe barrier. Also, the notch structure is not limited to having the horizontal orientation shown in FIG. 2. The notch structure may also be applied to the vertical direction relative to the central axis of the barrier.

Also, although the above example discusses a slant barrier, the present Embodiment is also applicable to a vertical stripe barrier or to a step barrier arranged in which rectangles of sub-pixel size are arranged diagonally.

Further, when the notch structure height dw is equal to the size p of one pixel, the aperture surface area dSn of the notch structure within one pixel, and the intra-pixel aperture surface area dSo of a slant barrier having the minimum aperture width hmin satisfy the following (see Math. 2).

[Math. 2]

$$dSn = dw \times p$$

$$dSo = h\min \times p \quad \text{(Math. 2)}$$

According to this formula, the aperture surface area given by S=dSo+dSn does not change, despite an increase in the number of divisions with one pixel.

1.3 Parallax Barrier 101 Manufacture

The parallax barrier 101 is made using a photo-mask that serves as the base plate for using transfer technology to transfer a circuit pattern or the like of lines and components during a manufacturing process thereof, such as a flat panel display or a printed circuit board as an example of the video display unit 100. In such circumstances, the material properties for the photo-mask are those of a hard mask that makes an opaque film portion of a thin film of chromium (or chromium oxide) on glass, or are those of an emulsion mask that makes an opaque film portion of a flexible, transparent molecular film or of blackened metallic silver on glass. When process rules of a high-precision process are used for glass, synthetic quartz glass is used instead of typical soda-lime glass. The screening pattern of the mask is created using optical technology. An opaque film of chromium or emulsion is formed by sputtering over an entire surface of a piece of glass polished to high smoothness, and rendering is performed by a ray of light passing over a photo resist applied thereto. The rendering device includes a laser rendering device and a beam exposure device that uses an electron beam. In such circumstances, the notch structure width and peak angle (i.e., height) are determined according to the beam width and pitch precision of the rendering device, e.g., must be greater than the beam width. The waveform portion of the notch structure must be equal to or greater than a predetermined angle in order to enable laser rendering at a plurality of locations. That is, the notch structure is generated so as to satisfy a minimum height and width that can be written with the laser width and pitch of the laser rendering device used for rendering.

Aside from these material qualities, a liquid crystal display panel or similar device in which liquid crystal is sandwiched between two panes of glass, or a device made from liquid crystal and a polarising plate, may be used for the parallax barrier portion. In such circumstances, given the advantage of being in an opaque state when voltage is applied and being in a transparent state when the voltage is zero, adjustment is made possible between a region that is freely changeable between a completely opaque state (optical transmittance: 0%) and a completely transparent state (optical transmittance: 100%), and a region in which the optical transmittance is freely controlled. When a device using voltage to control the transparency and opacity of the liquid crystal is used as the parallax barrier portion, the width, height, and so on of the notch structure are determined according to the resolution (i.e., the pixel pitch) of the liquid crystal panel and the Indium-tin oxide (hereinafter, ITO) used as the transparent electrode material, such that the notch structure must be greater than the resolution and precision thereof.

2. Embodiment 2

Embodiment 2 describes variable parameters added to Embodiment 1, such as a phase difference between leftward and rightward notch structures, gaps between notch structures, and maximum aperture width, these parameters expanding the scope of adjustment. A video display device 10A pertaining to Embodiment 2 estimates appropriate values for these parameters by comparing a Moiré pattern estimated from actual parameters used in notch structure realisation to a Moiré pattern obtained from a predetermined reference angle. The following explanations are provided with reference to FIGS. 4 through 12A and 12B.

2.1 Video Display Device 10A Configuration

Figure 4:
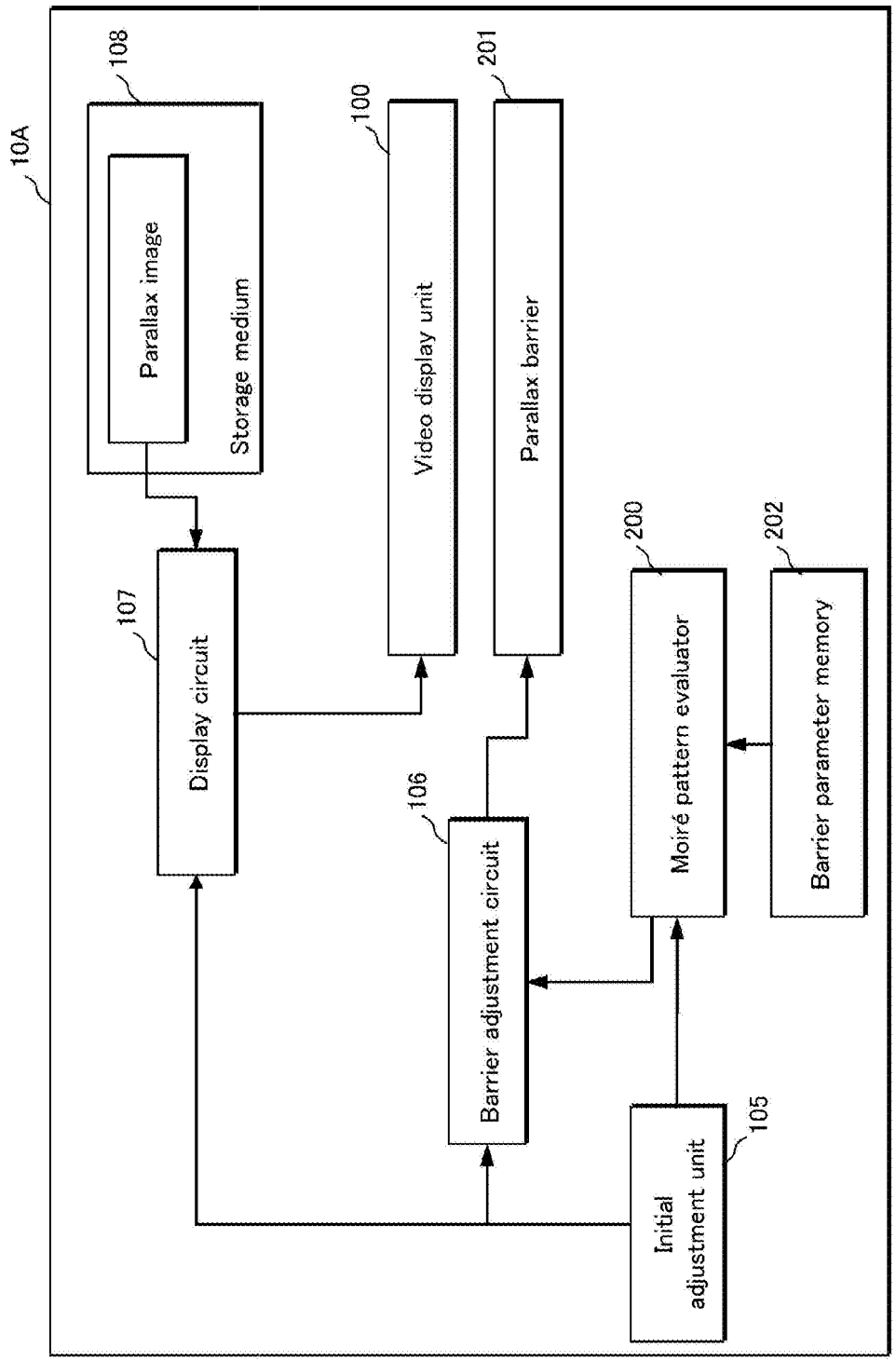
FIG. 4 is a block diagram illustrating the configuration of a video display device 10A.

FIG. 4 illustrates the configuration of a video display device 10A pertaining to the disclosure. Components identical to those of Embodiment 1 use the same reference signs, as explanations thereof are omitted.

As shown in FIG. 4, the video display device 10A includes the video display unit 100, the initial adjustment unit 105, the barrier adjustment circuit 106, the display circuit 107, the storage medium 108, a Moiré pattern evaluator 200, a parallax barrier 201, and a barrier parameter memory 202.

The parallax barrier 201 has a plurality of passing regions that allow light from the pixels of the video display unit 100 to pass, as well as a non-passing region. The parallax barrier 101 is disposed in front of a display screen of the video display unit 100 at a predetermined distance, and presents a parallax image to a viewer. The parallax barrier 201, like the parallax barrier 101 pertaining to Embodiment 1, may be a fixed parallax barrier generated from a thin film membrane or a high-transparency material (e.g., glass), or an active parallax barrier formed by a device (e.g., a thin-film transistor liquid crystal panel) that opens and closes (i.e., changes in optical transmittance) in response to voltage or the like. The configuration of the parallax barrier 201 is described later.

The Moiré pattern evaluator 200 makes a quantitative evaluation of appropriateness regarding a set of parameters, using a Moiré pattern estimated from parameters used to realise the notch structure.

The barrier parameter storage 202 stores n (where n is an integer greater than or equal to two) parameters. The barrier parameters are defined as described later.

First, the initial adjustment unit 105 adjusts the display device, the parallax barrier, and so on. The Moiré pattern evaluator 200 makes a stereoscopic image visibility evaluation using a test image at the optimal viewing distance. Then, the initial adjustment unit 105 makes adjustments by tuning the tone qualities in the display circuit 107, adjusting the barrier adjustment circuit 106, and so on, according to a degree of viewability, blur, and fusion. In some circumstances, the degree of parallax within the parallax image (i.e., linear coefficient intensity control and horizontal shift adjustment) may also be adjusted.

The functions of the initial adjustment unit 105 and the Moiré pattern evaluator 200 enable the video display device 10A to divide a composite parallax image displayed by the video display unit 100 such that a predetermined parallax image is viewable at a predetermined position with respect to the parallax barrier 201. Thus, a stereoscopic image is made viewable at the user's position by making different images viewable to the left eye and the right eye.

The components of the Moiré pattern evaluator 200 are described in detail below.

Figure 5:
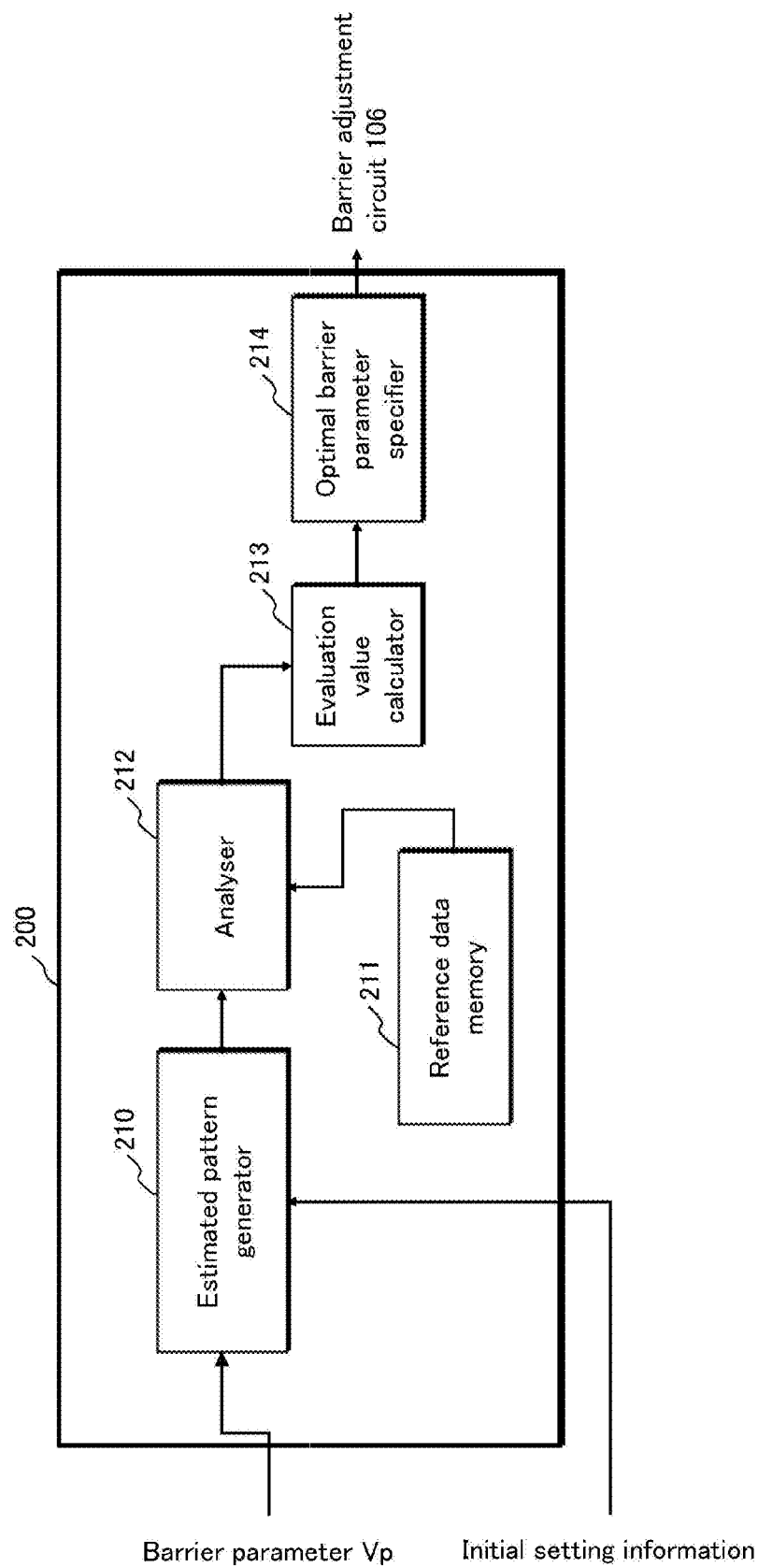
FIG. 5 is a block diagram illustrating the configuration of a Moiré pattern evaluator 200.

As shown in FIG. 5, the Moiré pattern evaluator 200 includes an estimated pattern generator 210, a reference data memory 211, an analyser 212, an evaluation value calculator 213, and an optimal barrier parameter specifier 214.

The estimated pattern generator 210 obtains initial setting information from the initial adjustment unit 105 and barrier parameters Vp from the barrier parameter storage 202, then generates a Moiré pattern that is estimated from the acquired data. The initial setting information includes a proper viewing distance dlen, a barrier-panel gap distance gap, a pixel size p, a sub-pixel size sp, and a view number num.

The reference data memory 211 stores two types of Moiré patterns. The first type has good parallax separation, low cross-talk, and a slant of 3:1 ($\alpha=18.435°$), and is a Moiré pattern obtained with a slant barrier having an aperture ratio rhth of 1.0 (hereinafter, first reference data). The second type indicates a Moiré pattern with a thin Moiré effect and a slant β (e.g., β=23°) obtained using a slant barrier having a aperture ratio rhth of 1.0 (hereinafter, second reference data).

The analyser 212 performs frequency analysis on the estimated Moiré pattern for each of the first and second reference data.

The evaluation value calculator 213 calculates an evaluation value for the pattern using the current barrier parameters, in accordance with the results of frequency analysis. The evaluation value calculator 213 calculates the evaluation value for each of the n barrier parameters.

The optimal barrier parameter specifier 214 specifies barrier parameters corresponding to a highest evaluation value, based on the evaluation values calculated by the evaluation value calculator 213 for the n barrier parameters. The specified barrier parameters are then output to the barrier adjustment circuit 106. Here, the barrier adjustment circuit 106 performs adjustments according to the barrier parameters received from the optimal barrier parameter specifier 214.

2.2 Parallax Barrier 201 Configuration

Figure 6:
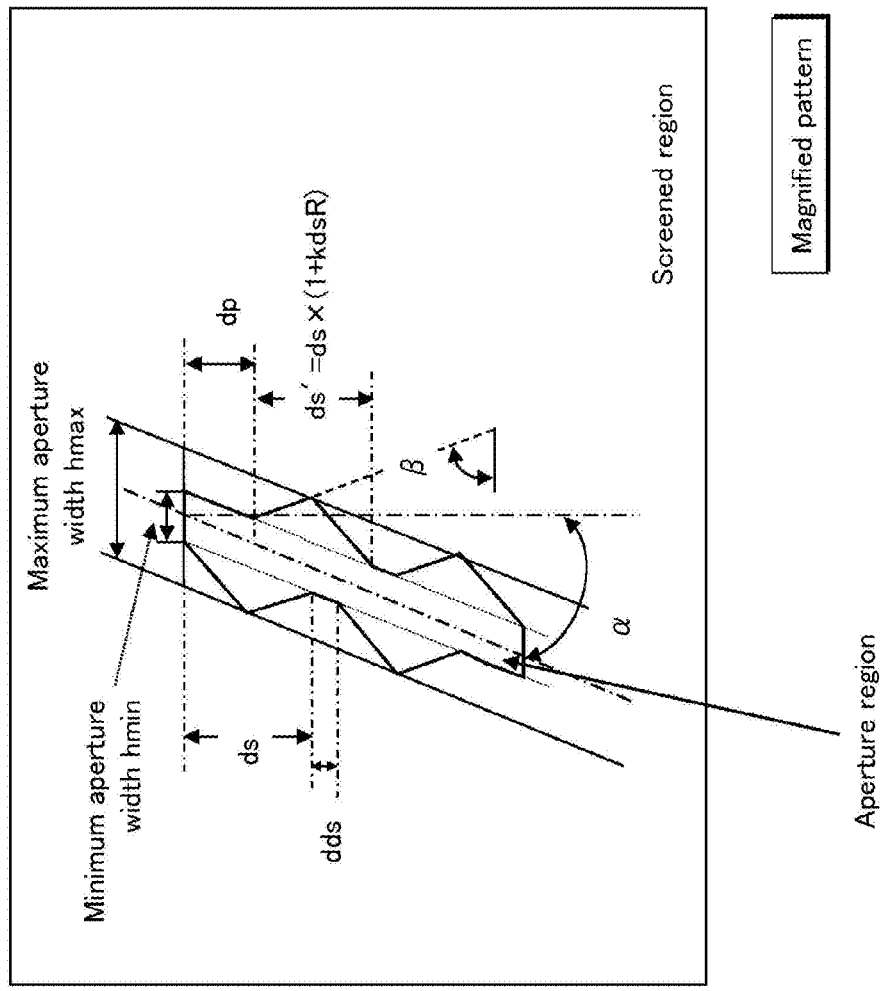
FIG. 6 is a magnified view of a portion of an aperture formed in a parallax barrier 201.

FIG. 6 is a magnified view of a portion of an aperture formed in parallax barrier 201.

Parallax barrier 201 is similar to parallax barrier 101 in being configured from an aperture portion and a screened portion. As shown in FIG. 6, the aperture portion is configured as a slant barrier with an oblique slant disposed at a predetermined pitch, or as a step barrier with a rectangular configuration suited to the sub-pixel size.

Parallax barrier 201 differs from Embodiment 1 in that a leftward and rightward notch structure phase difference dp, a notch structure gap dds, and a right-side notch structure height variability parameter kdsR have been added to the slant barrier configuration of Embodiment 1.

The effects of the parallax barrier 201 configuration used in Embodiment 2 are similar to those of Embodiment 1, such as the aperture edge being made into a waveform that increases the pixel area hidden by the notch structure at bright portions and increases the pixel area seen through the notch structure at dark portions, thus controlling the blur amount and range. The range of adjustment thereof is expanded.

Also, according to this configuration, barrier parameter evaluation and individual parameter adjustments are performed, taking into consideration a tolerable error margin determined in advance from manufacturing error occurring when the barrier pattern is manufactured. When a predetermined manufacturing error percentage err for a location prone to error, such as the minimum aperture width hmin, is taken into consideration. The Moiré pattern estimation then proceeds to add the manufacturing error to the estimated Moiré pattern, then the resulting barrier parameter estimation takes the manufacturing error into consideration.

2.3 Evaluation Value Calculation Operations

The following describes the evaluation values calculation operations of the Moiré pattern evaluator 200.

Figure 7:
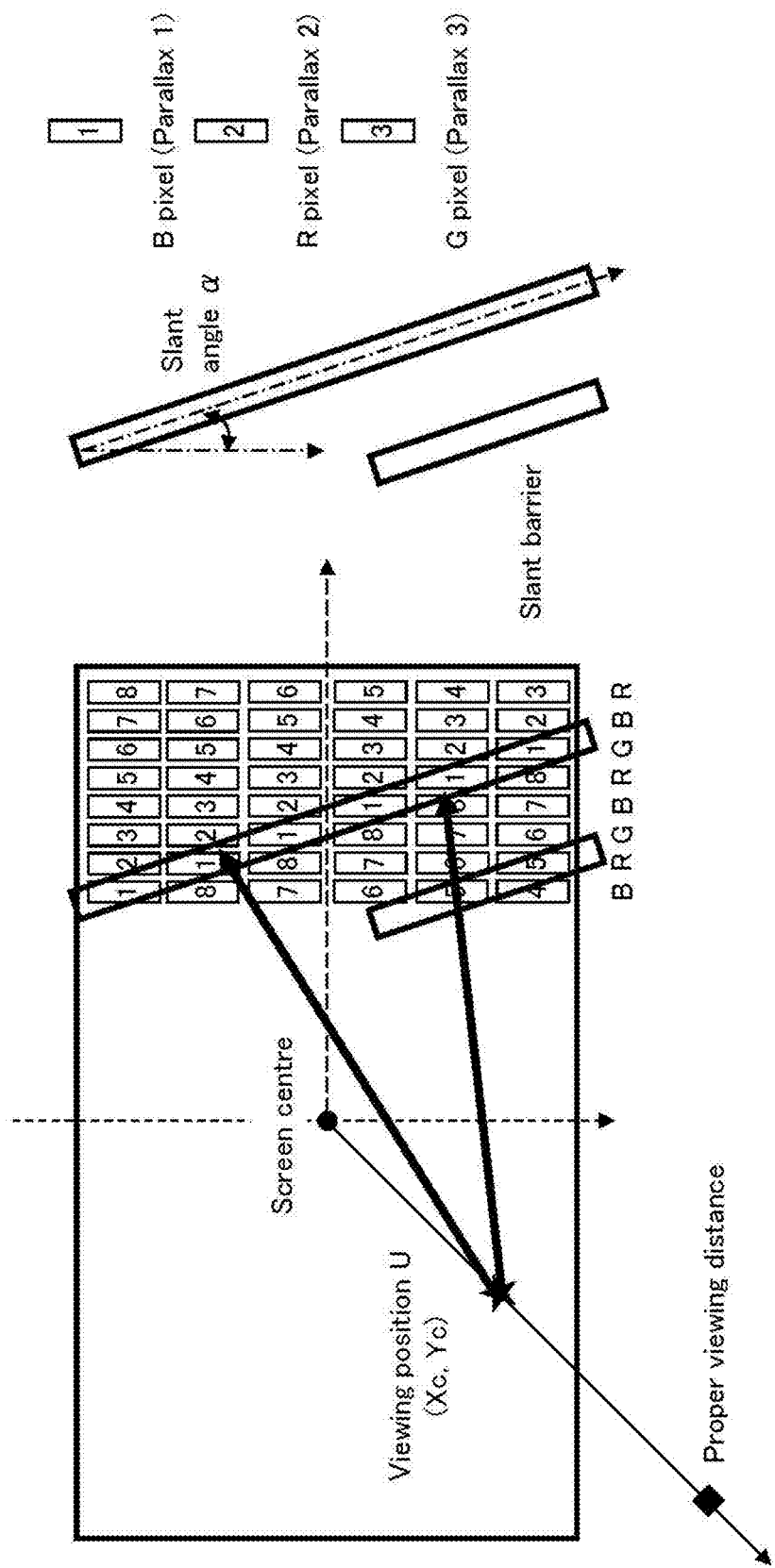
FIG. 7 illustrates the overall Moiré pattern estimation method performed by the Moiré pattern evaluator 200.

The estimated pattern generator 210 of the Moiré pattern evaluator 200 performs, for example, a Moiré pattern estimation for a viewing position U as shown in FIG. 7. FIG. 7 illustrates an example of a pixel arrangement for a slant barrier having a parallax of 8 and a slant of 3.1 ($\alpha$=18.435°).

The estimated pattern generator 210 performs an estimation of a Moiré pattern (i.e., the pattern of brightness and darkness) visible from predetermined viewing position U (Xc, Yc) using initial setting information with respect to the individual parameters Vp of the barrier pattern for the notch structure. Here, the parameters Vp are defined as the grouping of angles α and β, a number of divisions n, the maximum aperture width hmax, the minimum aperture width hmin, a phase difference dp, a gap dds, the notch structure height variability parameter kdsR, and the average aperture ratio Ave_rh. The ith (i being an integer no smaller than one and no greater than n) set of barrier parameters among the n barrier parameters is written as Vp[i]=(α[i], β[i], n[i], hmax[i], hmin[i], dp[i], dds[i], kdsR[i], Ave_rh[i]). A few parameters, such as Ave_rh[i]=Aveh0, α[i]=a0, and hmin[i]=hmin0 are constants with values fixed according to the panel pixel configuration and setting values. However, these parameters may also be variable. The maximum aperture width, i.e., the notch structure height dw, may be a variable such that, for example, a variable ratio kdw is added to the parameter.

The following describes the evaluation value calculation operations.

(1) Overall Process

Figure 8:
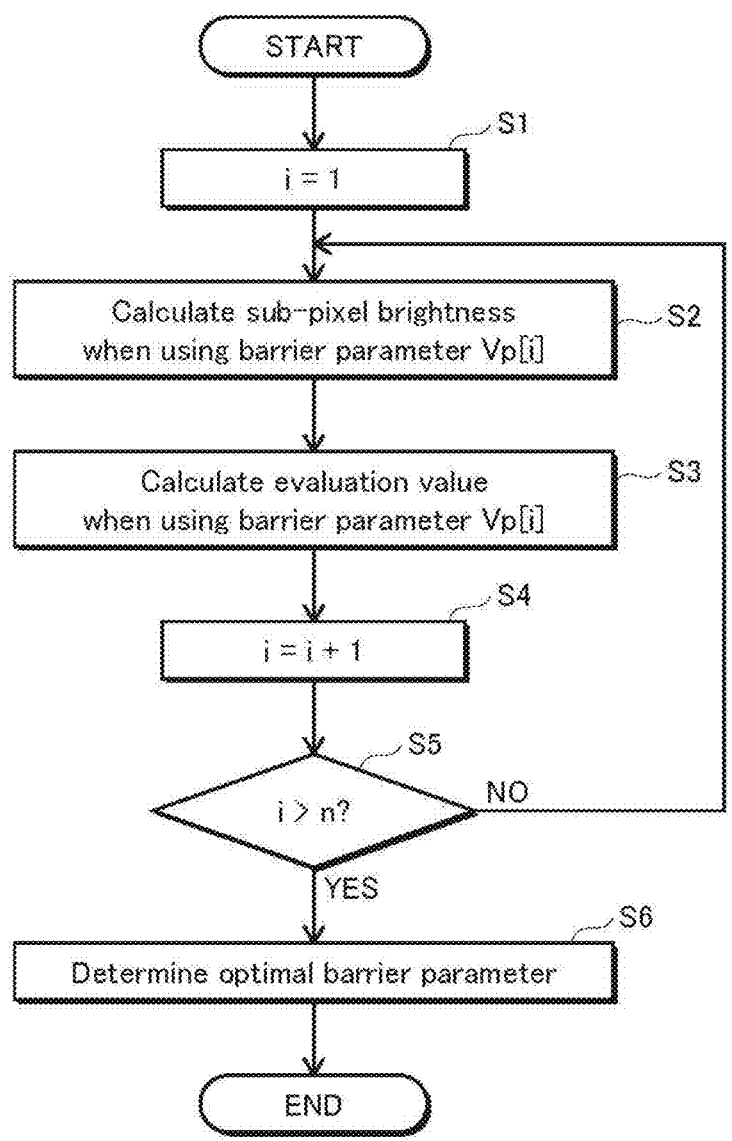
FIG. 8 is a flowchart indicating the overall process performed by the Moiré pattern evaluator 200.

FIG. 8 is a flowchart indicating the evaluation value calculation operations by the Moiré pattern evaluator 200.

The Moiré pattern evaluator 200 initialises the variable i (i=1) (step S1).

The Moiré pattern evaluator 200 calculates the sub-pixel brightness (Yval) when the barrier parameters Vp[i] are used (step S2).

The Moiré pattern evaluator 200 computes an evaluation value Eval[i] from the Moiré pattern estimated using barrier parameters Vp[i] according to the calculated brightness (step S3).

The Moiré pattern evaluator 200 adds one to the variable i (step 4). An evaluation is performed regarding whether or not the new value of i is greater than n, i.e., whether or not the process has been performed for all barrier parameters Vp (step S5).

In the affirmative case, i.e., when the process has been performed for all barrier parameters Vp (YES in step S5), the optimal barrier parameter specifier 214 of the Moiré pattern evaluator 200 specifies a barrier parameter corresponding to the optimal evaluated value based on all calculated evaluation values (step S6).

In the negative case, i.e., when the process has not yet been performed for all barrier parameters Vp (NO in step S5), the process returns to step S2.

(2) Sub-Pixel Brightness Calculation Process

Figure 9:
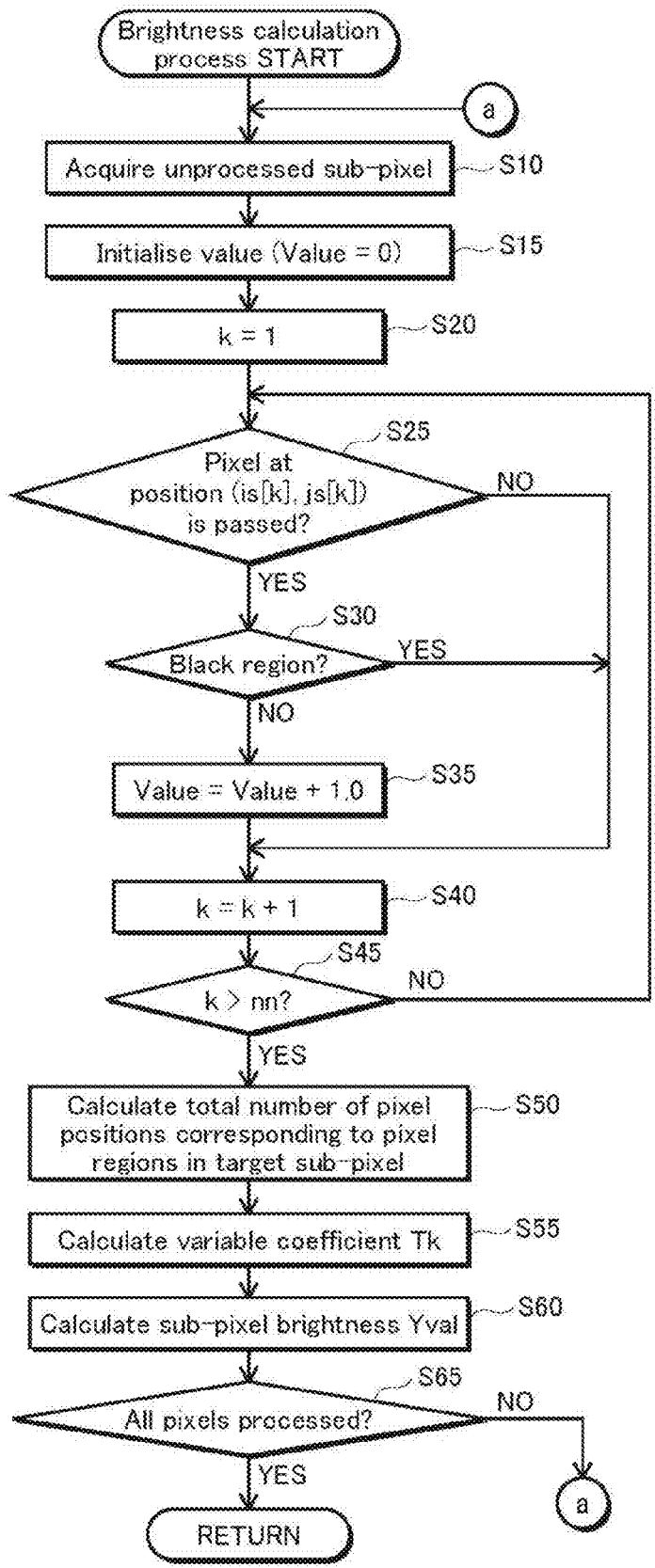
FIG. 9 is a flowchart indicating the brightness calculation process.

The following describes the processing from step S2 of FIG. 8, with reference to the flowchart of FIG. 9.

The sub-pixel brightness calculation process is performed on a sub-pixel position (i, j). The corresponding sub-pixel (i, j) has been sub-divided in advance. Then, during this process, the pixels from each sub-divided region (is[k], js[k], where k=1, . . . , nn) are used to calculate the surface area of the black portions (i.e., black matrix portions) and the surface area of the pixel portions in each sub-pixel.

The details of the process are as follows.

The estimated pattern generator 210 acquires an unprocessed sub-pixel (step S10). Here, the acquired sub-pixel is at sub-pixel position (i, j).

The estimated pattern generator 210 initialises the value (Value=0) (step S15) and substitutes a value of one for the variable k (step S20).

The estimated pattern generator 210 determines whether or not the pixel at pixel position (is[k], js[k]) is being passed through (step S25).

In the affirmative case (YES in step S25), the estimated pattern generator 210 determines whether or not the pixel position (is[k], js[k]) is a black region, i.e., a black matrix portion (step S30).

In the negative case (NO in step S30), the estimated pattern generator 210 adds 1.0 to the value (step S35) and then adds one to variable k (step S40). The estimated pattern generator 210 then determines whether or not the value of variable k is greater than the number of partitions nn (step S45).

In the affirmative case (YES in step S45), the estimated pattern generator 210 computes a total number of pixel positions corresponding to the pixel region of the sub-pixel being processed, i.e., the total number of partitioned regions nn minus the black regions (step S50).

The estimated pattern generator 210 calculates a conversion coefficient Tk corresponding to a full brightness of 255.0 for the sub-pixel of the calculated total, and used when the value is converted to a brightness seen through the barrier of the sub-pixel undergoing processing (step S55).

The sub-pixel brightness Yval is calculated using the following equation (Math. 3) (step S60).

[Math. 3]

$$Yval = \frac{\text{Value}}{\text{Total}} \times 1.0 = \text{Value} \times Tk \quad \text{(Math. 3)}$$

The estimated pattern generator 210 determines whether or not the process has been performed for all sub-pixels (step S65). In the affirmative case (YES in step S65), the estimated pattern generator 210 ends the process. In the negative case (NO in step S65), the estimated pattern generator 210 returns to step S10 and continues the process.

Upon determining that the pixel at the pixel position (is[k], js[k]) is not transparent (NO in step S25), the estimated pattern generator 210 transfers to step S40 and continues the process.

Upon determining that the pixel at the pixel position (is[k], js[k]) is a black region (Yes in step S30), the estimated pattern generator 210 transfers to step S40 and continues the process.

Upon determining that the value of variable k is not greater than the number of partitioned regions nn (NO in step S45), the estimated pattern generator 210 returns to step S25 and continues the process.

(3) Evaluation Value Calculation Process

The following describes the processing of step S3 indicated in FIG. 8.

Figure 11:
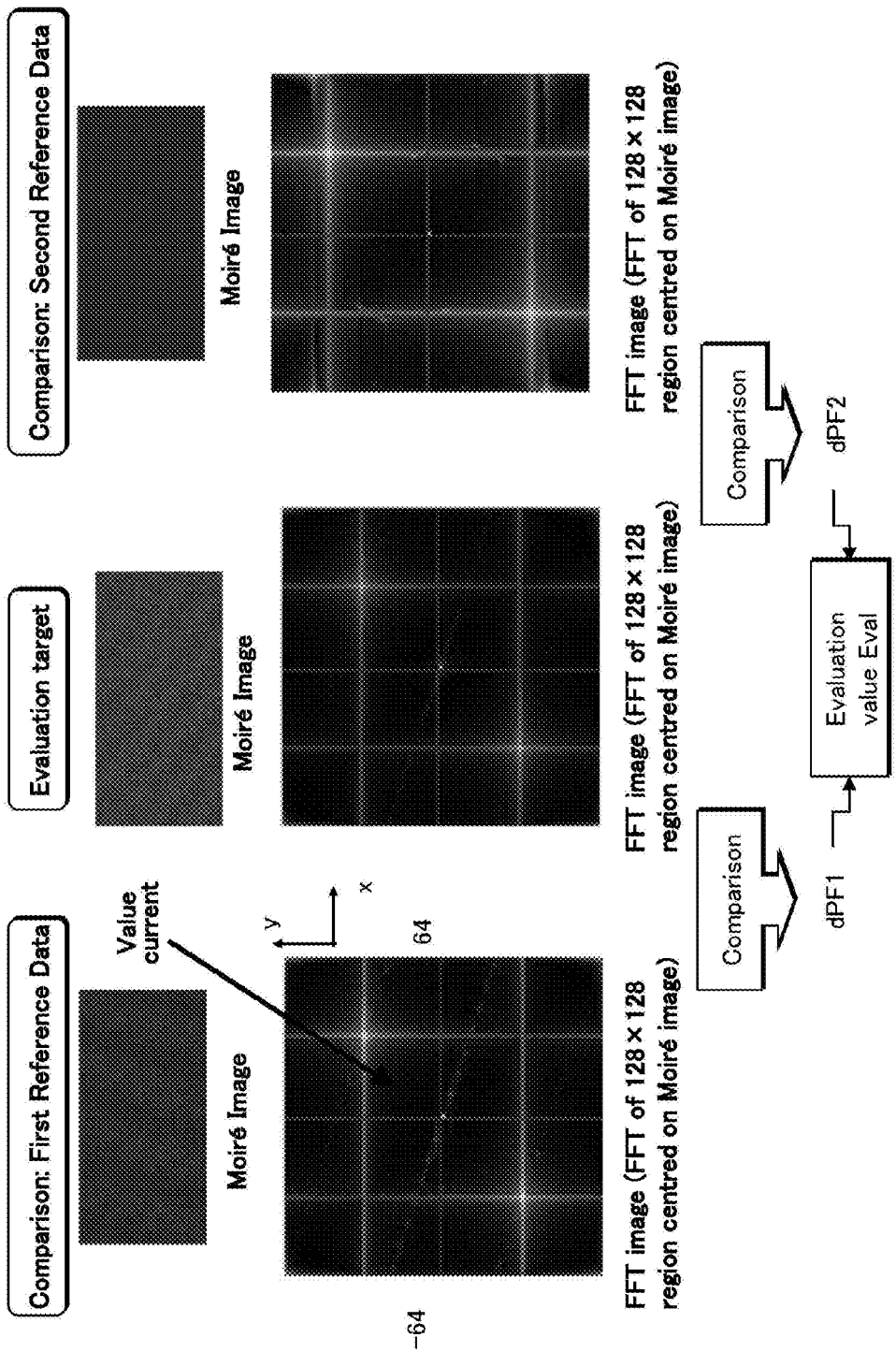
FIG. 11 illustrates an overall representation of the evaluation value calculated in the evaluation value calculation process.

FIG. 11 illustrates an overall representation of the evaluation value calculated by the evaluation value calculation process. As shown, the target of one evaluation, i.e., a Moiré pattern estimated for a barrier parameter set Vp[i], is used in a comparison of the first and second reference data and an evaluation value is calculated using the result of each comparison. The pieces of reference data may be actual image data, or may be an estimated image based on a Moiré simulation. FIG. 12 indicates estimated data (having a proper viewing distance of 3000 mm, a visible distance of 1000 mm, a pattern of 400×200 pixels as seen from the screen centre U, and a 4-parallax). When actual image data are used for reference, an average brightness correction, a colour balance correction, and so on become necessary. However, the data are also usable as-is when the difference in brightness frequency analysis is employed, as is the case here.

Figure 10:
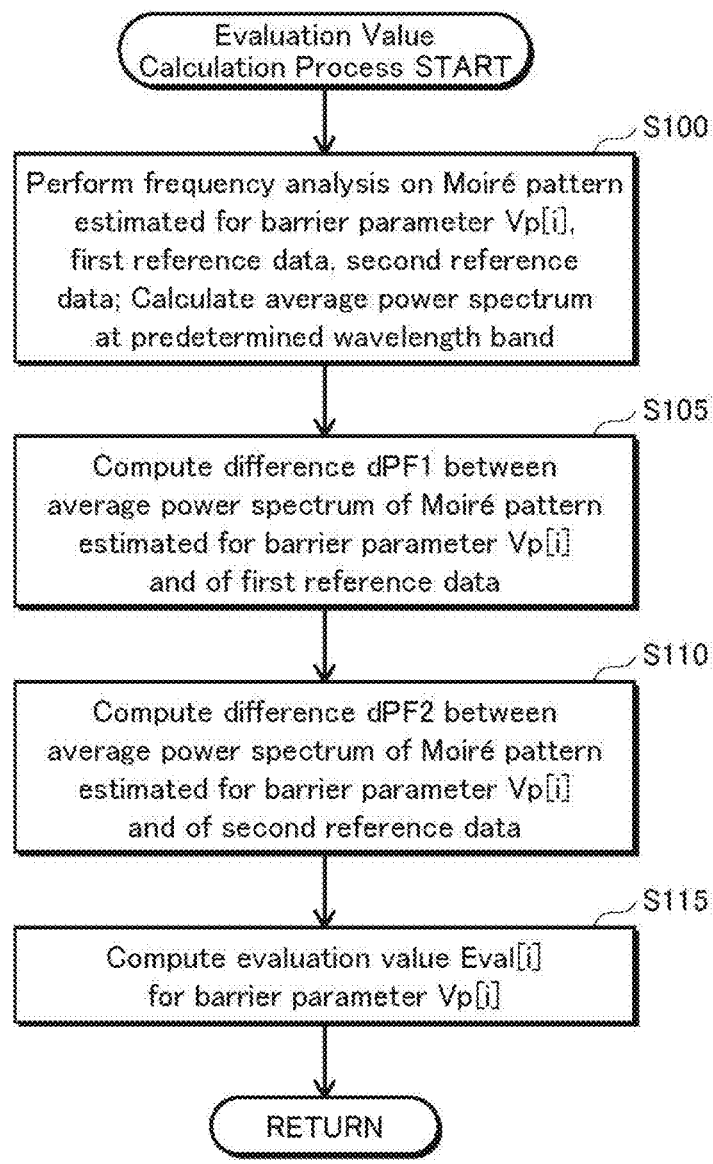
FIG. 10 is a flowchart indicating the evaluation value calculation process.

The following describes operation details with reference to the flowchart of FIG. 10.

The analyser 212 performs frequency analysis on each of the Moiré pattern estimated for the barrier parameter Vp[i], the first reference data, and the second reference data, then calculates an average power spectrum at a predetermined wavelength band (step S100).

The analyser 212 computes a difference dPF1 between the average power spectrum of the Moiré pattern estimated for the barrier parameter set Vp[i] and the average power spectrum of the first reference data (step S105).

The analyser 212 likewise computes a difference dPF2 between the average power spectrum of the Moiré pattern estimated for the barrier parameter set Vp[i] and the average power spectrum of the second reference data (step S110).

The evaluation value calculator 213 uses the differences dPF1 and dPF2 respectively calculated in steps S105 and S110 (see Math. 4) to compute an evaluation value Eval[i] for the barrier parameter set Vp[i] (step S115).

[Math. 4]

$$\text{Eval} = (dPF\text{Max}1 - dPF1) \times (1.0 - w) w \times dPF2 \quad \text{(Math. 4)}$$

Here, w represents a weighting factor (0.0≤w≤1.0), and dPFMax1 indicates a maximum value of dPF1. That is, Eval[k] is excluded from the frequency distribution beyond the first reference data, and indicates a smaller evaluated value with increasing proximity to the second reference data. Here, the evaluated value is defined such that a smaller value is a more appropriate parameter. A notch structure barrier pattern is selected so as to have the cross-talk characteristics of the first reference data while approaching a slanted pattern that has a weak Moiré effect like the second reference data. As w approaches zero, the barrier pattern having the value is distinct from the first reference data, and the evaluation value is smaller and deemed more appropriate. Likewise, as w approaches 1.0, the evaluation value of the barrier pattern approaches the second reference data, and is deemed smaller and more appropriate.

According to this approach, the scope of adjustment is made expandable and the appropriateness of the selected parameter is determinable. Also, several parameter candidates Vp[i] (where i=1, . . . , n) may be initialised and individually used as the basis of an optimal multivariable parameter search (using a genetic algorithm, a neural network, the minimum-square rule, or the like).

Furthermore, when the notch structure barrier pattern of Embodiment 1 is, for example, made using a glass plate with the apertures formed therein by emulsion, manufacturing error frequently causes the formation of inter-notch gaps dds. Variations in maximum aperture width hmax and in the leftward and rightward phase offset are also quite likely. These issues are also possible when a liquid crystal barrier or similar active barrier is used, as similar problems occur due to expressible shape precision issues. In such a case, the error is not taken into consideration in Embodiment 1. However, expanding the scope of adjustment as is done in the present Embodiment enables taking the error into consideration to optimise the barrier pattern.

The following is qualitatively known.
(a) The inter-notch gap dds has a periodicity of (0.2-0.4)×ds, and the optimal value is selectable from therein.
(b) The rightward notch aperture position dp has a periodicity ds in terms of phase difference, and has a comparatively optimal slant in the neighbourhood of ds×0.5.
(c) A rightward periodic increase kdsR has a periodicity of (0.2-0.4)×ds.

(d) The evaluated value pertaining to the notch structure width ds also expresses periodicity, such that the smaller the value of hmin, the greater the period. This is due to the possibility that when Ave_rh is constant, then the smaller the value of hmin, the greater the change in notch structure height dw.

2.4 Variations

The notch structure width ds is described as being a vertically-oriented width, similar to Embodiment 1. However, the width may also be measured along a direction of a barrier pattern slant angle θ. In such a case, the value of the notch structure width is found by dividing ds by cos θ.

Although Embodiment 2 describes a configuration where the waveform is formed using the notch structure similarly to Embodiment 1, the waveform may also be formed trapezoidally, or formed of line segments that change into ovoid arcs, or formed of parallel quadrilaterals. Also, in the present Embodiment, a diagonal barrier configuration is described. However, the Embodiment is also applicable to a vertical stripe barrier. Further, the notch structure is not limited to having the horizontal orientation shown in FIG. 2. The notch structure may also be applied to the vertical direction relative to the central axis of the barrier.

Additionally, although a slant barrier is discussed as an example, the present Embodiment is also applicable to a step barrier arranged in which rectangles of sub-pixel size are arranged diagonally.

Further, when the notch structure width dw is equal to the size p of one pixel, the aperture surface area dSn of the notch structure within one pixel, and the intra-pixel aperture surface area dSo of a slant barrier having the minimum aperture width hmin satisfy the formula given in Embodiment 1 (see Math. 2). This may also be applied to the gaps and so on. Further, the leftward notch structure height dwL may differ from dwR provided that the relation dwL+dwR=dw×2 is satisfied, as the aperture area S within one vertical pixel remains unchanged.

3. Embodiment 3

Embodiment 3 describes a video display device having a parallax barrier to which a notch structure has been added so as to have a proportion of pixel areas visible through the barrier pattern apertures arranged so that the barrier positions are horizontal and as uniform as possible. According to this parallax barrier, the Moiré pattern contrast can be reduced with no increase in cross-talk.

The video display device configuration is similar to that of the video display device 10 described in Embodiment 1. However, the configuration of the parallax barrier in the video display device 10 differs from the configuration of the parallax barrier in the video display device pertaining to the present Embodiment.

3.1 Parallax Barrier Configuration

The following describes the configuration of the parallax barrier pertaining to the present Embodiment.

The Moiré pattern contrast in a parallax barrier without the notch structure is discussed with reference to FIGS. 13 and 14.

Figure 13:
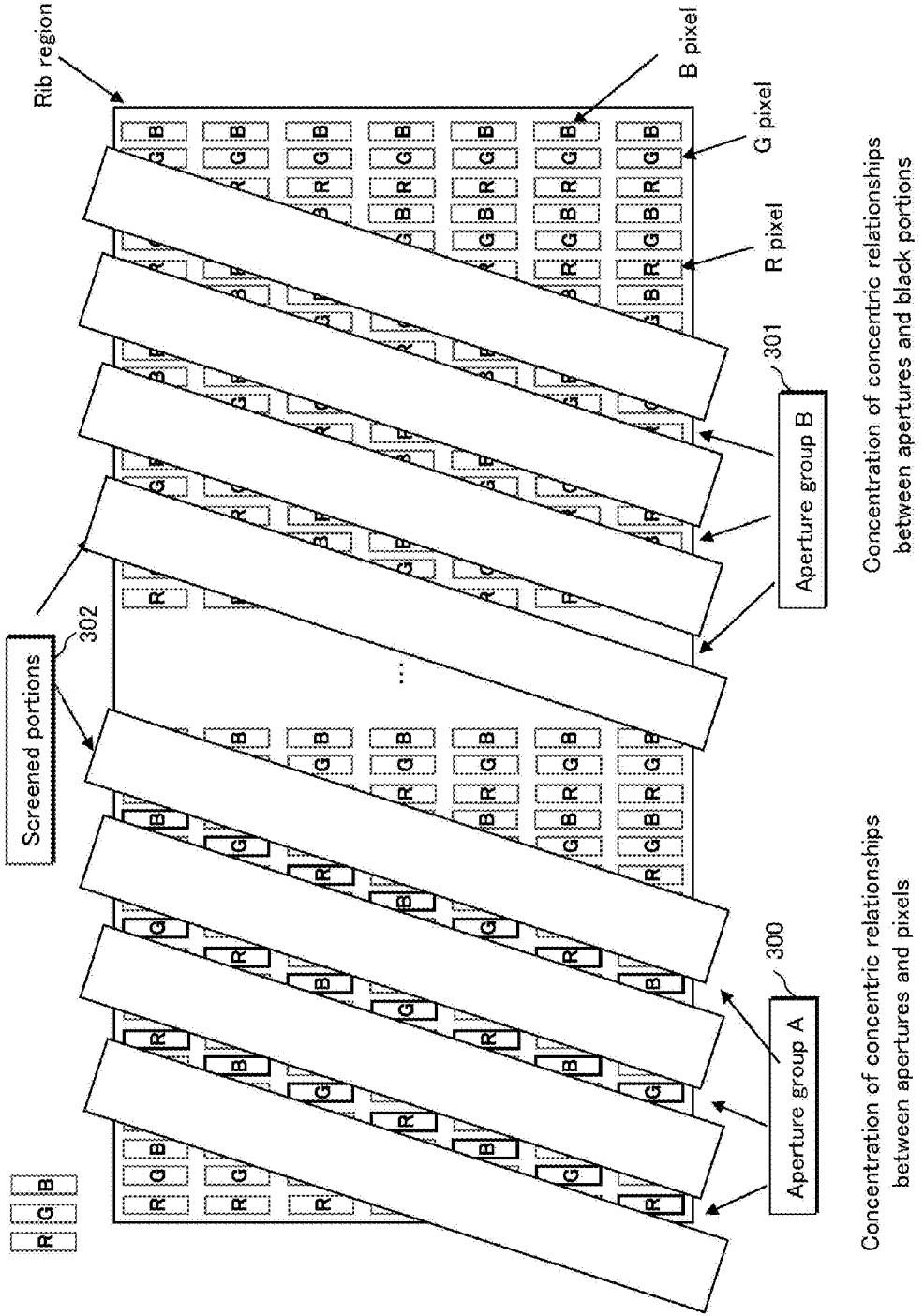
FIG. 13 illustrates a barrier pattern having a slant of 3:1 (where $\alpha=18.435°$).

FIG. 13 illustrates a barrier pattern having a slant of 3:1 (where α=18.435°).

In such a situation, when viewed from a predetermined position, a Moiré pattern is likely to be produced given the presence of a concentrations of portions such as aperture group A 300 in which each aperture centre overlays a pixel centre, and a aperture group B 301 in which the each aperture centre overlays a black centre.

Figure 14:
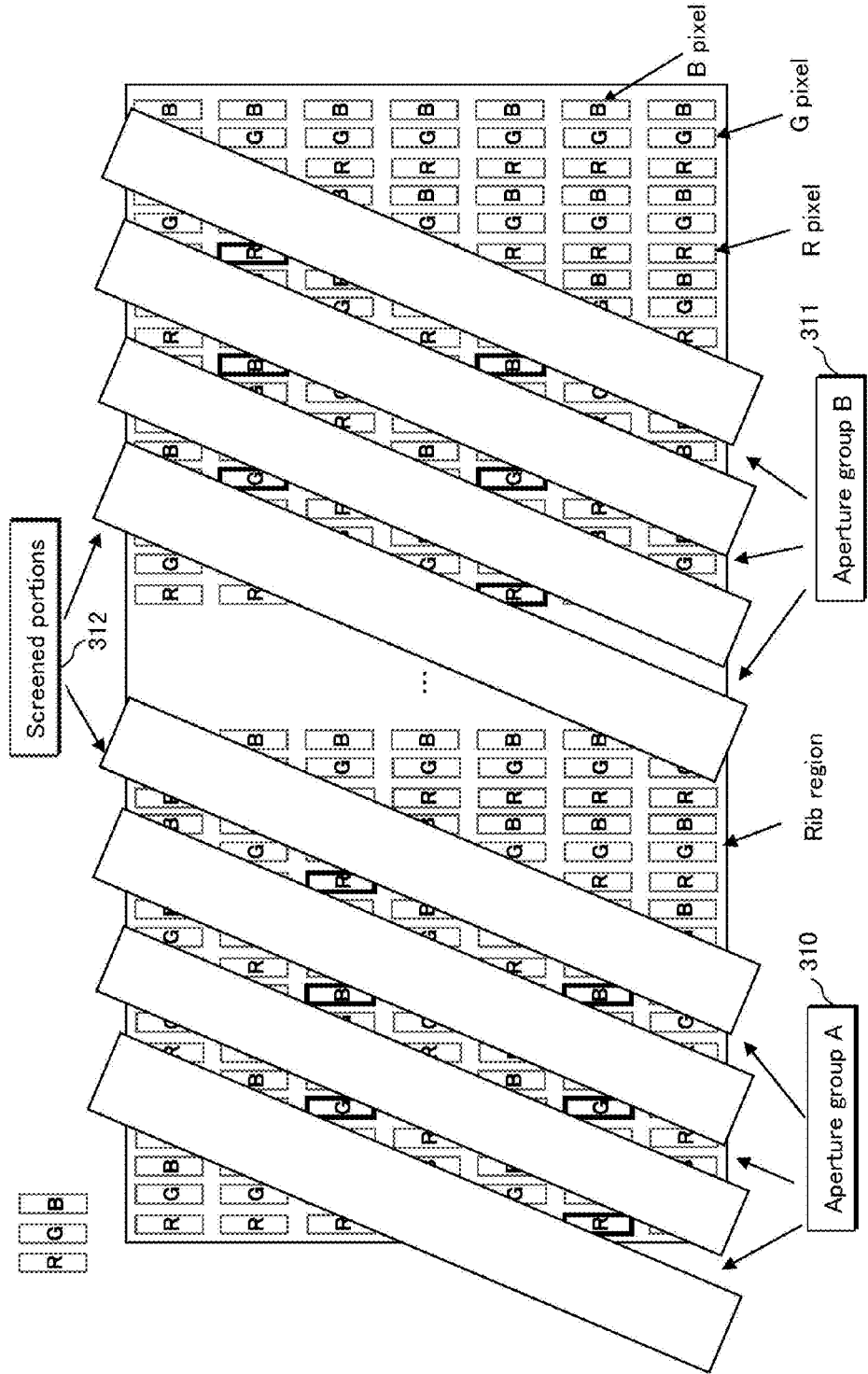
FIG. 14 illustrates a barrier pattern having a slant $\alpha$ of 23°.

FIG. 14 illustrates a barrier pattern having a slant α of 23°. In such a case, when viewed from a predetermined position, separation occurs as there is no concentration of portions such as aperture group A 310 and aperture group B 311 in which the aperture centres and pixel centres overlap, which makes the Moiré pattern less likely to occur.

Thus, the present Embodiment provides a parallax barrier having a notch structure added thereto so that separation occurs without concentration of regions in which the aperture centres and pixel centres overlap, i.e., where a Moiré pattern is reduced, for a barrier pattern as shown in FIG. 13 when α=18.435°. The configuration of the parallax barrier pertaining to the present Embodiment is illustrated in FIGS. 15 through 18.

As shown, unlike the notch structure of Embodiment 1, the notch structure of the present Embodiment does not require that the leftward and rightward widths dw and heights ds of the aperture portion match. However, like Embodiment 1, the notch structure is defined using four elements, namely the slant angle α with respect to the central axis of the barrier in the vertical direction, the slant angle β with respect to the horizontal notch structure (i.e., triangular portions), the notch structure width ds, and the notch structure height dw. The value of ds is expressible as ds=p/n, using the number of notch structure partitions n relative to the pixel width p. Like Embodiment 1, the notch structure width ds is given as a vertical width. However, the width may also be measured along a slant angle θ of the barrier pattern. In such a case, the notch structure width is a value resulting from dividing ds by cos θ.

(1) FIGS. 13 and 14

The ease of producing a Moiré pattern with the ordinary slanted barrier patterns shown in FIGS. 13 and 14 is discussed next. In these drawings, a few apertures in a slanted stripe barrier disposed in front of RGB pixels are depicted, the apertures having a predetermined width (aperture ratio rhth=1.0). In this example, the view number is N=4. However, the explanation is also applicable to other circumstances. When the slant angle α=18.435, the arrangement depicted in FIG. 13 is typical. Here, comparing aperture group A 300 to aperture group B 301 reveals that the former group includes a concentration of cases in which the respective aperture centres are overlapping the RGB sub-pixel regions behind each aperture. In contrast, aperture group B 301 includes a concentration of cases in which the respective aperture centres are overlapping a black matrix region between RGB sub-pixels behind the apertures. The pitch distance between stripes of the stripe barrier is determined by geometric calculation and is given by the view number N×the sub-pixel size sp. As such, a similar relationship exists between apertures and sub-pixels in the vicinity of apertures Ak (where k=1, . . . , nA) with respect to the screen horizontal direction. However, apertures Bn (where n=1, . . . , nB) distant from apertures Ak are produced out of phase with respect to the screen horizontal direction. Given that many of the apertures Ak within aperture group A 300 exhibit a relationship where the respective aperture centres are overlapping the centres of RBG sub-pixel areas behind the apertures, the view from a predetermined viewing position is perceived as being bright and the overall group is viewed as a pattern of bright portions. In contrast, given that many of the apertures Bn within aperture group B 301 exhibit a relationship where the respective aperture centres overlay a black matrix region between RGB sub-pixels, the view from the predetermined viewing position is perceived as being dark and the overall group is viewed as a pattern of dark portions. As a result, when the barrier pattern where α=18.435 is viewed from a predetermined position, a strong Moiré pattern is produced in which bright and dark portions cyclically repeat with respect to the horizontal direction. As such, when viewed through the apertures, the concentration of apertures having a concentric positional relationship with the RBG sub-pixels as described above results in bright portions being produced unevenly across the apertures. As a result, this arrangement is estimated to produce Moiré patterns with a high probability. In contrast, FIG. 14 schematically represents a situation where the slant angle is $\alpha=23°$. In such a case, comparing the slant barrier's aperture group A 310 and aperture group B 311 reveals that both aperture groups feature scattering, rather than concentration, of positional relationships where the respective centres of the apertures are overlaid on the RGB sub-pixel area centres. As a result, an aperture Ak within aperture group A 310 features scattering of positional relationships where the respective centres of the apertures are overlaid on the RGB sub-pixel area centres and is thus perceived as very bright when viewed from the predetermined viewing position. Likewise, an aperture Bn within aperture group B 311 features scattering of positional relationships where the respective centres of the apertures are overlaid on the RGB sub-pixel area centres and is thus perceived as very bright when viewed from the predetermined viewing position. That is, a Moiré pattern is unlikely to be produced as there is little difference in the patterns of brightness and darkness exhibited by the aperture groups A 310 and B 311. As such, when viewed through the apertures, the scattering of apertures having a concentric positional relationship with the RBG sub-pixels as described above results in bright portions being unlikely to be produced unevenly across the apertures. As a result, this arrangement is estimated to produce Moiré patterns with a low probability.

(2) FIGS. 15 through 18

FIGS. 15 through 18 illustrate respective examples of parallax barriers to which the notch structure is added as a barrier pattern where $\alpha=18.435°$, as shown in FIG. 13. The average aperture ratio Ave_rh of these parallax barriers is identical to the aperture ratio rhth of the parallax barrier of FIG. 13. Thus, the ratio of the sub-pixel size to the minimum aperture width is smaller than rhth, such that rhmin=rhth× Rmin (rhmin<1.0 in FIGS. 15 through 18).

Figure 15:
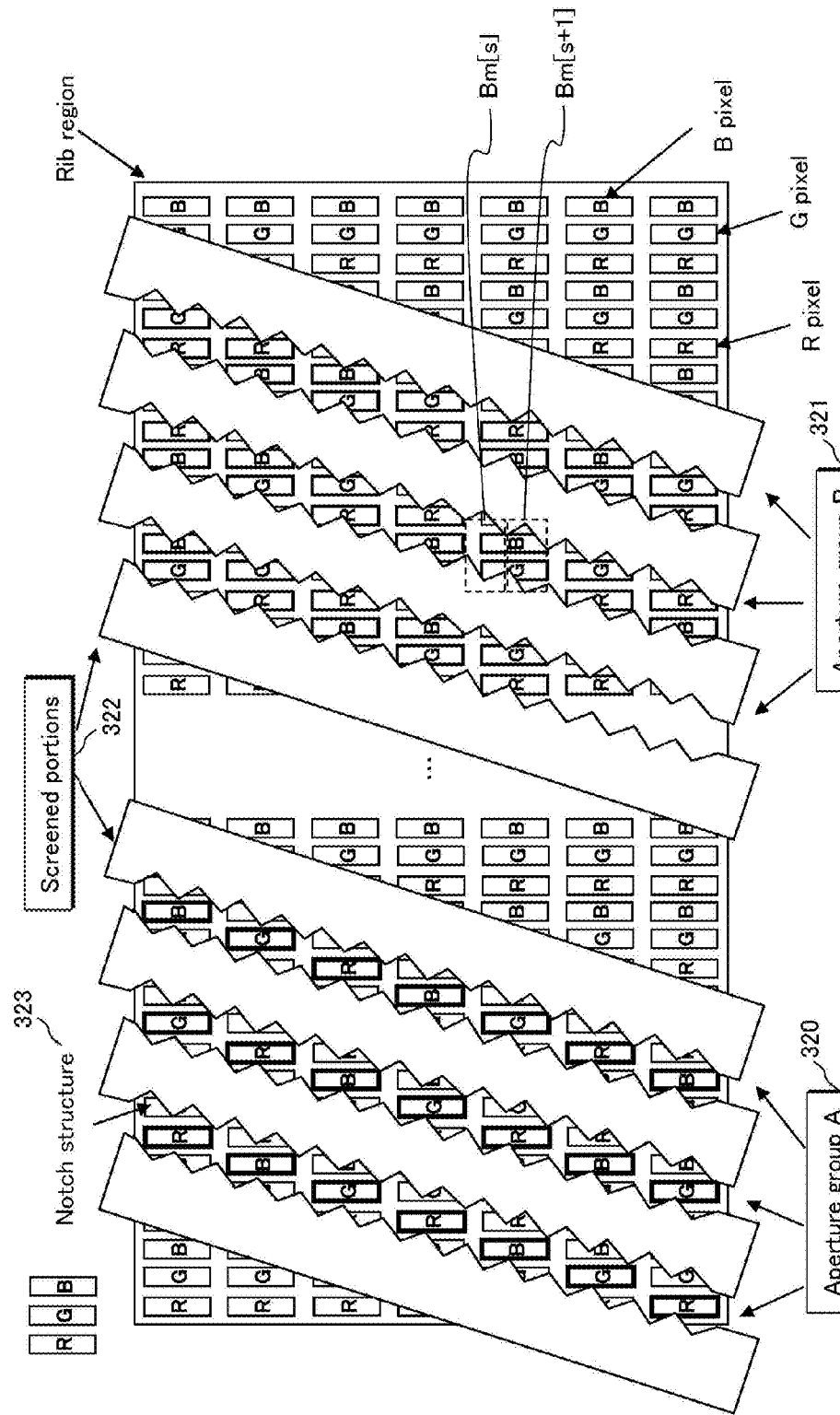
FIG. 15 illustrates a case in which the number of notch structure partitions n is two, and in which the left and right notch aperture widths dw are the same and are in phase.

FIG. 15 illustrates a case in which the number of notch structure partitions n is two, the leftward and rightward notch aperture widths dw are the same, and the leftward and rightward notch apertures are in phase. In such circumstances, when aperture Bm[s] within one aperture stripe Bm included in aperture group B 321 is viewed along with a lower aperture Bm[s+1], a greater proportion of the pixel behind the aperture (a G pixel) is visible. This positional relationship is also seen in the other aperture stripes Bm included in aperture group B 321. That is, in aperture group B 321, the addition of the notch structure causes greater brightness to be visible through the barrier than is the case for the aperture group B 301 of FIG. 13. In contrast, in aperture group A 320, the minimum aperture width hmin is smaller than the aperture width hth of FIG. 13. However, the addition of the notch structure causes an appearance of brightness on the level of the aperture group A 300 of FIG. 13. Accordingly, FIG. 15 has the same concentration of positional relationships between the apertures and the pixels as FIG. 13, but the difference between these positional relationships in group A 320 and group B 321 is smaller. As a result, the difference between bright and dark portions is smaller, thus reducing the production of Moiré patterns.

Figure 16:
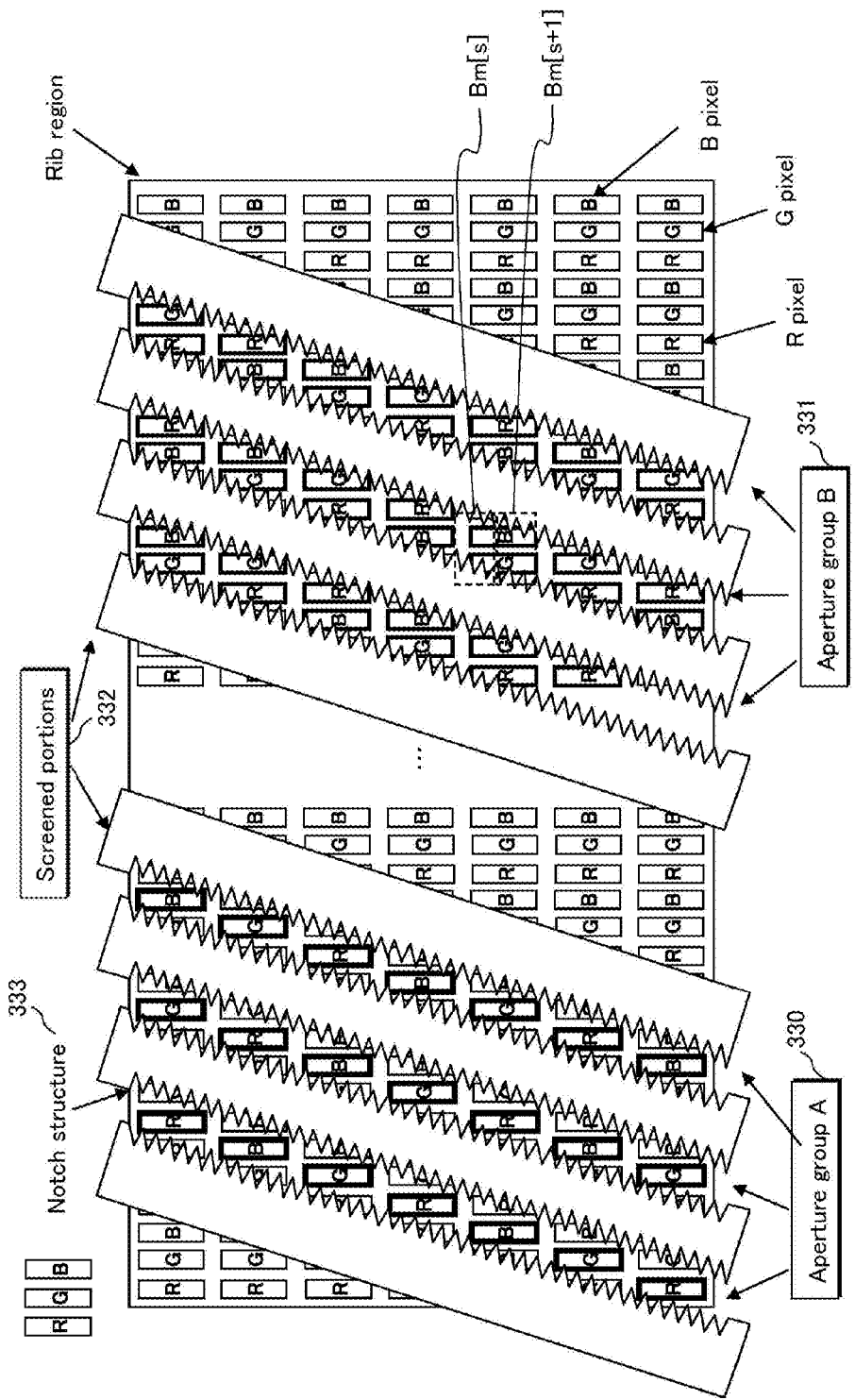
FIG. 16 illustrates a barrier pattern in which the number of notch structure partitions is n=6.

In contrast, FIG. 16 illustrates a situation where the same notch structure height dw as FIG. 15 is used, with a smaller width ds (and the number of notch structure partitions n is large at n=6). In FIG. 16, when aperture Bm[s] within one aperture stripe Bm included in aperture group B 331 is viewed along with a lower aperture Bm[s+1], a greater proportion of the pixel behind the aperture (a G pixel) is visible. Here, aperture group B 331 has a notch structure of narrower width applied thereto. Thus, this configuration is perceived as having more brightness visible through the barrier than the aperture groups B 301 and B 321 of FIGS. 13 and 15. That is, the difference between the positional relationships of the pixels and apertures in group A 330 and group B 331 is yet smaller than in FIG. 15. As a result, the difference between bright and dark portions is likewise smaller, thus further reducing the production of Moiré patterns.

Figure 17:
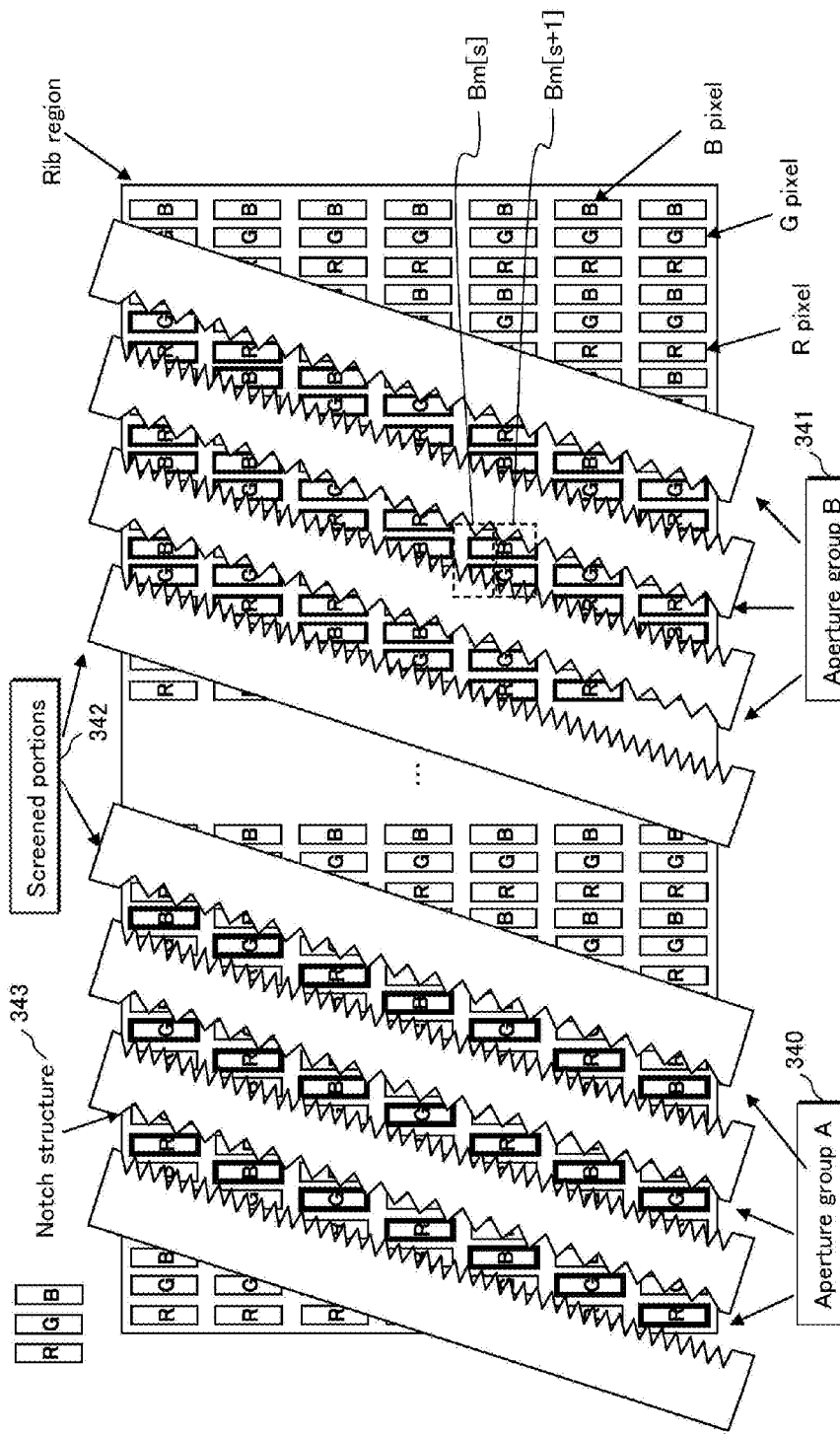
FIG. 17 illustrates a barrier pattern in which the rightward number of notch structure partitions is nR=3, and the leftward number of notch structure partitions is nL=6.

In addition, FIG. 17 indicates a pattern in which the rightward number of notch structure partitions nR is smaller than a leftward number of partitions nL (here, nR=3, nL=n=6). In such circumstances, the leftward and rightward notch structures are out of phase, but the average aperture ratio Ave_rh for one pixel is the same as that shown in FIG. 15. Similar to FIG. 15, a greater proportion of aperture Bm[s] within one aperture stripe Bm included in aperture group B 341 is visible, and a smaller proportion of a lower aperture Bm[s+1] is visible. As such, a large difference between the proportions of the pixel behind the aperture (a G pixel) is less likely to appear, in contrast to FIG. 15.

Figure 18:
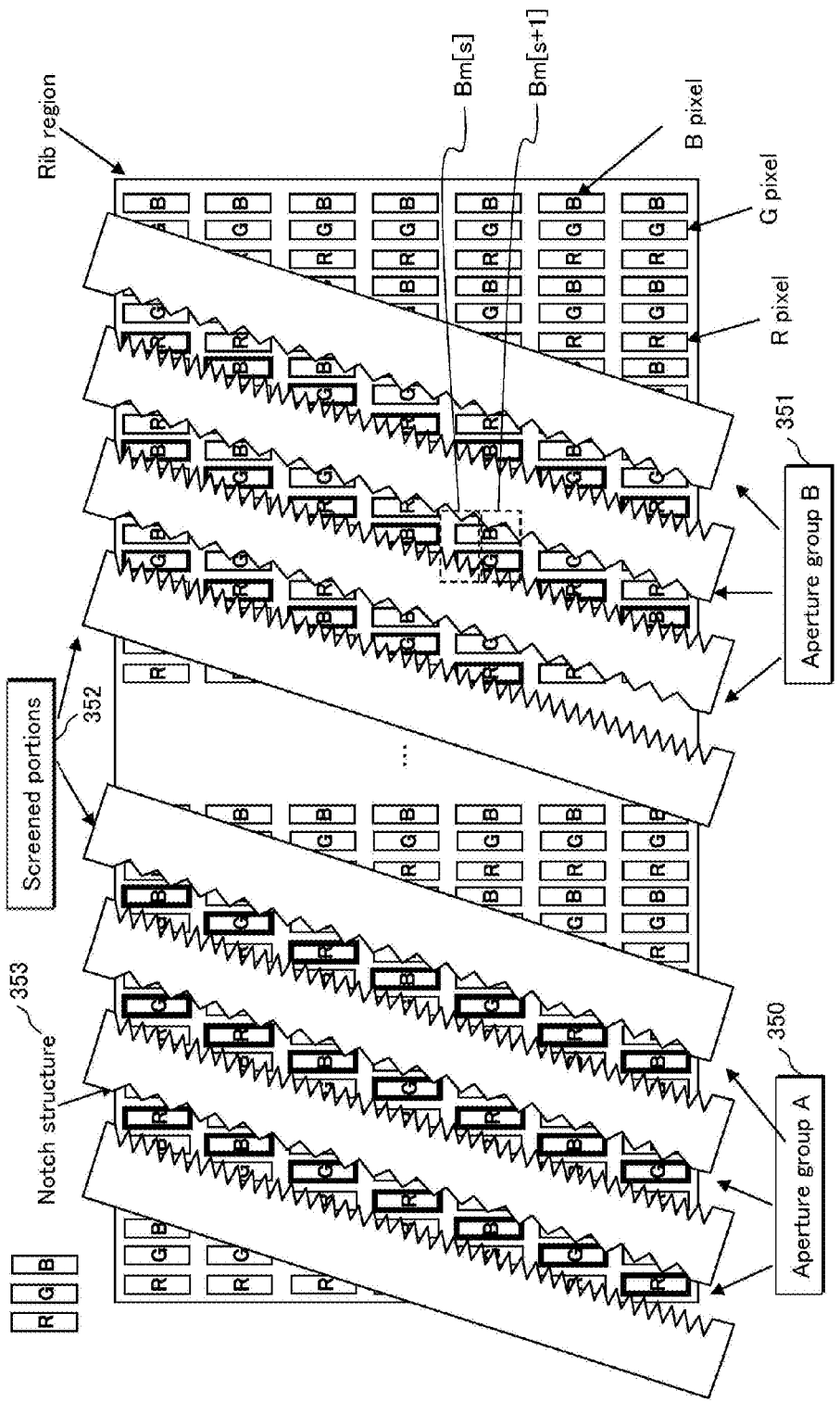
FIG. 18 illustrates a barrier pattern in which the leftward height satisfies dwL=dw+Ddw and the rightward height satisfies dwR=dw−Ddw.

Furthermore, in FIG. 18, the leftward and rightward heights dw may also be changed. Here, the leftward height satisfies dwL=dw+Ddw, and the rightward height satisfies dwR=dw-Ddw, such that the average aperture ratio Ave_rh within one pixel is the same as that shown in FIG. 17. In such circumstances, a greater proportion of aperture Bm[s] within one aperture stripe Bm included in aperture group B 351 is visible, and a smaller proportion of a lower aperture Bm[s+1] is visible. As such, a large difference between the proportions of the pixel behind the aperture (a G pixel) is less likely to appear, in contrast to FIG. 17. Accordingly, and in contrast to FIG. 17, no problems in brightness occur, the positional relationships between apertures and pixels in aperture group A 350 and in aperture group B 351 are plausibly closer still, and the magnitude of the Moiré pattern is greatly diminished.

Also, the leftward notch structure height dwL of the first few notches in a pixel unit may also be enlarged in a notch structure shown in FIGS. 17 and 18. In such circumstances, the corresponding rightward notch structure height dwR is made smaller. Likewise, a greater proportion of aperture Bm[s] within one aperture stripe Bm included in aperture group B is visible, and a smaller proportion of a lower aperture Bm[s+1] is visible. As such, a large difference between the proportions of the pixel behind the aperture (a G pixel) is less likely to appear, in contrast to FIG. 15. Accordingly, and in contrast to FIG. 15, no problems in brightness occur, the positional relationships between apertures and pixels in aperture group A and in aperture group B are plausibly closer still, and the magnitude of the Moiré pattern is further diminished.

Here, the apertures are offset to the right despite the fact that, in FIGS. 17 and 18, the respective values of dwL and dwR, and of nL and nR, are set in opposition to each other. That is, the background pixel largely visible behind an aperture Bm[s] of one aperture stripe Bm included in aperture group B is a B pixel, only, and is established similarly.

(3) Summary

The above describes an example of a parallax barrier configuration as shown in FIGS. 15 through 18. However, a parallax barrier having the following notch structure is beneficial in order to reduce the Moiré pattern contrast without increasing cross-talk.

(a) Increase the number of notch structure partitions n.
(b) Change the leftward and rightward notch structure heights, i.e., vary the phase by shifting the periodicity.
(c) Change the leftward and rightward notch structure heights, i.e., have the leftward height satisfy dwL=dw+Ddw and have the rightward height satisfy dwR=dw−Ddw, such that both relations sum to 2dw.
(d) In order to preserve an average aperture ratio Ave_rh that is the predetermined aperture ratio rhth, the notch structure height dw may be increased as the minimum aperture width hmin is decreased. However, increasing the acuity of the notch structure angle makes manufacturing error a more likely influence. Thus, the minimum aperture width ratio rhmin beneficially satisfies 0.6×hth≤rhmin<rhth.

Accordingly, the proportion of pixel area seen through the apertures of the barrier pattern is made substantially equal in terms of horizontal alignment by defining the notch structure. Thus, a Moiré pattern is made less likely to occur. Also, the positional relationship between the apertures and pixels in group A 320 and the positional relationship between the apertures and pixels in group B 321 are nearly identical. Thus, a Moiré pattern is made less likely to occur with this relationship in place.

In FIGS. 15 through 18, sub-pixel divisions (and metal auxiliary electrodes) are not considered. However, the above is also applicable in the presence of such considerations. The number of divisions n depends on the pixel configuration, and is thought to be linked to the number of divisions in one sub-pixel. Thus, when a sub-pixel has t divisions, the leftward or rightward side of the aperture beneficially has at least a number of divisions satisfying t (number of pixel areas)+2 (black matrix region)+t−1 (auxiliary electrode region). That is, a value obtained from the number of repeating effective pixel portions producing a predetermined brightness of light and dark portions such as black matrix and metal electrodes producing no light, when viewed along the vertical direction, is used as the number of partitions n.

Also, when the sub-pixel is divided into t partitions as in Embodiment 1, the leftward or the rightward side of the aperture uses a number of partitions where t (the number of pixel regions) is equal to or greater than a natural number multiple k (k>1).

Further, although the above indicates that a pattern is produced with little Moiré effect, the analysis method may also be performed on the basis of a probability that a Moiré pattern will be produced, as evaluated for the slanted barrier pattern having a predetermined notch structure. In such a case, for example, the positional relationship distribution produced in aperture group A may be compared to the positional relationship distribution in aperture group B, the pixel region distribution produced by the positional relationship distribution in aperture group A may be compared to the pixel region distribution produced by the positional relationship distribution in aperture group B, or the brightness distribution produced by the positional relationship distribution in aperture group A may be compared to the brightness distribution produced by the positional relationship distribution in aperture group B.

Although Embodiment 3 describes a configuration where the waveform is formed using the notch structure similarly to Embodiment 1, the waveform may also be formed trapezoidally, or formed of line segments that change into ovoid arcs, or formed of parallel quadrilaterals. Further, the notch structure is not limited to having the horizontal orientation shown in FIG. 2. The notch structure may also be applied to the vertical direction relative to the central axis of the barrier.

Additionally, although a slant barrier is discussed as an example, the present Embodiment is also applicable to a step barrier arranged in which rectangles of sub-pixel size are arranged diagonally.

4. Embodiment 4

Embodiment 4 describes a video display device having a parallax barrier in which the notch structure has been added to correct deficient positional relationships and repair the imbalance of mixed positional relationships. According to this parallax barrier, the Moiré pattern contrast can be reduced with no increase in cross-talk.

The video display device configuration of the present Embodiment is similar to that of the video display device 10 described in Embodiment 1. However, the configuration of the parallax barrier in the video display device 10 differs from the configuration of the parallax barrier in the video display device pertaining to the present Embodiment.

4.1 Parallax Barrier Configuration

The following describes the configuration of the parallax barrier pertaining to the present Embodiment.

As shown in FIG. 13, given a barrier pattern with an angle $\alpha=18.435°$ viewed from a predetermined position viewed through the apertures, the concentration of apertures having a concentric positional relationship with the RBG sub-pixels as described above results in bright portions being likely to be produced unevenly across the apertures. As a result, this arrangement is estimated to be likely to produce Moiré patterns. Similarly, and as shown in FIG. 14, given a barrier pattern with an angle $\alpha=23°$ viewed from a predetermined position viewed through the apertures, the scattering without concentration of apertures having a concentric positional relationship with the RBG sub-pixels as described above results in bright portions being unlikely to be produced unevenly across the apertures. As a result, this arrangement is unlikely to produce Moiré patterns.

(1) Concentric Relationship of Apertures and Sub-Pixels

Figure 19:
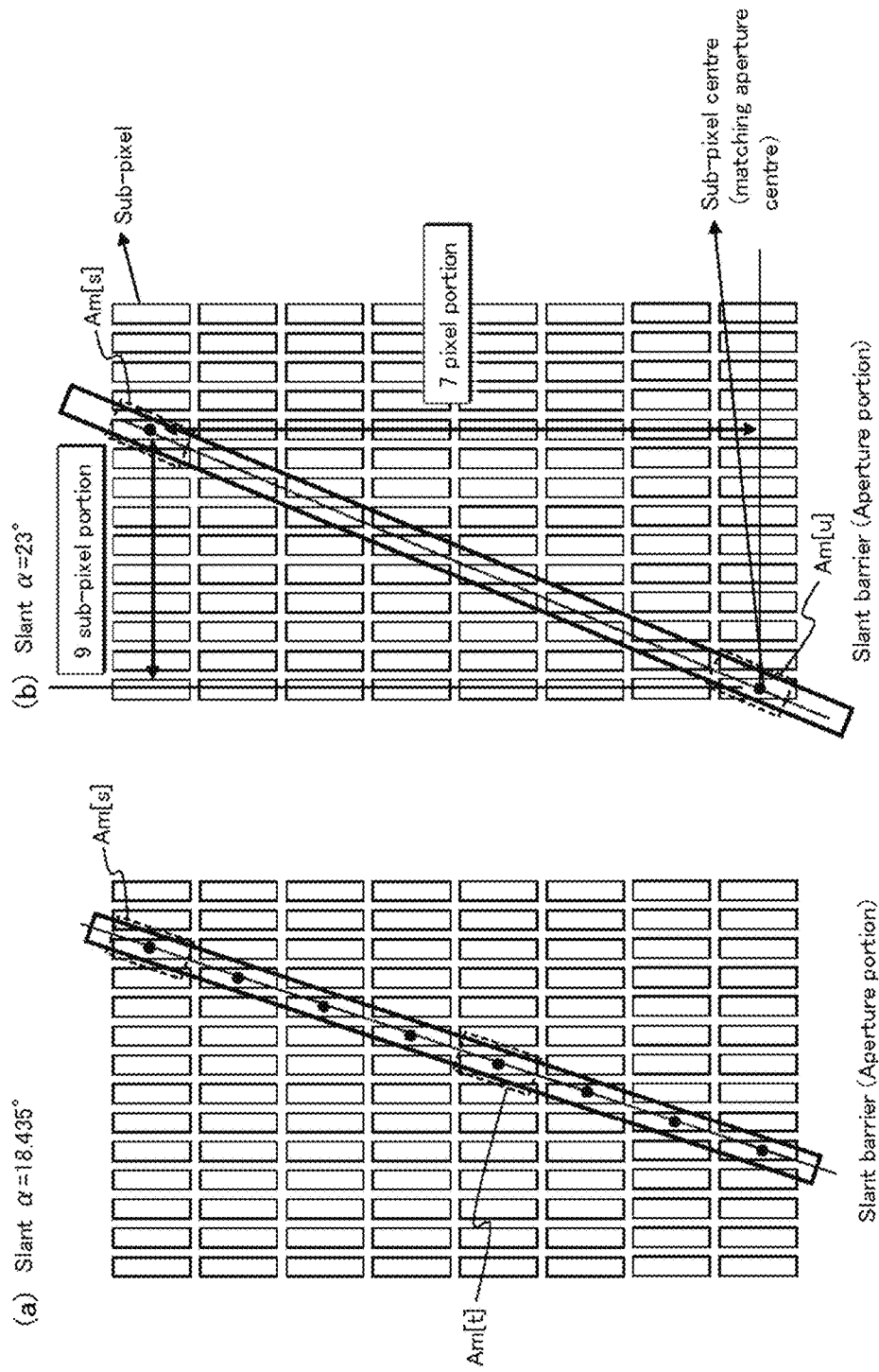
FIG. 19A illustrates a single extracted slant barrier having a slant of $\alpha=18.435°$.
FIG. 19B illustrates a single extracted slant barrier having a slant of $\alpha=23°$.

FIG. 19A illustrates a single extracted slant barrier having a slant angle of $\alpha=18.435°$. When this slant barrier belongs to aperture group A 300 of FIG. 13, the pixel centre is visible in the same manner from aperture Am[s] and from another aperture Am[t] (where s≠t), and the same pixel arrangement is visible from both apertures Am[s] and Am[t]. That is, when a barrier is positioned so that the pixel centres are visible along the single slant barrier at this angle, a regularity is expressed such that the pixels and barrier are normally concentric. Similarly, when the slant barrier shown in FIG. 19A belongs to aperture group B 301 of FIG. 13, then conditions occur in which the positional relationships exhibit a regularity such that the apertures are concentric with the black matrix regions.

In contrast, FIG. 19B illustrates a single extracted slant barrier having a slant angle of $\alpha=23°$. When this slant barrier belongs to aperture group A 310 of FIG. 14, the pixel centre is visible in the same manner from aperture Am[s] and from another aperture Am[u] (where s≠u) repeatedly satisfy the relationship u=s+sunit, where sunit=11 (for seven pixels in the vertical direction and nine sub-pixels in the horizontal direction). This relationship changes when the slant angle $\alpha$ changes, as sunit is dependent on the slant angle $\alpha$. For example, when $\alpha=18.435°$, sunit=1 (for one pixel in the vertical direction and one sub-pixel in the horizontal direction), and when $\alpha=26.57°$, sunit=2 (for two pixels in the vertical direction and three sub-pixels in the horizontal direction).

(2) Barrier Pattern with Notch Structure

Figure 20:
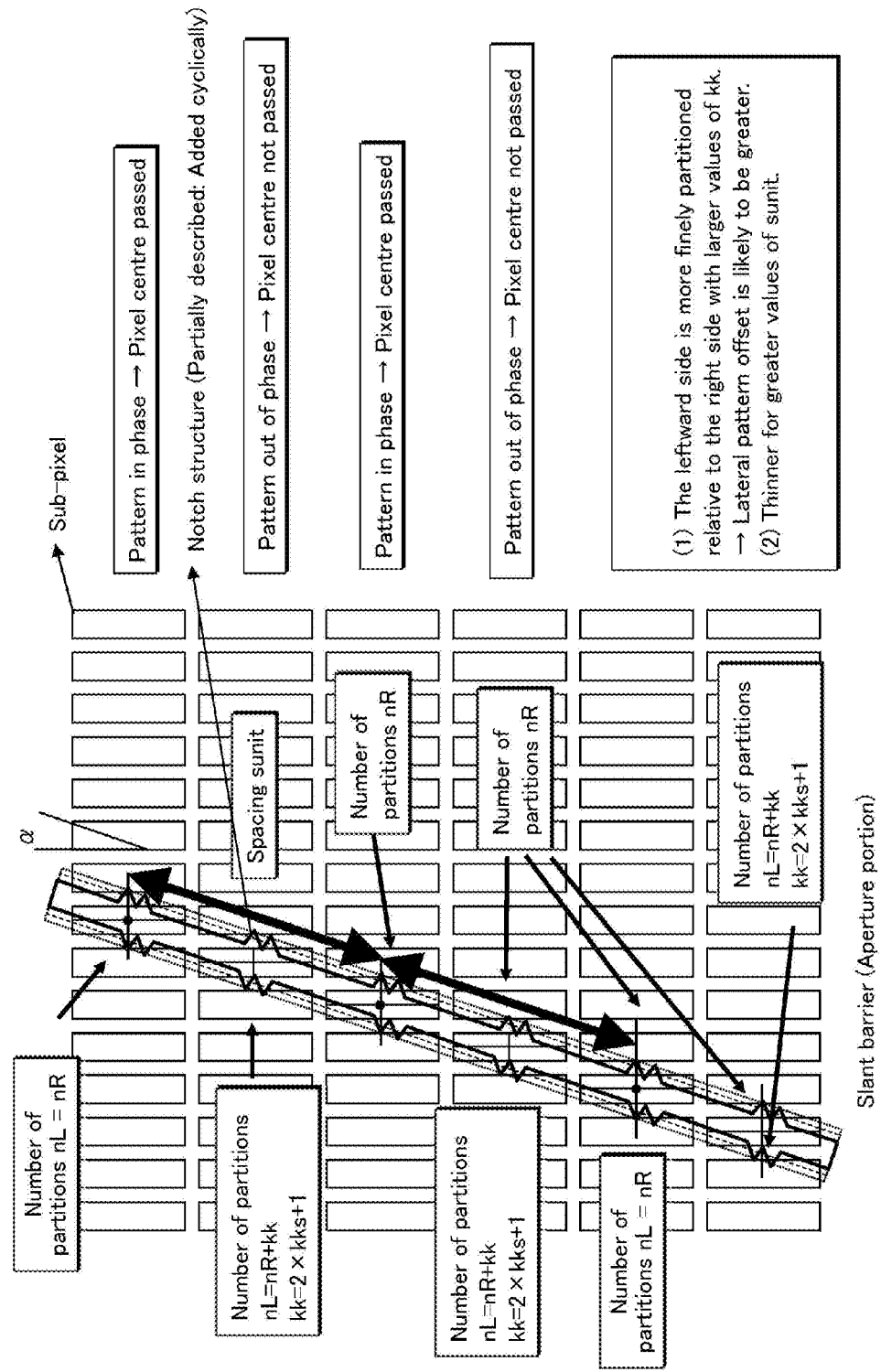
FIG. 20 illustrates a barrier pattern configured such that the leftward number of notch structure partitions nL and the rightward number of notch structure partitions nR are matching, with sunit−1 barriers continuously arranged therebetween in which the leftward number of notch structure partitions nL and the rightward number of notch structure partitions nR are non-matching.

FIG. 20 illustrates a situation similar to that of FIG. 19B, with a configuration where a barrier has a matching leftward number of notch structure partitions nL and rightward number of notch structure partitions nR (with a height corresponding to the pixels), and has disposed therebetween a barrier with a non-matching left number of notch structure partitions nL and number of notch structure partitions nR (with a height corresponding to the pixels). In other words, the barrier where the leftward number of notch structure partitions nL and the rightward number of notch structure partitions nR match (the height corresponding to the pixels) has leftward and rightward notch structures that are in phase and thus, the pixels and the barrier are concentric. Conversely, in sunit−1 barriers, the leftward and rightward notch structures are not in phase, and thus the pixels and barriers are not concentric (barriers that are in phase differ in terms of the positional relationship between the aperture centres and the pixel centres). The leftward number of notch structure partitions nL and the rightward number of notch structure partitions nR can be made non-matching according to the following formula (Math. 5).

[Math. 5]

$$nL = nR + kk, \quad kk = 2 \times kks + 1 \quad \text{(Math. 5)}$$

Here, kks is an integer. Thus, a positional relationship is created by repeating structural units sunit, that is the same as the positional relationship of FIG. 14 (e.g., a barrier pattern having a slant angle of 23°). The following qualities are also present.

(a) The greater the value of kks, the more the leftward notch structure is finely divided in contrast to the rightward notch structure, and the more easily the notch structure pattern is able to shift phase.

(b) The larger the value of sunit, the more the structure approaches that of a slant barrier with a large slant angle.

(c) The black matrix regions and the auxiliary electrodes are beneficially not in the same positional relationship to the greatest extent possible.

Also, kks<0 may also be considered a rule, but given that nL is a number of partitions that is required to be equal to or greater than a predetermined size, the value of kks cannot be any lower.

Figure 21:
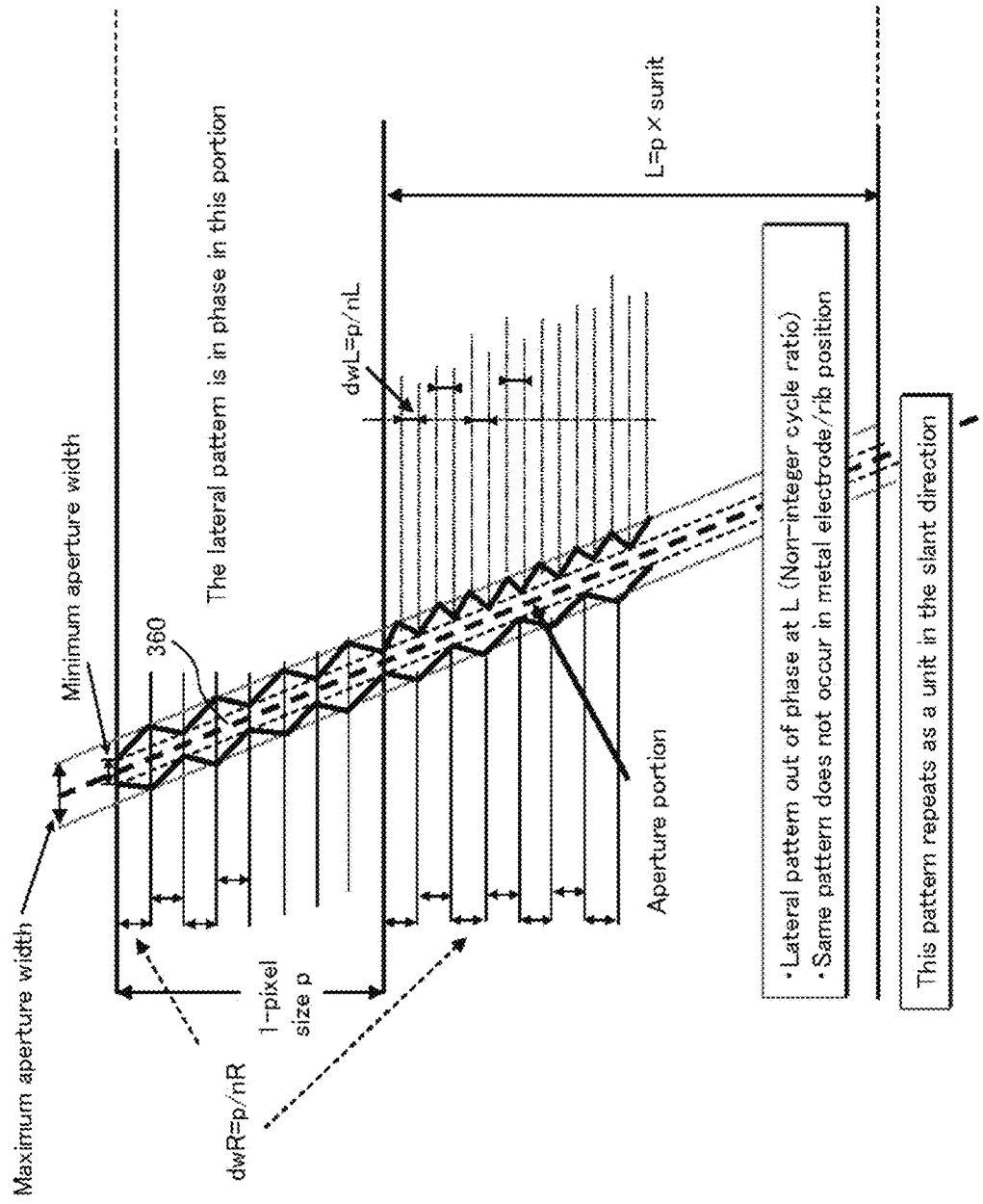
FIG. 21 illustrates a parallax barrier configuration in which nL=6+5 and nR =6.
Figure 22:
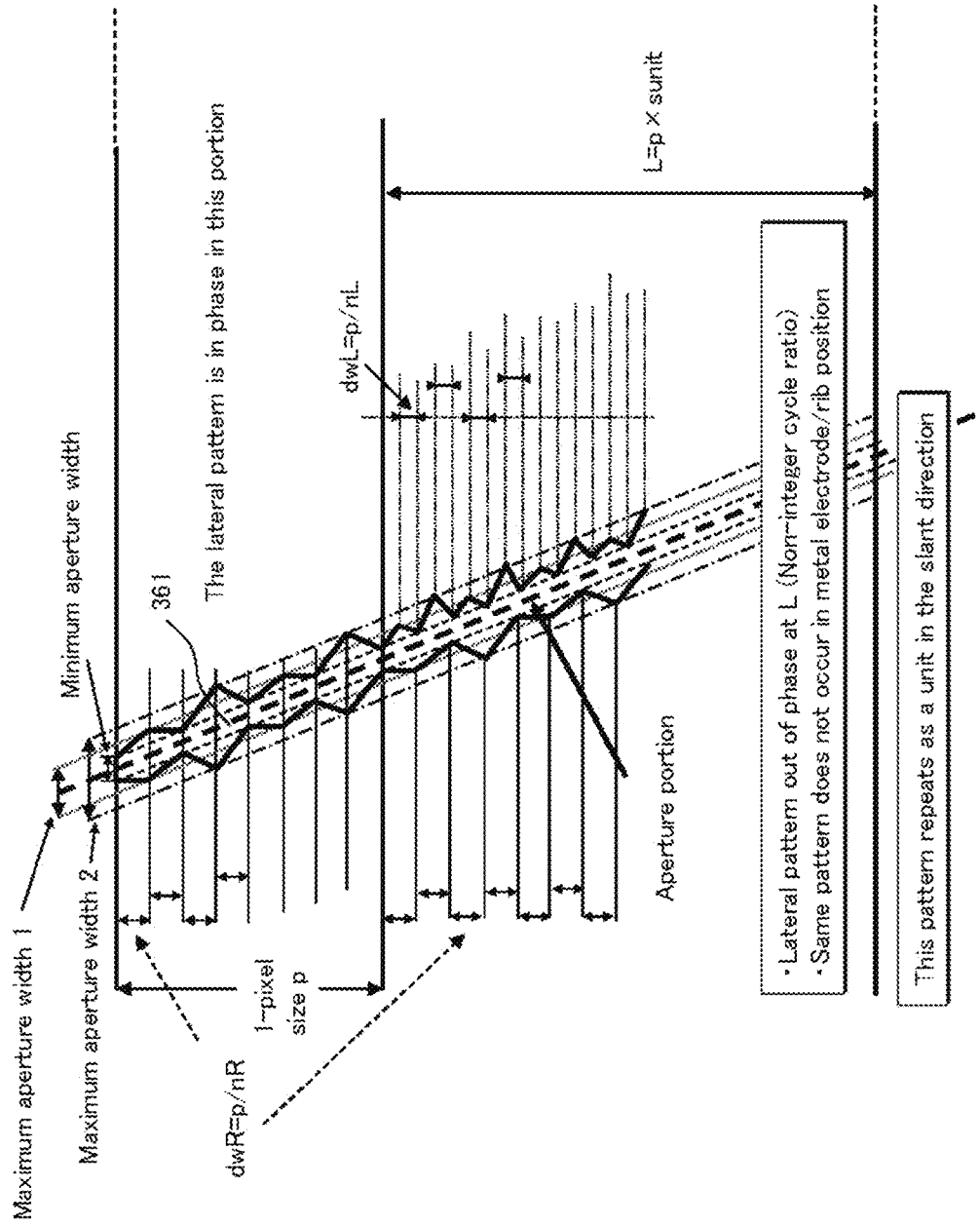
FIG. 22 illustrates a parallax barrier configured such that two patterns (dw1, dw2) of leftward and rightward pattern size dwL and dwR appear in alternation.
Figure 23:
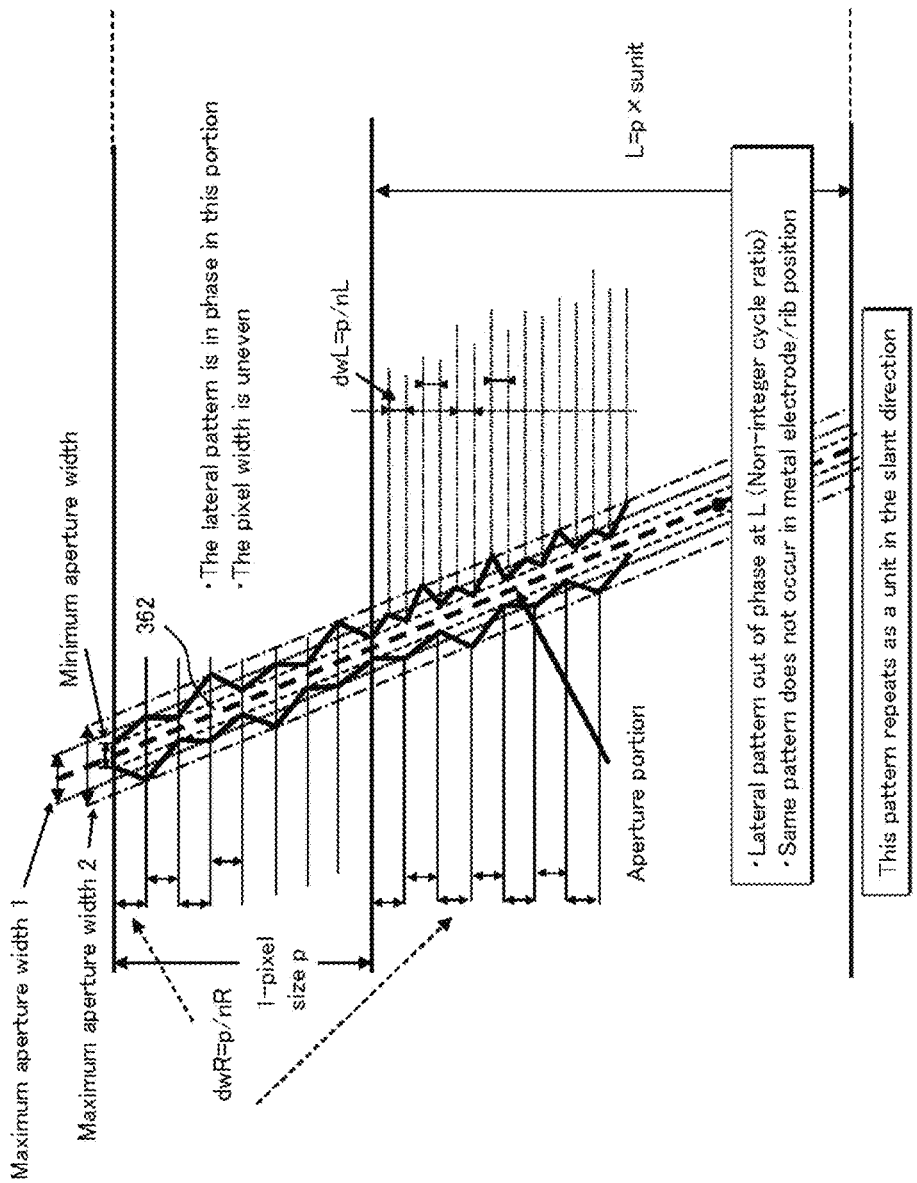
FIG. 23 illustrates a parallax barrier configured with the leftward and rightward widths repeating in opposite order.

FIGS. 21 through 23 illustrate a specific parallax barrier configuration pertaining to the present Embodiment. In FIGS. 21, 22, and 23, the barrier pattern is portrayed differently than in previous drawings, being shown as viewed from the back. FIG. 21 illustrates an example where nL=6+5 and nR=6, the angle is β=34°, and sunit=11. That is, this corresponds to a pattern approaching 23°.

FIG. 22 illustrates a configuration in which two patterns having the leftward and rightward sizes dwL and dwR of FIG. 21 appear in alteration (however, the order of alteration is in phase). FIG. 23 illustrates an example in which the leftward and rightward repetition of FIG. 22 occurs in opposite order. In FIGS. 22 and 23, the leftward and rightward widths vary, thus enabling a change in the phase of sunit−1 barriers. Furthermore, in addition to the effects promoted by the phase difference of FIG. 22, FIG. 23 approaches a slant direction by having the leftward side begin with a notch structure of large size, while the rightward side begins with a notch structure of small size. Here, the definition L=sunit×p holds. Here, p is generated so that the average aperture ratio at that pixel size satisfies Ave_rh=rhth. However, when dw1=dw+ddw and dw2=dw−ddw hold, then as described in Embodiment 3, the value of Ave_rh is steady, regardless of the aperture surface area added by the notch structure within the range of L varying as dwL and dwR alternate, and of variations in the value of kks.

Accordingly, by defining the notch structure in this manner, the pixel positions visible through the passing regions are substantially identical, enabling a reduction in the occurrence of Moiré patterns.

Here, the predetermined number of partitions nR depends on the pixel configuration, and is related to the number of partitions in a single sub-pixel. Thus, when a sub-pixel has t divisions, the leftward or rightward side of the aperture beneficially has at least a number of divisions satisfying t (number of pixel areas)+2 (black matrix region)+t−1 (auxiliary electrode region). In other words, a value obtained from the number of repeating effective pixel portions producing a predetermined brightness of light and dark portions such as black matrix and metal electrodes producing no light, when viewed along the vertical direction, is beneficially used as the number of partitions n.

Also, when the sub-pixel has t partitions as is the case in Embodiment 1, the leftward or the rightward side of the apertures may use a number of partitions in which t (the number of pixel regions) is equal to or greater than a natural number k (where k>1).

Although Embodiment 4 describes a configuration where the waveform is formed using the notch structure similarly to Embodiment 1, the waveform may also be formed trapezoidally, or formed of line segments that change into ovoid arcs, or formed of parallel quadrilaterals. Further, the notch structure is not limited to having the horizontal orientation shown in FIG. 2. The notch structure may also be applied to the vertical direction relative to the central axis of the barrier.

Additionally, although a slant barrier is discussed as an example, the present Embodiment is also applicable to a step barrier arranged in which rectangles of sub-pixel size are arranged diagonally.

5. Embodiment 5

When the positional relationships of the aperture portions, the pixel regions, and the black matrix are lacking due to the black portions and the intra-pixel electrodes, mixed relationships occur in each barrier and thus producing an imbalance. This imbalance is a cause of Moiré patterns. Embodiment 5 describes a video processing device having a parallax barrier with a unit structure configured from a plurality of pixel groups that are in phase and a plurality of pixel groups that are out of phase, due to the leftward and rightward notch structures along the barrier pattern. According to this parallax barrier configuration, the lacking positional relationships are restored, the imbalance of mixed positional relationships is repaired, and the Moiré contrast is diminished with no increase in cross-talk.

The video display device configuration of the present Embodiment is similar to that of the video display device 10 described in Embodiment 1. However, the configuration of the parallax barrier in the video display device 10 differs from the configuration of the parallax barrier in the video display device pertaining to the present Embodiment.

5.1 Parallax Barrier Configuration

The following describes the configuration of the parallax barrier pertaining to the present Embodiment.

Figure 24:
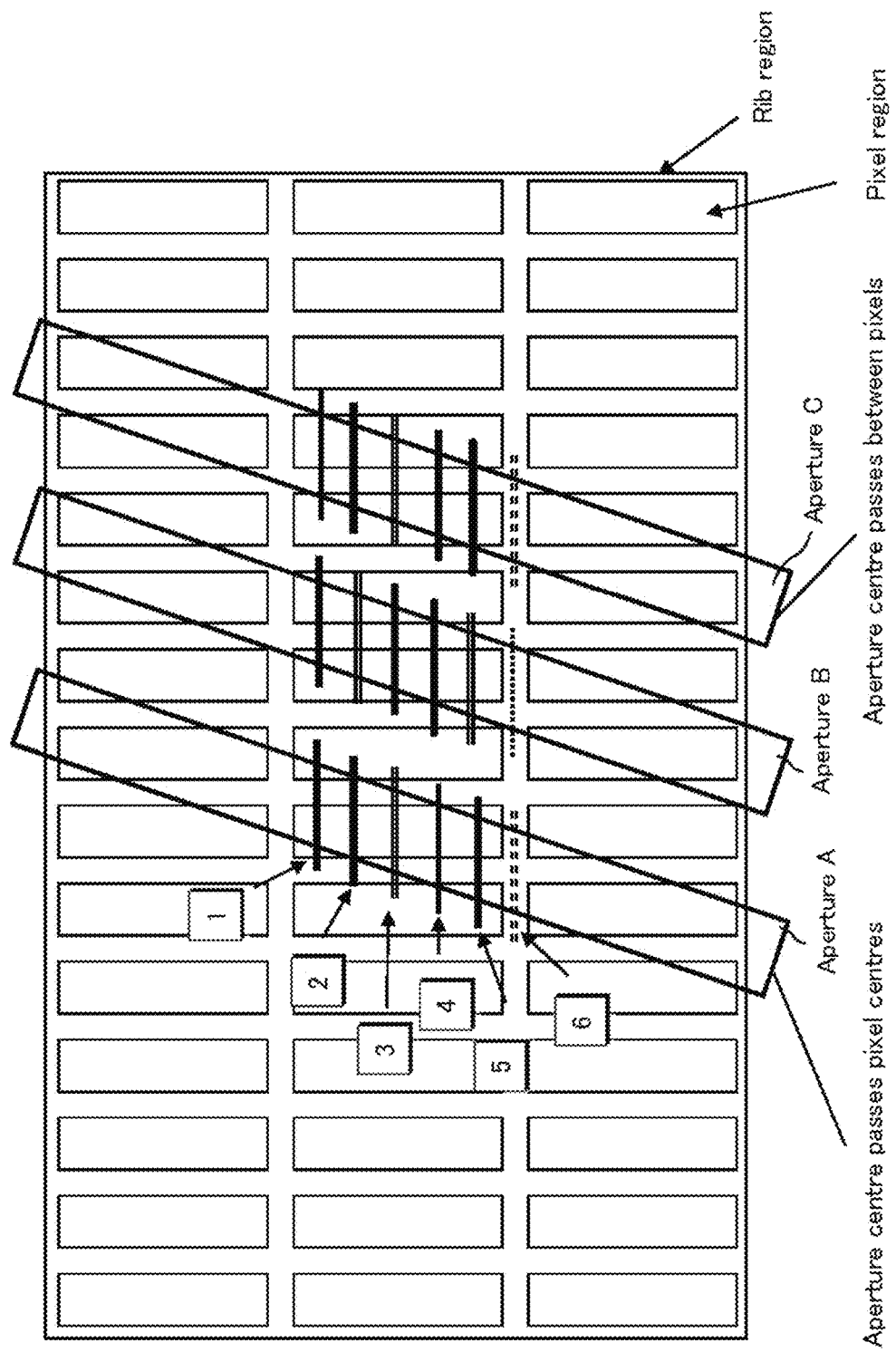
FIG. 24 illustrates a situation where black portions and intra-pixel electrodes are present in a parallax barrier having a slant of 3:1 (i.e., $\alpha=18.435°$).
Figure 25:
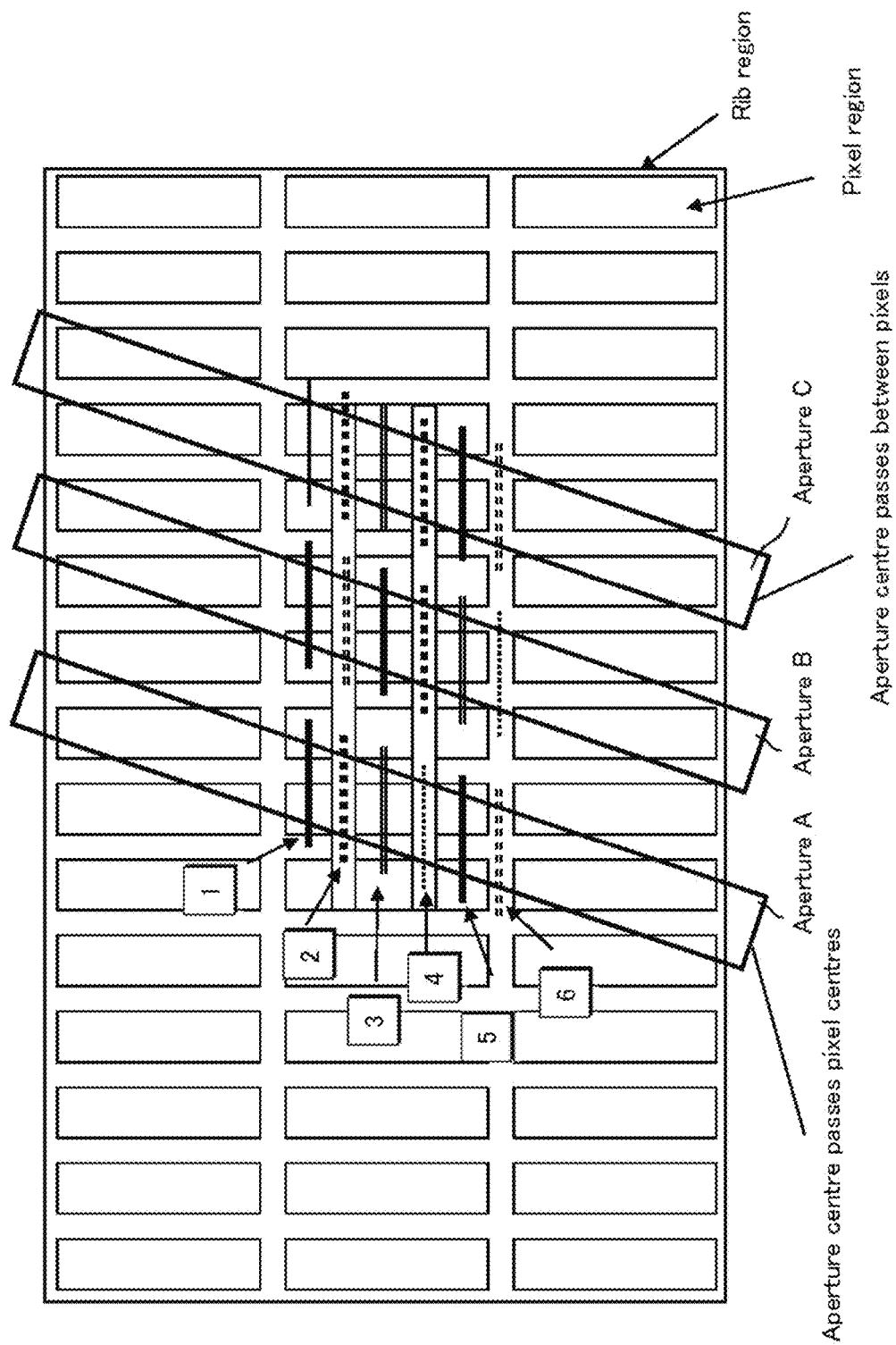
FIG. 25 illustrates a situation where metal auxiliary electrode are present when pixel partitions are made to the pixels.

FIGS. 24 and 25 illustrate situations where the black portions and intra-pixel electrodes are mixed, for a parallax barrier having a slant of 3:1 (i.e., α=18.435°). In particular, FIG. 25 shows a case where metal auxiliary electrode are present when pixel partitions are made to the pixels shown in FIG. 24.

FIGS. 26 through 33 illustrate pattern examples where a notch structure is added to the parallax barrier having a slant of α=18.435° from FIG. 25, so as to reduce the Moiré pattern of FIGS. 24 and 25. As shown in FIGS. 28 through 33, the notch structure does not require that the notch structure height dw and width ds match on the left and right sides with the aperture portion therebetween. However, like Embodiment 1, the respective notch structures are defined according to four elements, namely the slant angle α with respect to the central axis of the barrier in the vertical direction, the slant angle β with respect to the horizontal notch structure (i.e., triangular portions), the notch structure width ds, and the notch structure height dw. The value of the height ds is expressible as ds=p/n, using the number of notch structure partitions n relative to the pixel width p. The notch structure width ds is given as a vertical width. However, the width may also be measured along a slant angle θ of the barrier pattern. In such a case, the notch structure width is a value resulting from dividing ds by cos θ.

(1) Moiré Pattern in FIGS. 24 and 25

The Moiré pattern contrast in a parallax barrier without the notch structure is discussed with reference to FIGS. 24 and 25. In these drawings, a few apertures in a slant barrier disposed in front of RGB pixels are depicted, the apertures having a predetermined width (aperture ratio rhth=1.4). In this example, the view number is N=4. However, the explanation is also applicable to other circumstances. FIG. 24 illustrates an example of positional relationships between the pixels, the black portions, and the intra-pixel electrodes when the slant angle is α=18.435°. In these examples, aperture A shows a stripe barrier in which the aperture centre passes the pixel centres, and aperture C shows a stripe barrier in which the aperture centre passes between the pixel centres. Similarly, aperture B shows an example of a stripe barrier positioned between aperture A and aperture C. In FIG. 24, each horizontal line has a number assigned sequentially thereto indicating a corresponding aperture thereabove (here, k=1, 2, 3, 4, 5, or 6). The horizontal lines each represent the positional relationships between a horizontally-positioned aperture, the pixels, and the black matrix, with respect to an aperture corresponding to the respective line. As shown in FIG. 24, the combination described below produces identical positional relationships for the apertures, pixels, and black matrix. The positional relationship Ak represents a horizontal line indicating the position of a number k relative to aperture A. Also, although FIGS. 24 and 25 indicate the same positional relationships, the lack of rib region and horizontal auxiliary electrode is to be noted and therefore indicated in dashed lines.

(Relation 1) Positional relationship A1, positional relationship B3, and positional relationship C4

(Relation 2) Positional relationship A2, positional relationship B4, and positional relationship C5

(Relation 3) Positional relationship A3, positional relationship B5, and positional relationship C6

(Relation 4) Positional relationship A4, positional relationship B6, and positional relationship C1

(Relation 5) Positional relationship A5, positional relationship B1, and positional relationship C2

(Relation 6) Positional relationship A6, positional relationship B2, and positional relationship C3

The same pixel brightness visible in identical positional relationships. Then, many of these positional relationships are concentrated and coexist within a single stripe. As such, the pixels visible through apertures A, B, and C are combined and averaged, thus diminishing the Moiré effect. In contrast, positional relationships A6, B6, and C6 are positional relationships that are deficient due to the presence of the black matrix region. The positional relationships featuring this deficiency differ from those shown in FIG. 24. As such, the positional relationship distributions within stripes A, B, and C do not match, producing variation in the combination state of each aperture. This variation results in a pattern of brightness and darkness (i.e., a Moiré pattern).

Furthermore, although FIG. 25 indicates the presence of metal auxiliary electrode partitioning the pixels of FIG. 24, these auxiliary electrodes produce positional relationships in which the positional relationships A2, A4, A6, B2, B4, B6, C2, C4, and C6 are lacking. Thus, the Moiré pattern is likely to be more intense.

(2) Parallax Barrier Configuration of Present Embodiment

In order to resolve the above-described problem, the present Embodiment realises the lacking positional relationships in a different location by adding a slant barrier in which the notch structure has a minimum aperture width hmin. Accordingly, the positional relationship distributions in apertures A, B, and C are made to match, and the Moiré pattern is diminished by having the combination state in each aperture match as much as possible. The overall configuration of the parallax barrier pertaining to the present Embodiment is illustrated in FIGS. 26 through 33.

Figure 26:
FIG. 26 illustrates a parallax barrier configured such that the leftward and rightward notch structures are in phase.
Figure 27:
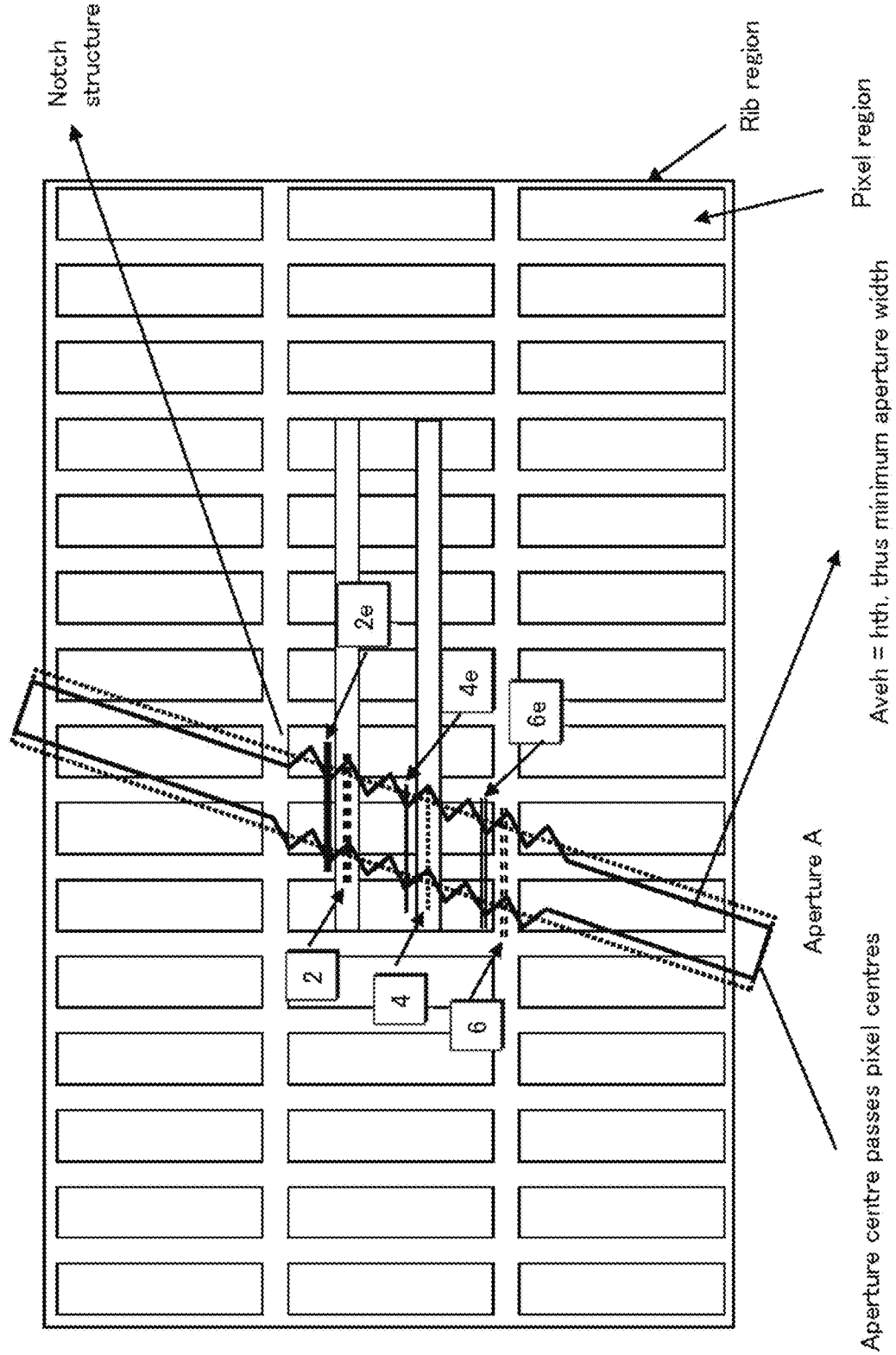
FIG. 27 illustrates a parallax barrier configured such that the leftward and rightward notch structures are out of phase.

FIG. 26 illustrates a parallax barrier in a situation where the leftward and rightward notch structures are in phase. In such a situation, the positional relationships lacking from aperture A are indicated as A2d, A4d, and A6d. These are likely insufficient to reduce the Moiré pattern. Here, A2d indicates a positional relationship likely to be produced by the notch structure at positional relationship A2 when A2d is lacking in aperture A. In contrast, shifting the phase as in FIG. 27 (where the notch structure height is ds×len (0<len<1.0)) causes positional relationships A2, A4, and A6 to be realised as positional relationships A2e, A4e, and A6e. Here, the notch structure has no horizontal lines and no vertical lines.

Also, the number of notch structure partitions n (i.e., the number of notch structures per vertical pixel size) is, as in Embodiment 1, beneficially made up of at least a number of partitioned pixel regions+a number of auxiliary electrodes+a number of black matrix portions (give or take two), or at least in the vicinity of a multiple k (where k is a natural number greater than one) of the number of partitioned pixel regions. In FIG. 26, the pixel has three partitions and the parallax barrier is indicated for a situation where n=6, for twice the number of notch structure partitions. However, although setting the number of notch structure partitions n to six is appropriate for this situation, symmetry occurring when the left and right notch structures are in phase produces a situation where the lacking positional relationship do not appear as well as when n=3. In addition, when n=7 according to the above-described situation of n being equal to the number of partitioned pixel regions+number of auxiliary electrodes+number of black matrix portions, when the leftward and rightward notch structures are in phase and are symmetrical as shown in FIG. 26, the lacking positional relationship may not be compensated for as effectively.

Figure 28:
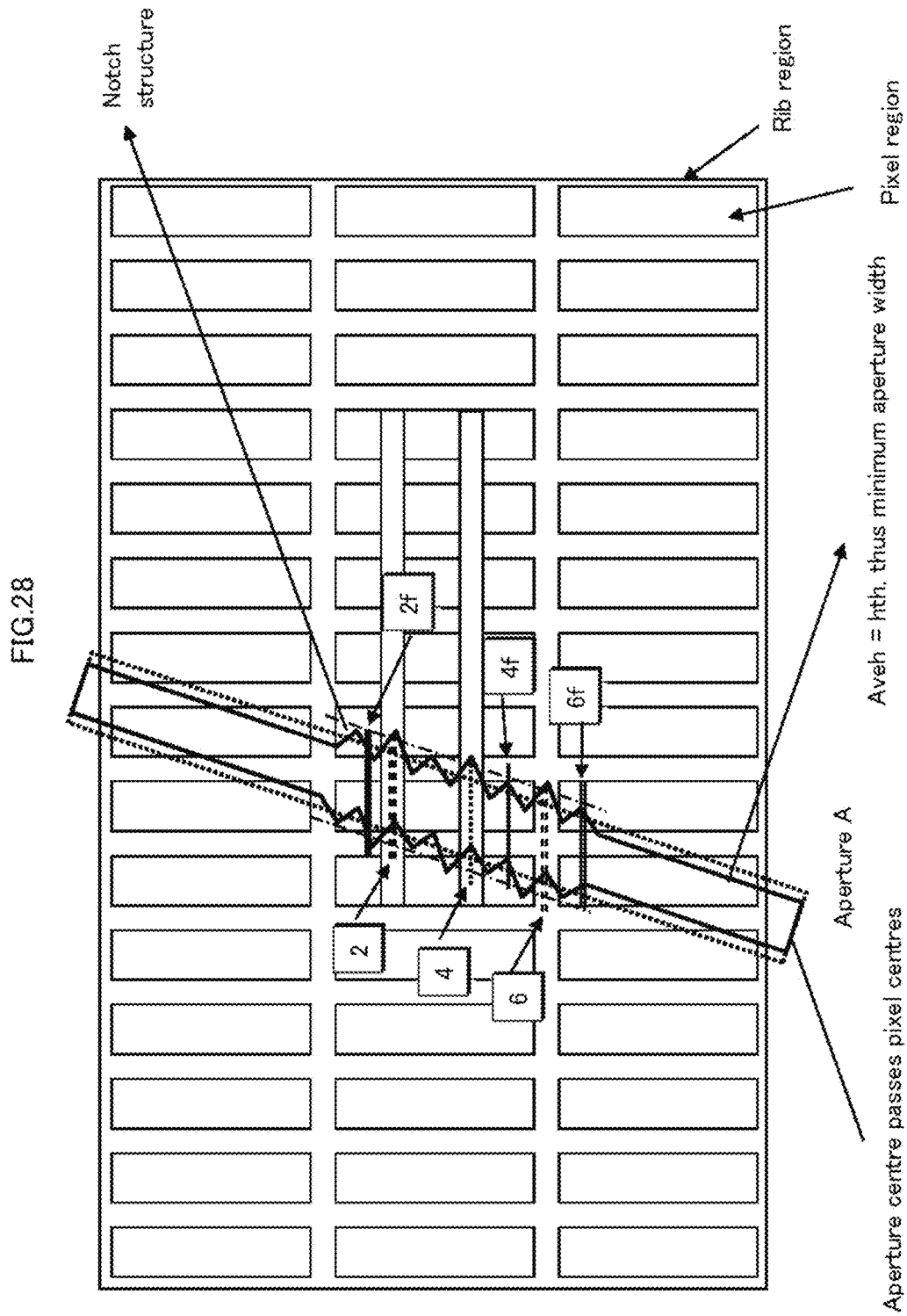
FIG. 28 illustrates a parallax barrier configured as a combination of different maximum aperture widths.

Thus, as shown in FIG. 28, there is a high probability that lacking positional relationships will occur due to the combination of different maximum aperture widths (i.e., A2, A4, and A6 appear as A2f, A4f, and A6f).

Figure 29:
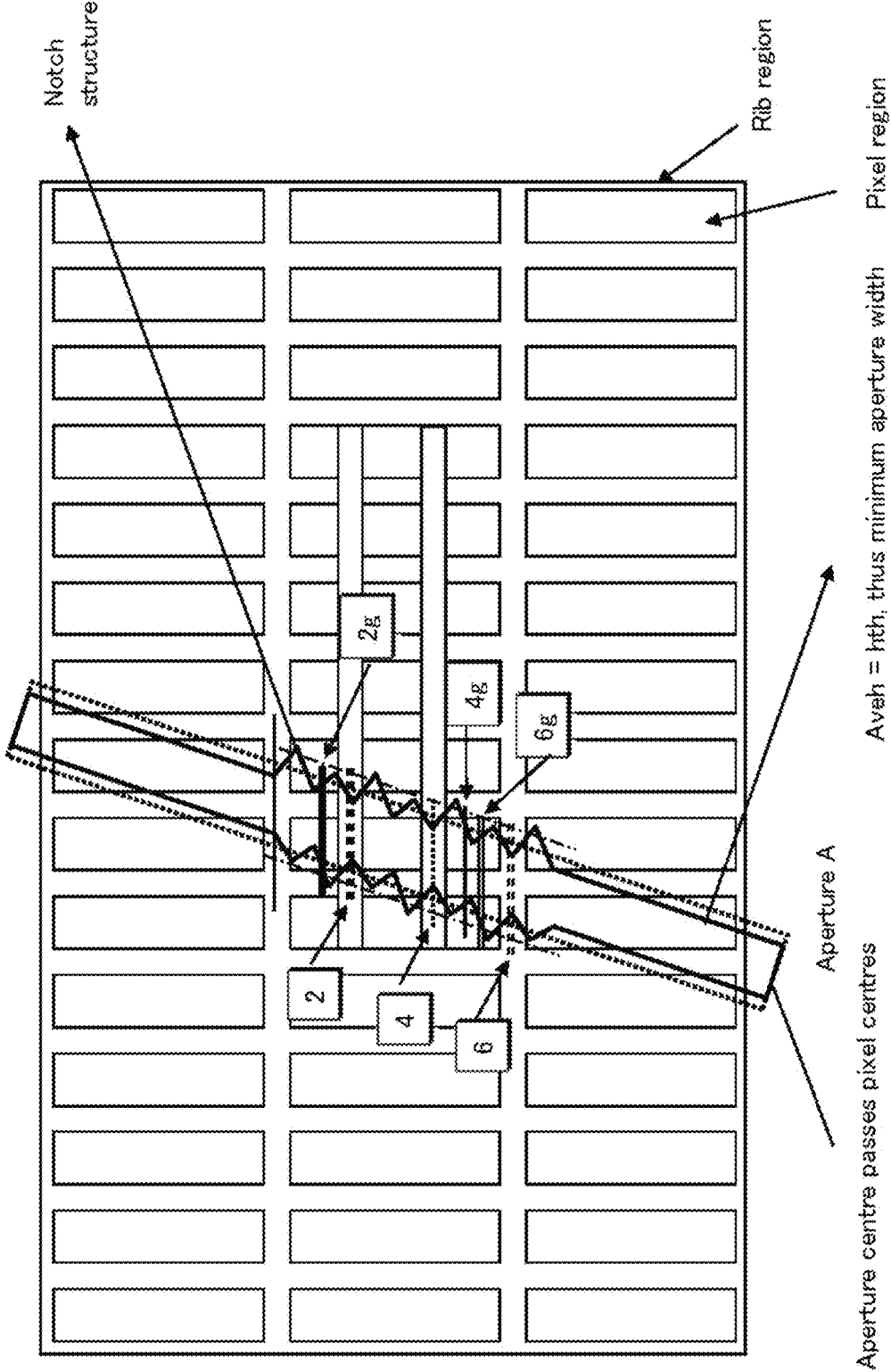
FIG. 29 illustrates a parallax barrier configured such that the leftward and rightward notch structures are out of phase by ½.

Alternatively, as shown in FIG. 29, offsetting the leftward and rightward phases by ½ (i.e., the notch structure height is offset by ds×0.5) also makes the lacking positional relationships of A2, A4, and A6 appearing as A2g, A4g, and A6g, likelier to occur.

Figure 30:
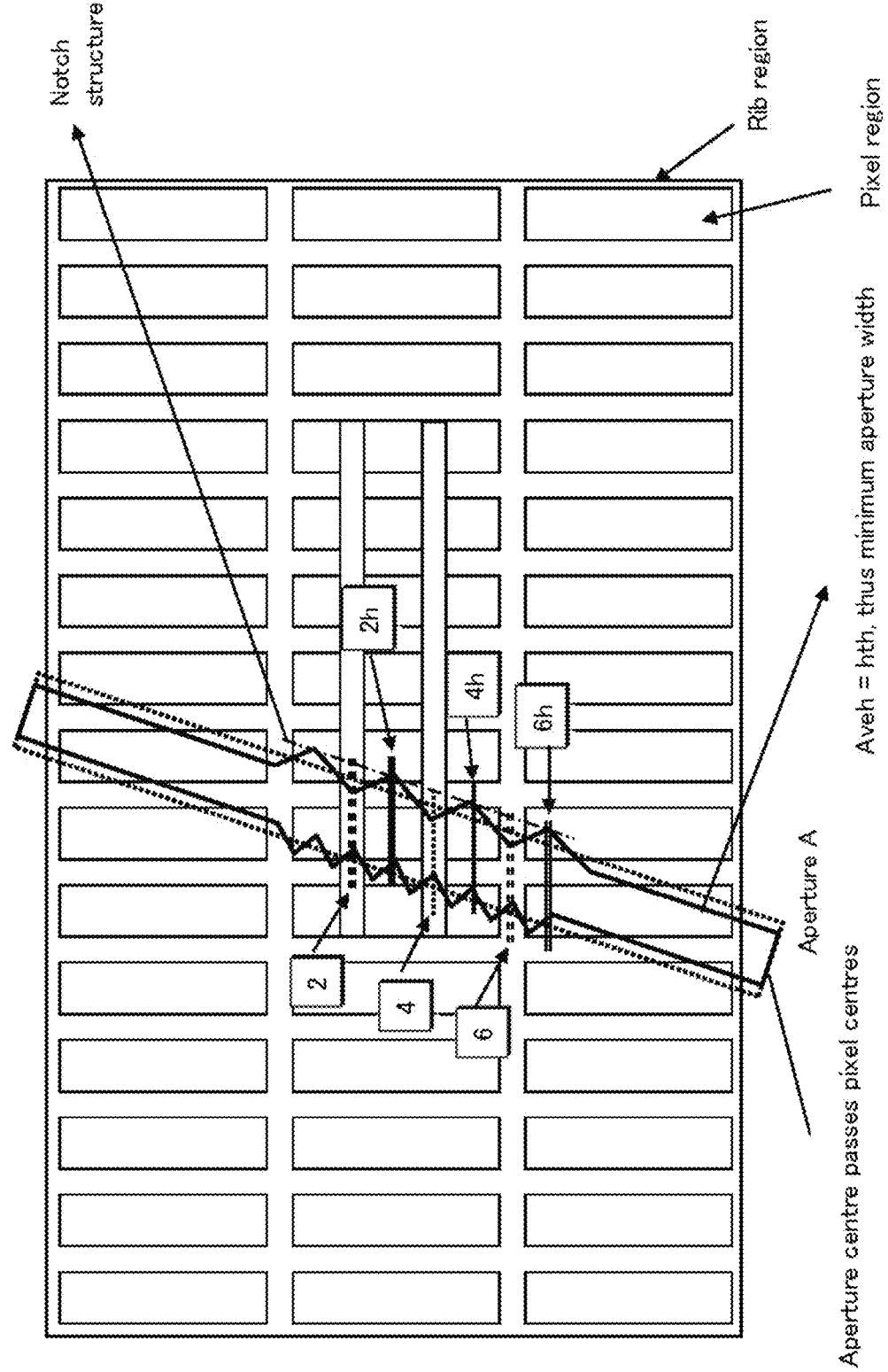
FIG. 30 illustrates a parallax barrier configured such that the number of leftward and rightward notch structures varies.

Furthermore, a phase offset may also occur when the respective numbers of left and right partitions are changed. FIG. 30 indicates such an example, where the leftward number of partitions nL is six and the rightward number of partitions nR is three. Preventing either of the leftward number of partitions nL and the rightward number of partitions nR from being integer multiples of the other is thought beneficial for ensuring that the leftward and rightward phase offset is easily produced.

Figure 31:
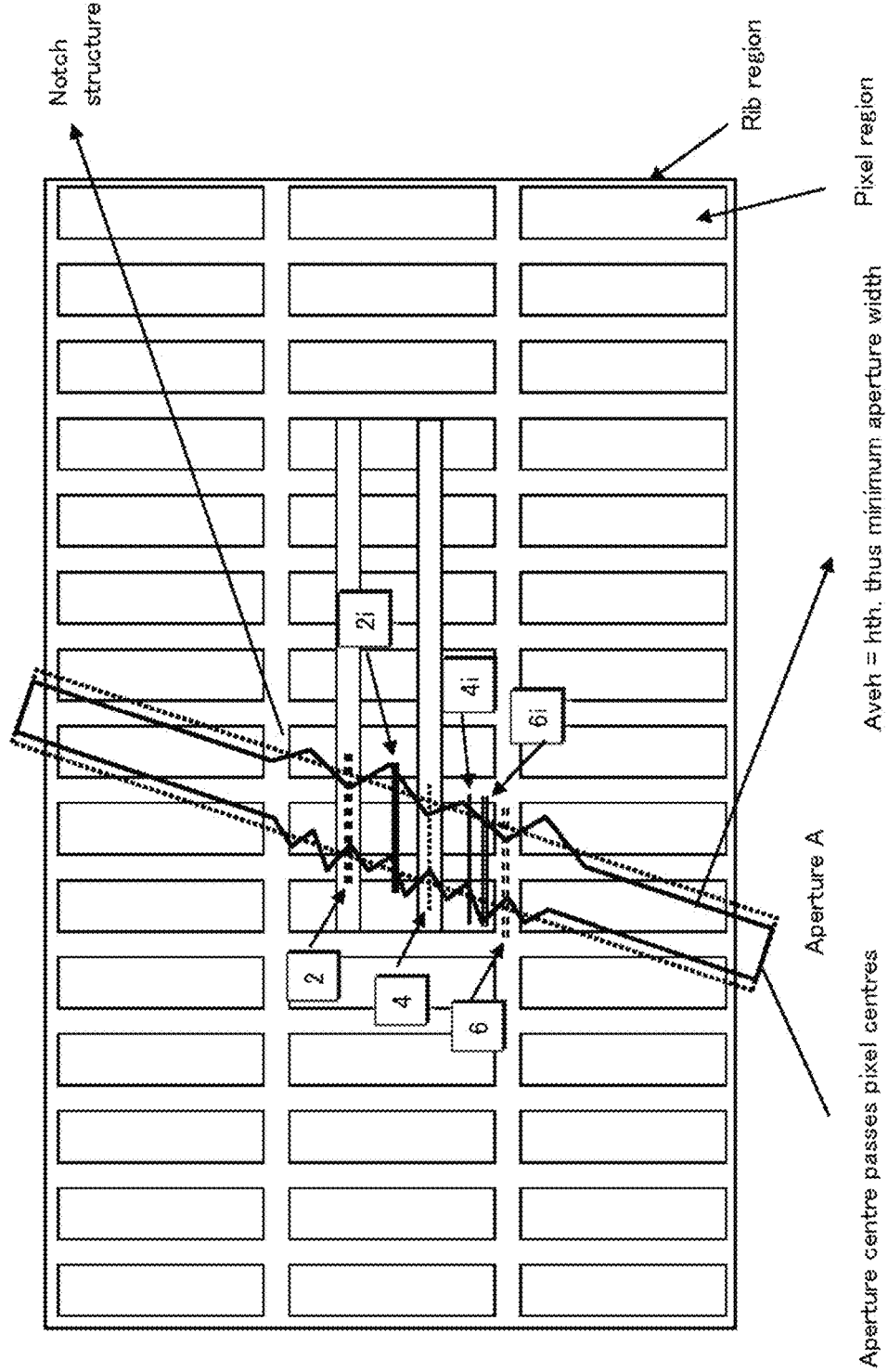
FIG. 31 illustrates a parallax barrier configured as a combination of different numbers of leftward and rightward partitions and of different maximum aperture widths.

FIG. 30, in which the leftward and rightward numbers of partitions have been changed, further shows that combining different maximum aperture widths increases the probability that locations will occur with positional relationships identical to the lacking positional relationships. FIG. 31 shows such an example. This occurs because a notch structure where the leftward and rightward sides differ in phase has the same positional relationship occur multiple times in a single pixel, and thus promotes combination and averaging of the different positional relationships within a narrow area of the pixel. Accordingly, this situation easily promotes averaging despite of the lacking areas.

Figure 32:
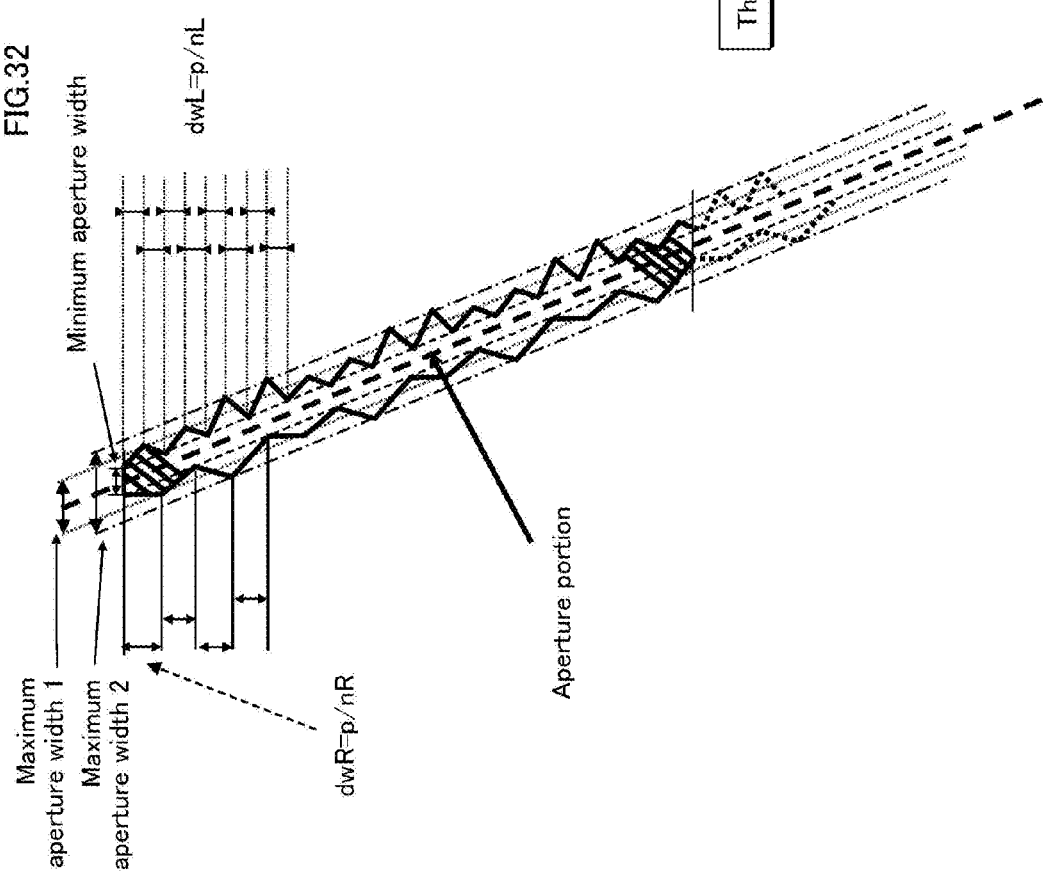
FIG. 32 illustrates an example of a parallax barrier having a notch structure that enables reduction in the Moiré pattern despite lacking portions.
Figure 33:
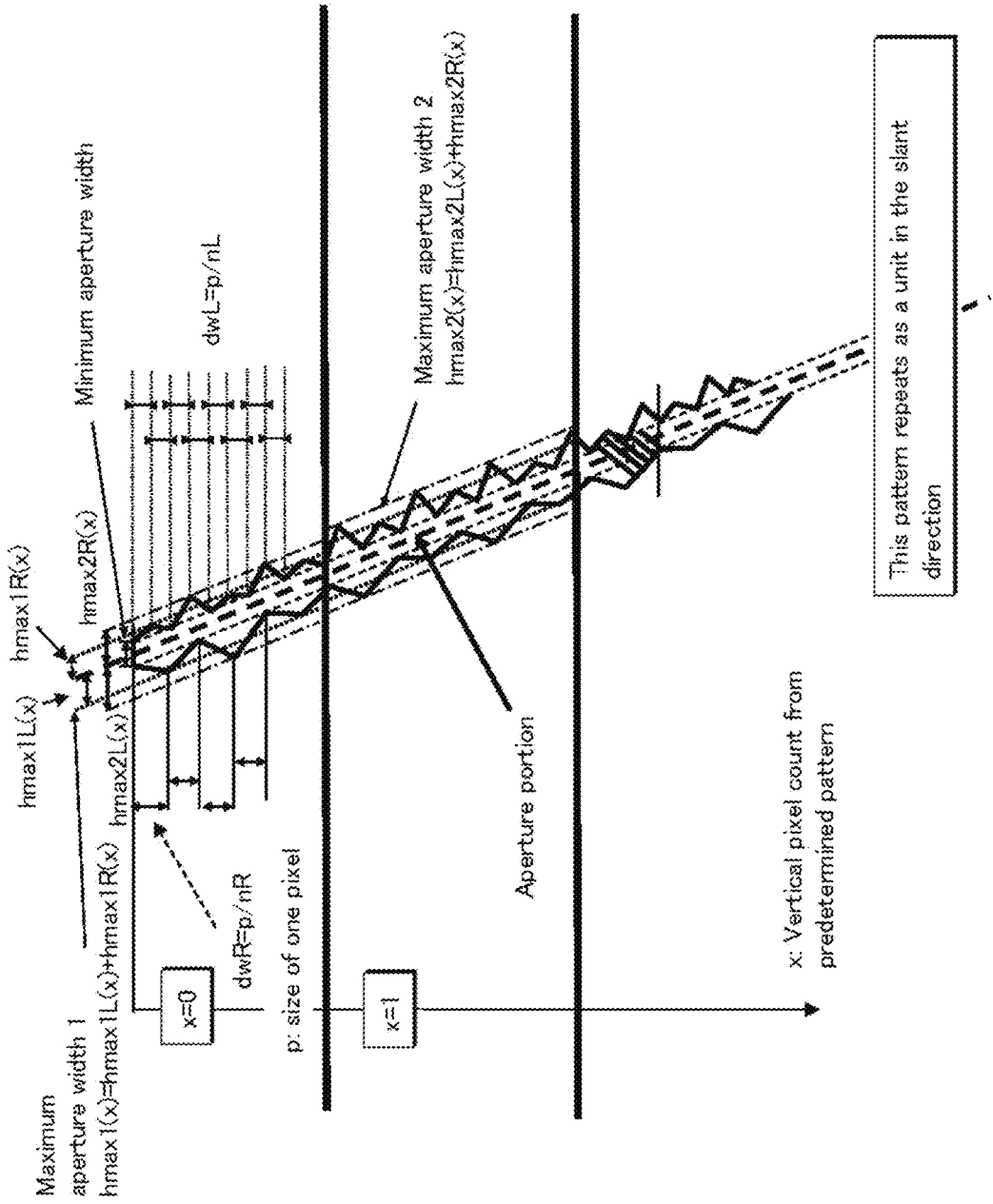
FIG. 33 illustrates another example of a parallax barrier having a notch structure that enables reduction in the Moiré pattern despite lacking portions.

FIGS. 32 and 33 each show an example of a parallax barrier having a notch structure that enables reduction in the Moiré pattern despite the presence of lacking portions. The slant orientation shown in FIGS. 32 and 33 is the opposite of that discussed thus far. This illustrates a view from the opposite side of the viewer, and is the opposite of the previous representations with respect to the lateral direction.

FIG. 32 illustrates a barrier pattern in which rhmin=0.6, nR=6, nL=11, dw1=dw×(1+krate), dw2=dw×(1−krate), and krate=0.5. Here, rhmin is a ratio relative to the sub-pixel pitch at the minimum aperture width (i.e., the minimum aperture ratio), nR is the number of notch structure partitions relative to the pitch of one vertical pixel on the rightward side, and nL is the number of notch structure partitions relative to the pitch of one vertical pixel on the leftward side. Also, dw1 and dw2 respectively represent the notch height dw for a notch slant angle of β=34°, where height dw1 is greater than height dw2. As above, dw is a height value obtained for a notch structure (with a period of six) having the same leftward and rightward widths and heights as earlier (see Math. 1). When modified such that the relation dw1+dw2=dw×2 holds, the average aperture ratio Ave_rh is computable so as to match the average aperture ratio within a one-pixel pitch when the same notch structure is added to the left and right sides.

Likewise, FIG. 33 illustrates an example of a barrier pattern that differs from FIG. 32. The notch structure shown in FIG. 33 has the maximum aperture widths hmax1 and hmax2 vary according to a pixel number x along the vertical direction. For example, the relations hmax1L[0]>hmax1R[0] and hmax2L[0]>hmax2R[0] initially hold, then as x increases, the relations change such that hmax1L[x]<hmax1R[x] and hmax2L[x]<hmax2R[x] hold. However, in order to preserve the average aperture ratio, the relations hmax1L[x]+hmax1R[x]=dw×2 and hmax2L[x]+hmax2R[x]=dw×2 are made to hold.

A notch structure as shown in FIGS. 32 and 33 is able to produce a high probability that positional relationships matching the lacking positional relationships will appear. Thus, a situation is promoted where the brightness is averaged despite the lacking regions.

Further, although the above indicates that a pattern is produced with little Moiré effect, the analysis method may also be performed on the basis of a probability that a Moiré pattern will be produced, as evaluated for the slanted barrier pattern having a predetermined notch structure. In such a situation, for example, the positional relationship distribution produced in aperture A may be compared to the positional relationship distribution in apertures B and C, the pixel region distribution produced by the positional relationship distribution in aperture A may be compared to the pixel region distribution produced by the positional relationship distribution in apertures B and C, or the brightness distribution produced by the positional relationship distribution in aperture A may be compared to the brightness distribution produced by the positional relationship distribution in apertures B and C.

(3) Variations

Although Embodiment 5 describes a configuration where the waveform is formed using the notch structure similarly to Embodiment 1, the waveform may also be formed trapezoidally, or formed of line segments that change into ovoid arcs, or formed of parallel quadrilaterals. Further, the notch structure is not limited to having the horizontal orientation shown in FIG. 2. The notch structure may also be applied to the vertical direction relative to the central axis of the barrier.

Additionally, although a slant barrier is discussed as an example, the present Embodiment is also applicable to a step barrier arranged in which rectangles of sub-pixel size are arranged diagonally.

6. Embodiment 6

Embodiment 6 describes a video display device having a parallax barrier to which a notch structure has been produced by preparing a plurality of triangular (i.e., notch structure) patterns of roughly the same pixel area as seen through the barrier at a predetermined slant, and adding diagonal stripe barriers at the reference angle of these patterns. According to this parallax barrier configuration, the lacking positional relationships are restored, the imbalance of mixed positional relationships is repaired, and the Moiré contrast is diminished with no increase in cross-talk.

The video display device configuration of the present Embodiment is similar to that of the video display device 10 described in Embodiment 1. However, the configuration of the parallax barrier in the video display device 10 differs from the configuration of the parallax barrier in the video display device pertaining to the present Embodiment.

6.1 Parallax Barrier Configuration

The following describes the configuration of the parallax barrier pertaining to the present Embodiment.

Figure 34:
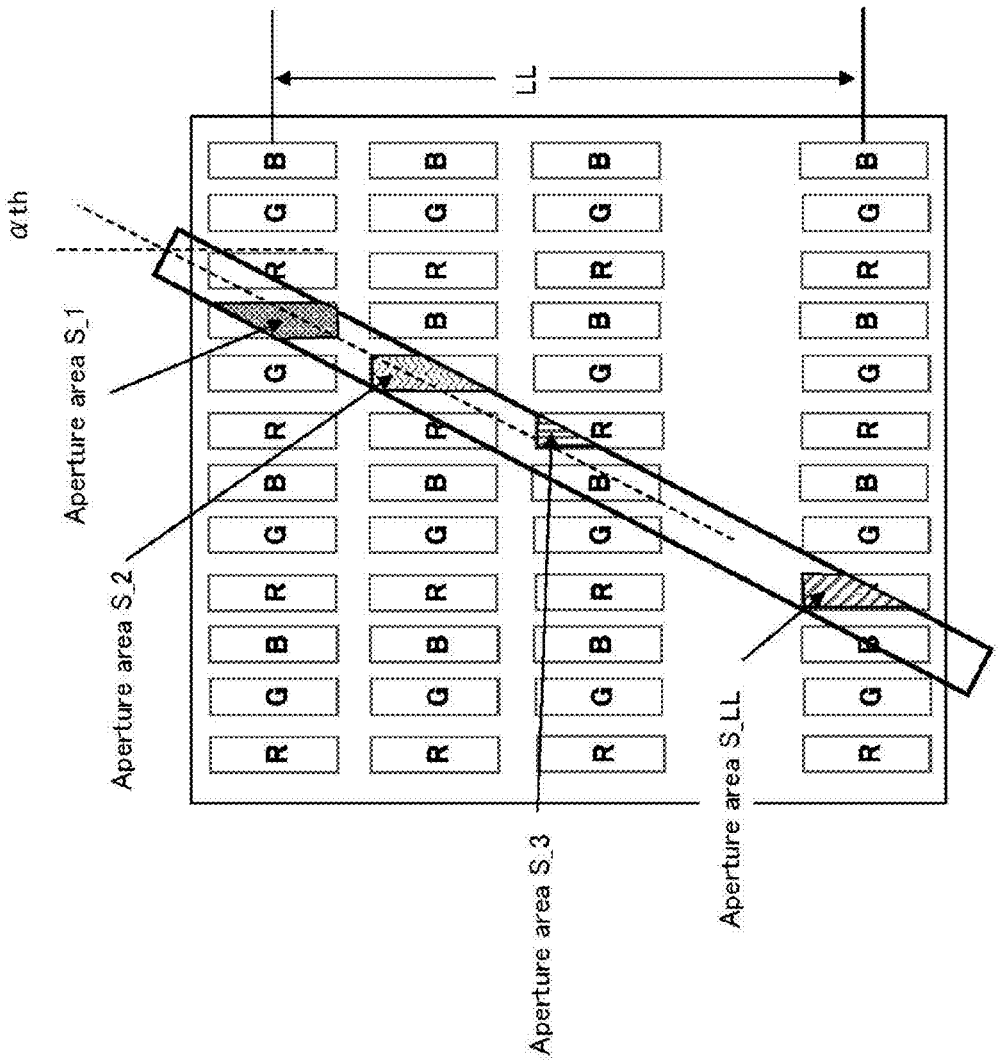
FIG. 34 illustrates an operation of applying a notch structure to a slant barrier having a slant of 18.435°.

FIG. 34 schematically illustrates an overall notch structure applied to a slant barrier having a slant of 18.435° and produced by the method of the present Embodiment, relative to a predetermined reference having little Moiré effect and a slant barrier having a slant angle α. Here, the reference example has an extremely small Moiré effect with an angle α=23°. However, the slant angle may also be other than 18.435°. FIG. 34 shows that, at this angle, a slant barrier having a predetermined aperture ratio rhth computed for an (ideal) aperture size actually suited to each individual pixel repeats with a predetermined period LL. For example, when the aperture area has been calculated for 11 pixels, the aperture ratio pattern is repeated every LL=11 pixels. In the present Embodiment, a slant barrier having the minimum aperture ratio rhmin (where α=18.435°) is calculated as an aperture area visible through the notch structure $dn\_k \times 2$ with the exception of an area covered by a single pixel, relative to an aperture area OA_k having the aperture ratio rh_k (where k=1, . . . , LL) calculated from the 11 patterns, and the aperture width dw_k for the LL notch structures is computed accordingly. Here, the number of notch structure partitions n1 within a single pixel among the LL pixels is fixed, such that the notch width ds satisfies ds=p/n1. Here, p represents the size of one pixel.

The following describes calculation operations for obtaining dw_k.

(Step 0) Compute average aperture ratios h_1, h_2, ..., h_LL for respective aperture areas S_1, S_2, ..., S_LL.

(Step 1) Calculate notch structure height dw_k (=(h_k−rhmin)/2). Here, a pixel k is assumed to have notches of height equivalent to n1 partitions at the leftward and rightward sides thereof.

(Step 2) Calculate the area Ss0 occupied within a single pixel by a slant barrier of minimum aperture ratio rhmin, and calculate the area Sn_K occupied by a notch having the width dw_k of n1 partitions.

(Step 3) Calculate average aperture ratio Aveh_k corresponding to LL according to sum (Ss0+Sn_k).

(Step 4) Use Aveh_k to correct height dw_k of LL notches.

According to the above method, a notch structure (i.e., triangular shape) having a height dw_k of n1 partitions in one pixels is distributed among LL pixels. An example is described in FIG. 35.

Figure 35:
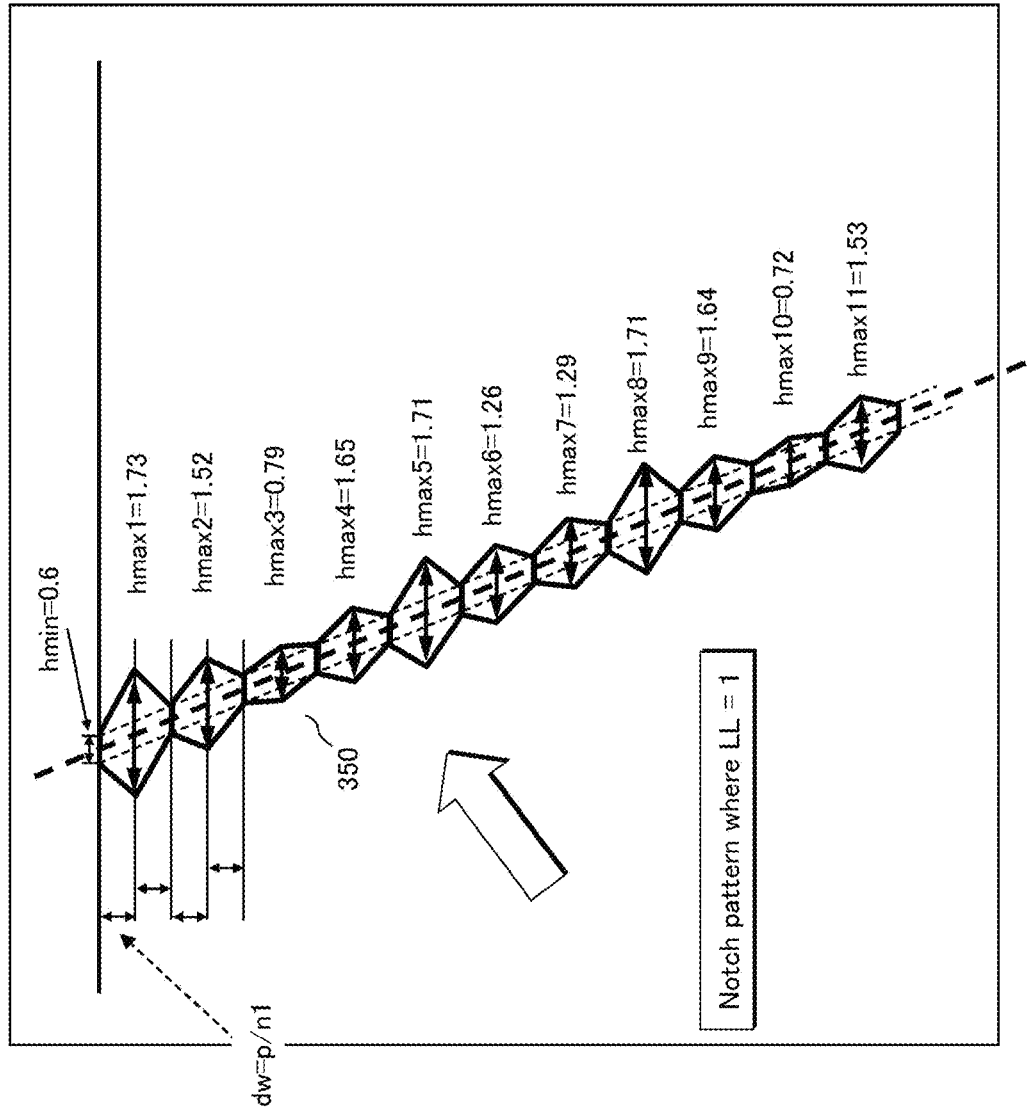
FIG. 35 illustrate an example of a parallax barrier having a pattern of LL=11 notch structures.

FIG. 35 illustrates an example in which notch structures obtained when LL=11 and for a aperture ratio occupied within the pixel with a slant barrier having a slant of 23° (i.e., the aperture ratio×1.0). Preparing the slant barrier having notch structures according to this approach enables the slant barrier having the minimum aperture ratio rhmin of a slant 3:1 (where α=18.435°) that is good for parallax image separation to have an aperture region similar to that of a slant barrier with a predetermined aperture ratio rhth for a slant of 23°. This is likely to produce Moiré characteristics approaching those of a slant barrier having the reference slant. That is, using such a notch structure enables the pixel area to be visible through the parallax barrier having a slant of 18.435° in the same way as a pixel area visible through a barrier having a slant of 23°.

The notch structure width ds is given as a vertical width. However, the width may also be measured along a slant angle θ of the barrier pattern. In such a case, the notch structure width is a value resulting from dividing ds by cos θ. Then, the average aperture ratio Ave_th is preserved at the predetermined value of rhth within the LL pixels, despite the notch structure being disposed in the slant barrier so as to repeat in units of LL notch structures with a height of LL multiples of dw_k. Here, the LL notch structures having the aperture height dw_k are arranged in predetermined order, thus preserving the predetermined value rhth of the average aperture ratio Ave_th.

Here, the notch structure having LL aperture widths is prepared and each of the LL widths is arranged in order within one pixel. However, the order may be optimised in consideration of the black matrix and auxiliary electrode positions. The method used in such circumstances may involve, as described in Embodiment 2, calculating an evaluation value through frequency analysis performed on a sample arrangement, and determining the optimal arrangement therefrom. Also, as described in Embodiment 2, a vector vp representing a plurality of sample arrangements may be initialised and used for multivariable analysis, or the LL order may be used as-is.

Also, the LL notch structures may be selected in plurality within one pixel. The count of notch structures nn[k] within the LL pixels need only be equal.

Although Embodiment 6 describes a configuration where the waveform is formed using the notch structure similarly to Embodiment 1, the waveform may also be formed trapezoidally, or formed of line segments that change into ovoid arcs, or formed of parallel quadrilaterals. Further, the notch structure is not limited to having the horizontal orientation shown in FIG. 2. The notch structure may also be applied to the vertical direction relative to the central axis of the barrier.

Additionally, although a slant barrier is discussed as an example, the present Embodiment is also applicable to a step barrier arranged in which rectangles of sub-pixel size are arranged diagonally.

7. Variations

The present disclosure has been described above with reference to the Embodiments. However, the disclosure is not limited to the Embodiments described above. For example, the following variations are also applicable.

(1) The video display unit of the video display device pertaining to the above-described Embodiments may be a liquid crystal panel using a backlight light source, a self-lighting plasma display panel (hereinafter, PDP), or an organic electroluminescence panel (hereinafter, organic EL panel). That is, applicability extends to any display means able to display a parallax image pixel array.

(2) In the above-described Embodiments, the adjustments by the barrier adjustment circuit are applicable to combination with results of detecting a head position of a viewer, obtained using a camera image or a set of two or more camera image (i.e., using head tracking). Combination with head tracking or eye tracking allows dynamic adjustments to the inter-barrier pitch or to the distance between panels and barriers. In addition to using images, another tracking method such as a time-of-flight (hereinafter TOF) method of measuring a distance by finding the TOF of light from an LED light source or the like to a target object and back again, or a method of providing a wired connection to a three-dimensional position tracker that uses electro-magnetic power or the like, may also be applied.

Also, tracking method of constantly displaying a predetermined test pattern in a user-capture area and making geometric measurements based on the size of test pattern portions, on variations in pixel value Moiré patterns, or the like.

Further, a human head is assumed to be detected in the detection of the head position. However, a person's full body may also be detected, or alternatively, a pupil or eye region may be extracted and used for tracking.

When the pixel arrangement of a plurality of parallax images is controlled in response to the head position, a central processing unit (hereinafter, CPU), a graphics processing unit (hereinafter, GPU) may be used for real-time calculation control, or a look-up table may be prepared in advance and used for selection control.

Further, in the Embodiments, the barrier formation positions and pitch spacing are fixed aside from initial adjustments. However, active variation of these attributes may also be performed in response to the detected head position. In such a case, a device that is able to change the screens and apertures (i.e., the optical transmittance) in response to application of voltage or similar (e.g., a thin-film transistor LCD panel) is used as the barrier. This also enables simultaneous depth variations to be performed for a plurality of viewers. This is also applicable to a barrier position or barrier pitch fixed when the video display device is first installed in a living room or similar spatial setting.

(3) The analyser of Embodiment 2 may be combined with another Embodiment in order to perform an evaluation of the barrier pattern added to the notch structure of the other Embodiment. Also, the barrier pattern candidates obtained in each Embodiment may be used for Moiré pattern estimation and evaluation by the estimated pattern generator described in Embodiment 2.

(4) The number of notch structure partitions n is not limited to being an integer, and may also include a decimal portion. That is, the notch width and pixel pitch need not be related values.

Figure 36:
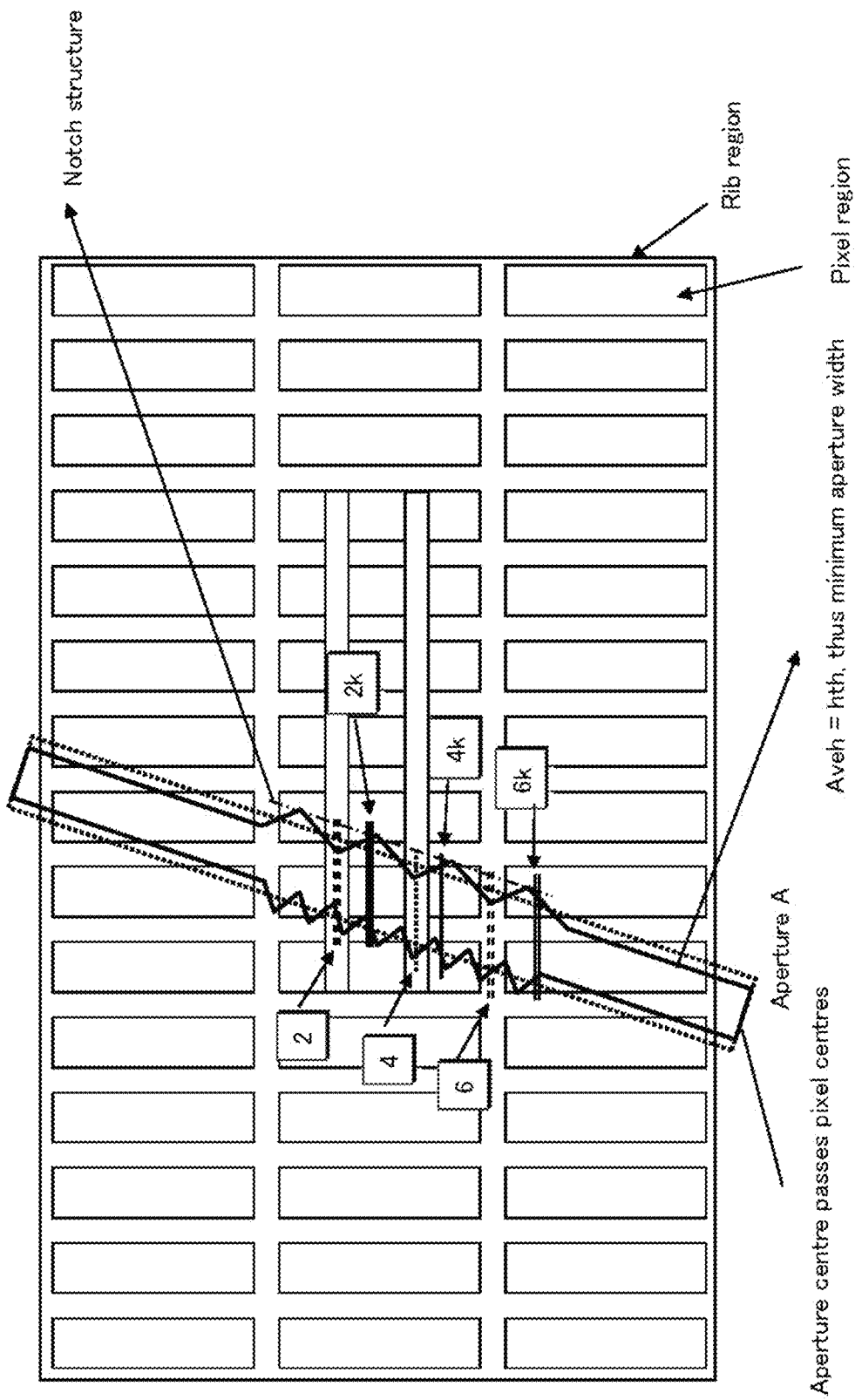
FIG. 36 illustrates an example of a notch structure when n=6.5.

Specifically, the pixel pitch, the rightward notch width, and the leftward notch width need not be related values. FIG. 36 illustrates an example of a notch structure where n=6.5, as a variant of Embodiment 5. The same also holds for Embodiments 3 and 4.

Figure 37:
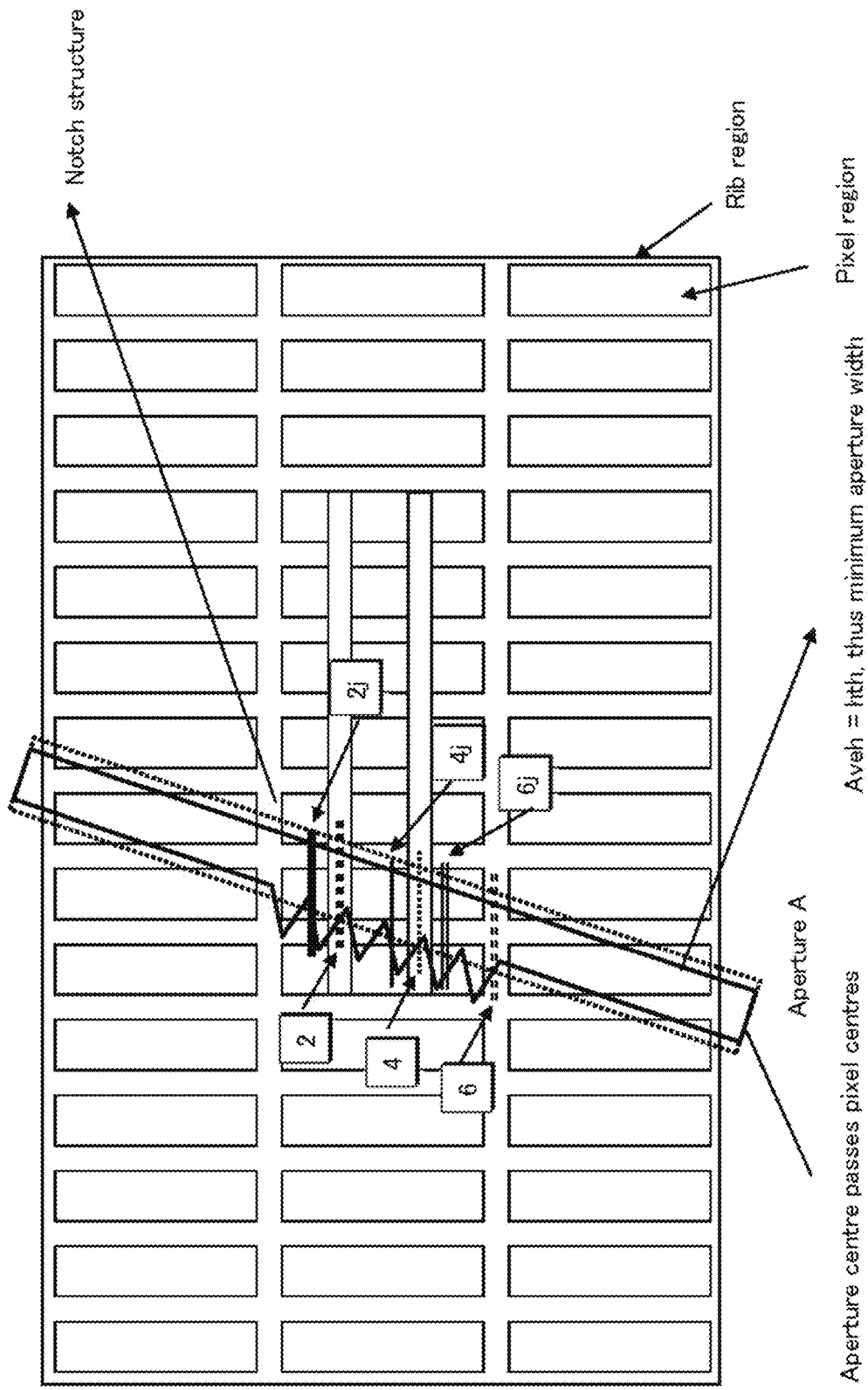
FIG. 37 illustrates an example in which only the leftward side has a notch structure.
Figure 38:
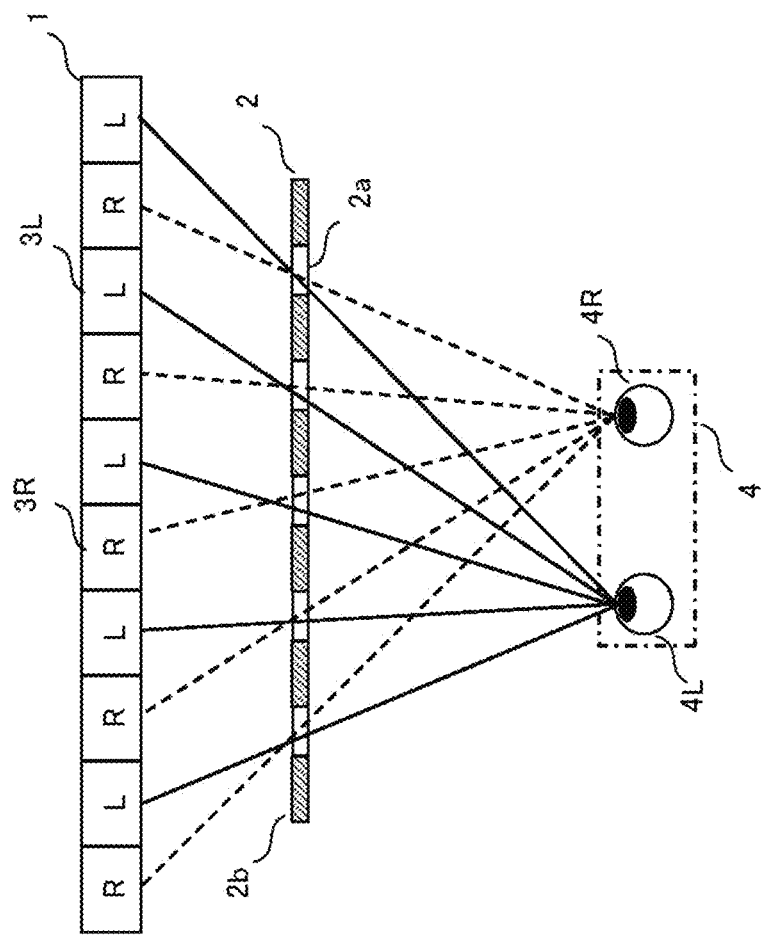
FIG. 38 illustrates the principle of a stereoscopic video display device that uses a parallax barrier and no glasses.

Further, the notch structure need not necessarily be applied to both edges of the aperture portion, provided that the notch structure is applied to at least one edge thereof. FIG. 37 illustrates an example of a notch structure where only the left side has a notch structure, as a variant of Embodiment 5. The same also holds for Embodiments 3 and 4.

(5) In Embodiments 2 through 6, the notch structure height and width are indicated as being uneven. However, this is intended to indicate that, for example, notches having a plurality of different heights or different widths are combined.

(6) In Embodiments 1 through 6, the method indicates determining the notch structure using the sub-pixel configuration as a reference. However, no such limitation is intended.

The notch structure determination may instead be based on a minimum structural unit of the pixels. For example, the structure of a pixel made up of a plurality of sub-pixels may serve.

(7) In Embodiment 2, described above, the video display device 10A stores a plurality of barrier parameters in the barrier parameter storage 202 in advance. However, no such limitation is intended.

The video display device 10A may also be configured not to store the plurality of barrier parameters in advance. In such a case, the video display device 10A receives the barrier parameters through a user operation when performing barrier adjustment. The evaluation is then performed using the received barrier parameters, and the viewer is notified of the results. When the viewer determines that the evaluated results are not proper, different barrier parameters are input via an operation, and the evaluation is performed again. Accordingly, the viewer is able to set the parallax barrier according to preferred barrier parameters.

Also, the viewer may input a plurality of barrier parameters. In such a case, the video display device 10A performs an evaluation for each set of received barrier parameters, specifies optimal evaluation results from among all results, and sets the parallax barrier according to the specified results.

(8) In the above-described Embodiments, no particular limitation is intended regarding the view number, provided that the view number is greater than or equal to two. Here, the image displayed by the liquid crystal panel or the like includes a pixel column of one image and pixel columns of a plurality of parallax images corresponding to the image are arranged in a predetermined order.

(9) In the above-described Embodiments, the parallax barrier is assumed to be disposed at the front of a display device such as an LCD panel. However, no such limitation is intended.

The parallax barrier may also be disposed at the back of the LCD panel, at the front of a back light. In such a case, the light of the back light passes through to cause the video display device to perform stereoscopic display.

(10) The video display device of each Embodiment is not limited to displaying stereoscopic video. Light for a left-view video and for a right-view video of plurality of stereoscopic images is made to pass using a passing region, thus displaying different images according to the viewing position of the user.

(11) In Embodiment 3, a notch structure is added so as to scatter, without concentration, the concentric relationships between apertures and pixels in the same manner as a barrier pattern having a slant of α=18.435° (hereinafter, first slant) on a barrier pattern having a slant of α=23° (hereinafter, second slant). That is, the notch structure is added in order to reduce the Moiré pattern. Here, the first slant is an angle having minimum cross-talk and the second slant is an angle having a small Moiré pattern (i.e., a minimum-intensity Moiré pattern).

However, the first slant and the second slant are not limited to the above-given angles.

The first slant and the second slant are angles such that that the cross-talk produced by the first slant is less than the cross-talk produced by the second slant, and such that the intensity of the Moiré pattern produced by the second slant is less than the intensity of the Moiré pattern produced by the first slant.

(12) In the above-described Embodiments, the notch structure width ds and height dw are respectively defined as the vertical length of the notch structure and the horizontal length of the notch structure (see FIG. 2). However, no such limitation is intended.

The notch structure width ds and height dw may also be defined as the respective height and bottom of the triangles forming the notch structure.

(13) In the above-described Embodiments, the waveform is formed for all passing regions provided in the parallax barrier. However, no such limitation is intended.

The waveform may be formed for at least one passing region, at a pair of longitudinal sides forming the passing region or at only one such longitudinal side. Furthermore, the waveform may be formed identically for all units (notch structures), or may include two units that differ in terms of wave width or height.

In addition, the passing regions having the waveform on a longitudinal side thereof may be disposed at predetermined intervals. Here, the predetermined interval is an integer multiple of the pixel pitch. For example, when the predetermined interval is 100% of the pitch, then as described above, the passing regions having the waveform formed thereon are continuous. That is, the waveform is formed on the longitudinal side of all of the passing regions. When the predetermined interval is an Nth multiple of the pitch (N being an integer greater than or equal to two), and the waveform is formed at the longitudinal side of a pth (p being an integer greater than or equal to one) passing region, the next passing region having the waveform formed thereon is the (p+N)th region.

Alternatively, the waveform may be formed at the longitudinal side of every passing region included in a region within the display region of the LCD panel where the stereoscopic image (i.e., the plurality of parallax images) is to be displayed.

(14) In the above-described Embodiments, the waveforms are described as being formed of triangular notch structures. However, no such limitation is intended. The waveforms may instead be formed from a continuous pattern of sawtooth waves, barrel waves, step waves, sine, cosine, tangent or other trigonometric waves, or may be rectangular, trapezoidal, quadrilateral, angular, or crescent-shaped waves. The individual units making up the waveform are termed wave units.

The wave units of the present disclosure are structural elements of the edges (i.e., longitudinal sides) of the passing region, each shaped to have a line (straight or curved) extending away from a central axis of the passing region and a line (straight or curved) approaching the central axis generally continuing such that a concavity on one side of the central axis is opposite a concavity on the other side of the central axis. The wave units included in the waveform formed on the longitudinal side of a given passing region may be uniform and share a common dimension (i.e., the width and height of each unit being identical). Alternatively, individual units of a common waveform may be of different sizes (i.e., the width and height may differ among units). Alternatively, a variety of different forms may be used.

Here, the width of the wave units (i.e., the wave width) may be defined by taking the distance from a point (a first point) nearest the central axis along the line extending away from the central axis, to another point (a second point) nearest the central axis along the line approaching the central axis, or by multiplying this distance by cosθ, according to the slant θ of the passing region. Also, the height of the wave units is defined by the length of a vertical line extending from the concavity to a line segment joining the first and second points, or by a horizontal line (parallel to the horizontal line of the parallax barrier) extending from the concavity to said line segment. The respective wave widths and wave heights of the present disclosure are given in terms of unit wave widths and heights.

(15) The waveform described in Embodiment 5, above, is described as being made from a notch structure not formed of horizontal and vertical lines. However, no such limitation is intended.

The waveform of Embodiment 5, above, may also be formed of a plurality of unit waves as defined above, provided that at least one such wave unit does not include horizontal lines or vertical lines.

The resulting waveform thus differs from the stripe barrier shape.

Figure 43:
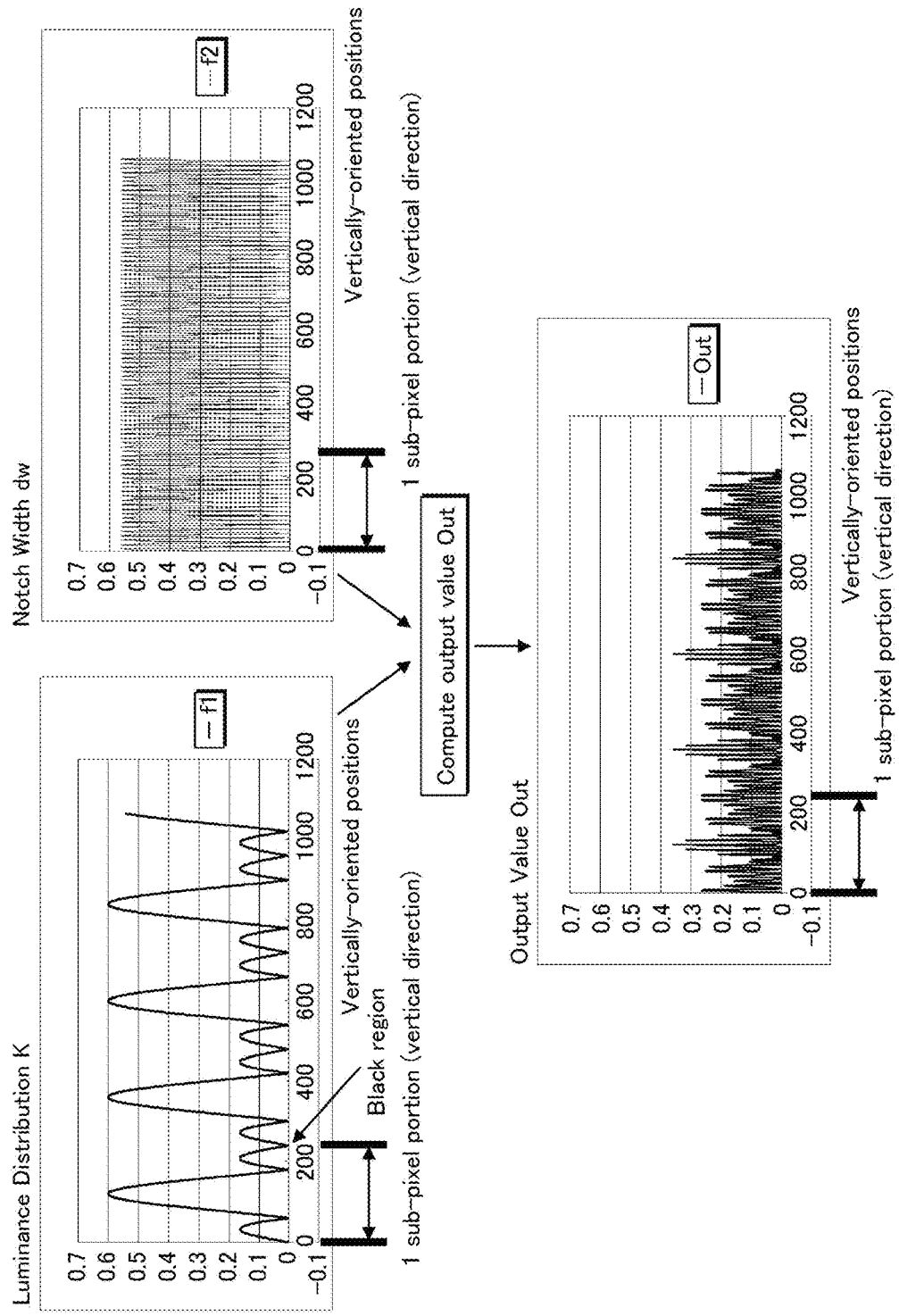
FIG. 43 illustrates conditions for determining a number of wave units included in a range corresponding to a single pixel from among a pluirality of continuously-formed wave units.

(16) Within the plurality of continuous unit waves described above, the number of unit waves in a range corresponding to one pixel is greater than sum of bright portion regions and dark portion regions. However, the following conditions may also apply to beneficial effect. FIG. 43 shows such an example. As shown, a periodic frequency f1 approximates a pixel brilliance distribution repeated periodically over each pixel arranged in the vertical direction, and a periodic frequency f2 indicates a notch width that is periodic with respect to the vertical direction. The correlation Out (e.g., a product, a squared difference, or similar) is computed using these two periodic frequencies. The correlation value Out indicates the interference between the pixels and the notch structure in the vertical direction. The value of the correlation value Out may be taken into consideration as the influence of the notch structure itself on the pixels. In such circumstances, there is a probability that interference lines (i.e., horizontal stripes) are produced by the notch structure itself when the correlation value Out computed for the vertical direction has a relatively large period, like a roar (or alternatively, has a slow period). This probability is of particular concern when the auxiliary electrode region is large relative to the pixel size or pixel portion, and when the selected notch structure has a rather large width. In order to suppress the interference from the notch structure, the correlation value Out is beneficially not a value having a low frequency variable over a large period, but is rather a comparatively even value, or has only short-variation high-frequency components. According to the above, taking the suppression of interference lines produced by the notch structure into consideration is beneficial when selecting a number of wave units among a plurality of wave unit candidates chosen in order to cancel out the Moiré pattern produced by interference between black regions and apertures in a pixel, so that the selected wave units have a correlation value Out that is comparatively even or that has only short-variation high-frequency components.

(17) The above-described Embodiments and Variations may be freely combined.

8. Other

According to Embodiment 1, the parallax barrier is made to have a barrier pattern that has fine notch structure that varies laterally in terms of periodic aperture width, such that pixels visible through waveform apertures of the barrier are subject to blur magnitude and range control. This approach enables a reduction in Moiré pattern contrast with no increase in cross-talk.

According to Embodiment 2, the parallax barrier has a notch structure added thereto that is set by taking into consideration a predetermined amount of manufacturing error derived from barrier mask pattern manufacturing. Accordingly, the influence of manufacturing error from the mask pattern is overcome while providing the reduction in Moiré pattern contrast with no increase in cross-talk. Also, the frequency characteristics of a Moiré pattern estimated from notch structure realization parameters are compared to the frequency characteristics of a Moiré pattern obtained from a barrier having a predetermined reference angle, and the comparison is used to estimate optimal parameters for the notch structure that is applied. Accordingly, the Moiré pattern obtained for each parameter is quantitatively evaluated, and the evaluation serves as the basis for the reduction in Moiré pattern contrast with no increase in cross-talk.

According to Embodiment 3, the parallax barrier has a notch structure in which the proportion of pixel region visible through the aperture portions is as even as possible across the barrier positions aligned in the horizontal direction. This enables the reduction in Moiré pattern contrast with no increase in cross-talk.

According to Embodiment 4, the parallax barrier has a notch structure added thereto that compensates for an imbalance in positional relationships of the apertures, pixel regions, and black matrix occurring when there is a lack due to black portions or intra-pixel electrodes. This enables the reduction in Moiré pattern contrast with no increase in cross-talk.

According to Embodiment 5, the parallax barrier has a unit structure made up of a pixel group that is in-phase with respect to the leftward and rightward notch structures and a plurality of pixel groups that are out of phase with respect to the pattern phase, in terms of the barrier pattern. Repeating this pattern enables the reduction in Moiré pattern contrast with no increase in cross-talk.

According to Embodiment 6, a plurality of patterns having triangles substantially equivalent to the pixel area visible through a barrier having a predetermined slant are prepared, and the plurality of patterns are added to a stripe barrier oriented obliquely at a reference angle. This produces a notch structure applied to the barrier pattern that approximates a predetermined barrier, thus enabling the reduction in Moiré pattern contrast with no increase in cross-talk.

9. Supplement (1) In one aspect of the present disclosure, a video display device displays multiple-parallax video using a parallax barrier method, the video display device comprising: a display unit displaying pixel columns of a given image and pixel columns of one or more parallax images corresponding to the given image, all of the pixel columns being arranged in predetermined order; and a parallax barrier arranged at a predetermined distance from an image display face of the display unit, and having a plurality of elongated passing regions passing light rays from the display unit, wherein at least one of the passing regions has a waveform formed at a longitudinal edge thereof, and at least one waveform includes two wave units that differ in terms of wave height or wave width.

According to this configuration, the passing regions of a parallax barrier in a video processing device have two different wave units that differ in width or in height. Thus, the width or the height of wave units differ at positions of the passing regions appearing to bright and dark, enabling adjustments to the pixels hidden by the wave units. This enables the Moiré pattern to be reduced with no increase in cross-talk.

(2) In another aspect of the present disclosure, a video display device displays multiple-parallax video using a parallax barrier method, the video display device comprising: a display unit displaying pixel columns of a given image and pixel columns of one or more parallax images corresponding to the given image, all of the pixel columns being arranged in predetermined order; and a parallax barrier arranged at a predetermined distance from an image display face of the display unit, and having a plurality of elongated passing regions passing light rays from the display unit, wherein a region of a given pixel included in one of the pixel columns has bright portions and dark portions oriented vertically and repeating in alternation, and one of the passing regions passing the light rays from the display unit displaying the given pixel has a plurality of continuously-formed wave units at a longitudinal edge thereof, and a quantity of wave units, among the plurality of continuously-formed wave units included in a range corresponding to the given pixel, is greater than a total quantity of the bright portions and the dark portions.

According to this configuration, the quantity of wave units corresponding to a display region of one pixel in the passing regions of the parallax barrier in the video display device is greater than a sum of bright regions and dark regions. Thus, a plurality of passing regions are created, each having a width substantially similar to the width of the individual bright regions and dark regions. As such, a dark region in one pixel are complemented by a bright pixel having a passing width substantially similar to the width of the dark portion. That is, the parallax barrier is able to reduce the Moiré pattern with no increase in cross-talk.

(3) In a further aspect of the present disclosure, a video display device displays multiple-parallax video using a parallax barrier method, the video display device comprising: a display unit displaying pixel columns of a given image and pixel columns of one or more parallax images corresponding to the given image, all of the pixel columns being arranged in predetermined order; and a parallax barrier arranged at a predetermined distance from an image display face of the display unit, and having a plurality of elongated passing regions passing light rays from the display unit, wherein at least one of the passing regions has a waveform formed at a longitudinal edge thereof, one longitudinal edge and another longitudinal edge in a pair of longitudinal edges of the passing region respectively including wave units that differ in terms of wave height or wave width.

According to this configuration, two different wave units in a pair of longitudinal edges of a passing region differ in terms of wave width and height, enabling adjustments to the pixels covered by these wave units. Thus, the parallax barrier is able to reduce the Moiré pattern with no increase in cross-talk.

(4) In an additional aspect of the present disclosure, a video display device displays multiple-parallax video using a parallax barrier method, the video display device comprising: a display unit displaying pixel columns of a given image and pixel columns of one or more parallax images corresponding to the given image, all of the pixel columns being arranged in predetermined order; and a parallax barrier arranged at a predetermined distance from an image display face of the display unit, and having a plurality of elongated passing regions passing light rays from the display unit, wherein at least one of the passing regions has a waveform formed at a longitudinal edge thereof, one longitudinal edge and another longitudinal edge in a pair of longitudinal edges of the passing region having waveforms that are out of phase, and at least one wave unit of the respective waveforms not including at least one of horizontal lines and vertical lines.

According to this configuration, the two waveforms of a pair of longitudinal edges of the passing region are not in phase, enabling adjustments to the pixels covered by these wave units. Thus, the parallax barrier is able to reduce the Moiré pattern with no increase in cross-talk.

(5) In yet another aspect, among the passing regions, a pixel proportion passed by a first passing region and a pixel proportion passed by a second passing region are substantially identical.

According to this configuration, the parallax barrier of the video display device has first and second passing regions in which the respective ratio of passed pixels is approximately identical. Thus, the brightness of the first passing region and the brightness of the second passing region are substantially similar. Thus, the parallax barrier is able to reduce the Moiré pattern with no increase in cross-talk.

(6) In yet a further aspect, among the passing regions, a position of a pixel region passed by a first passing region and a position of a pixel region passed by a second passing region are substantially identical.

According to this configuration, the parallax barrier of the video display device has first and second passing regions in which the respective positions of passed pixels are approximately identical. Thus, the brightness of the first passing region and the brightness of the second passing region are substantially similar. Thus, the parallax barrier is able to reduce the Moiré pattern with no increase in cross-talk.

(7) In still another aspect, the passing regions have a first slant with respect to a vertical direction, a total pixel area passed by each of the passing regions is substantially equal to a total pixel area passed by a reference passing region made up of elongated shapes having a second slant, and the first slant is an angle such that less cross-talk is produced by the first slant than by the second slant, and such that greater Moiré pattern intensity is produced by the first slant than by the second slant.

According to this configuration, the parallax barrier of the video display device has passing regions each having a first slant, and a total surface area of pixels passed through a reference passing region having the second slant is approximately equal for each of the passing regions. The Moiré pattern intensity produced by each passing region is thus made substantially similar to the Moiré pattern intensity of the reference passing region.

(8) Furthermore, the first slant is an angle minimising cross-talk, and the second slant is an angle minimising Moiré pattern intensity.

According to this configuration, the first slant is at an angle producing minimal cross-talk, and the second slant is at an angle producing minimal Moiré pattern intensity. Thus, the cross-talk occurring in the passing regions is minimized, while the Moiré pattern intensity remains minimal.

(9) Further still, for each of the passing regions, height and width dimensions of the wave units are determined using frequency characteristics of a Moiré pattern obtained for a reference passing region made up of elongated shapes having a predetermined angle with respect to the vertical direction of the parallax barrier that minimises the Moiré pattern intensity.

According to this configuration, frequency characteristics obtained from a reference passing region that minimises the Moiré pattern are used to determine a width and height for a wave unit of the passing regions in the parallax barrier of the video display device. As such, the width or the height of the wave unit of the passing regions is determined by obtaining frequency characteristics of each passing region with respect to a reference passing region having a minimum Moiré pattern. This enables the Moiré pattern to be minimised.

(10) Additionally, the wave unit of the waveform is a notch structure formed as a triangle, the wave width is a length of a bottom edge of the triangle forming the notch structure, or is a vertical length of the notch structure, and the wave height is a height of the triangle forming the notch structure, or is a horizontal length of the notch structure.

According to this configuration, the wave units are triangular, which simplifies manufacturing through the absence of curves.

(11) Still further, the passing regions each have slant of 0 degrees with respect to a column orientation, the range corresponding to the given pixel is a unit length calculated as a columnar length of the region of the given pixel, divided by cos θ, and the quantity of the wave units included in the range is determined by taking, as the wave width, a value smaller than a result of dividing a unit length by 2t+1, which is obtained by adding a bright portion quantity t to a dark portion quantity t+1.

According to this configuration, waveform passing regions in which bright portions and dark portions are repeated and overlaid on pixels occur with a higher quantity of waveforms than bright potions in the pixels, so as to average out the brightness and darkness across pixels.

(12) Yet further, two or more of the passing regions have a waveform formed thereon that includes the two wave units differing in terms of wave height or wave width, and the two or more passing regions are arranged at a predetermined separation.

According to this configuration, a waveform including two or more wave units that differ in terms of height or width is formed in two or more passing regions, and the two or more waveforms are disposed with a predetermined separation, enabling adjustments to the pixels regularly hidden by the unit waves. Thus, the Moiré pattern is reduced with no increase in cross-talk.

(13) In further addition, two or more of the passing regions have a waveform formed thereon that includes the two wave units differing in terms of wave height or wave width, and the two or more passing regions are arranged in a region of the parallax barrier corresponding to a partial region for displaying the multiple-parallax video, which is part of a display region of the display device.

According to this configuration, the passing regions where the waveform including two wave units that differ in terms of width or height are arranged according to a partial region for displaying a plurality of parallax videos. Thus, the partial region is adjustable in terms of the pixels hidden by the unit waves, enabling the Moiré pattern to be diminished without increasing the cross-talk.

INDUSTRIAL APPLICABILITY

According to the present disclosure, a parallax barrier pattern is realised that is able to decrease the Moiré pattern with no increase in cross-talk, and provides a video display device that includes such a parallax barrier. Also, the video display device of the present disclosure is applicable to a device for naked-eye viewing of stereoscopic video.

REFERENCE SIGNS LIST

10 Video display device
100 Video display unit
101 Parallax barrier
105 Initial adjustment unit
106 Barrier adjustment circuit
107 Display circuit
108 Storage medium
200 Moiré pattern evaluator
201 Parallax barrier
202 Barrier parameter memory
210 Estimated pattern generator
211 Reference data memory
212 Analyser
213 Evaluation value calculator
214 Optimal barrier parameter specifier

The invention claimed is:

1. A video display device displaying multiple-parallax video using a parallax barrier method, the video display device comprising:

a display unit displaying pixel columns of a given image and pixel columns of one or more parallax images corresponding to the given image, all of the pixel columns being arranged in a predetermined order; and a parallax barrier arranged at a predetermined distance from an image display face of the display unit, and having a plurality of elongated passing regions passing light rays from the display unit, wherein at least one of the passing regions has a waveform formed at a longitudinal edge thereof, and at least one waveform includes two wave units that have different lengths in a vertical direction, and a length of at least one of the wave units in the vertical direction is shorter than a length of a pixel in the vertical direction.

2. The video display device of claim 1, wherein each of the wave units is formed from a first straight portion leading away from a central axis in the longitudinal direction of the passing regions and a second straight portion leading towards the central axis that is continuous with the first straight portion, length in the vertical direction of each of the wave units is a distance in the vertical direction from a point on the first straight portion that is closest to the central axis to a point on the second straight portion that is closest to the central axis, and this distance is shorter than length of a pixel in the vertical direction.

3. The video display device of claim 1, wherein
a length dw of a wave unit in a horizontal direction is defined as dw=0.5×dS×(1/tan β+tan α)

where dS=P/N, P is the length of a pixel in the vertical direction, N is a number of wave units in the pixel, β is an angle between an edge of the wave unit and the horizontal direction, and α is an angle between a central axis in the longitudinal direction of the passing region and the vertical direction.

4. The video display device of claim 1, wherein
among the passing regions, a pixel proportion passed by a first passing region and a pixel proportion passed by a second passing region are substantially identical.

5. The video display device of claim 1, wherein
among the passing regions, a position of a pixel region passed by a first passing region and a position of a pixel region passed by a second passing region are substantially identical.

6. The video display device of claim 1, wherein
the passing regions have a first slant with respect to a vertical direction,
a total pixel area passed by each of the passing regions is substantially equal to a total pixel area passed by a reference passing region made up of elongated shapes having a second slant, and
the first slant is an angle such that less cross-talk is produced by the first slant than by the second slant, and such that greater Moiré pattern intensity is produced by the first slant than by the second slant.

7. The video display device of claim 6, wherein
the first slant is an angle minimising cross-talk, and
the second slant is an angle minimising Moiré pattern intensity.

8. The video display device of claim 1, wherein
for each of the passing regions, height and width dimensions of the wave units are determined using frequency characteristics of a Moiré pattern obtained for a reference passing region made up of elongated shapes having a predetermined angle with respect to the vertical direction of the parallax barrier that minimises the Moiré pattern intensity.

9. The video display device of claim 1, wherein
each wave unit of the waveform is a notch structure formed as a triangle,
a wave unit width is a length of a bottom edge of the triangle forming the notch structure, or is a vertical length of the notch structure, and
a wave unit height is a height of the triangle forming the notch structure, or is a horizontal length of the notch structure.

10. The video display device of claim 1, wherein
two or more of the passing regions have a waveform formed thereon that includes the two wave units differing in terms of wave width, and
the two or more passing regions are arranged at a predetermined separation.

11. The video display device of claim 1, wherein
two or more of the passing regions have a waveform formed thereon that includes the two or more wave units differing in terms of wave width, and
the two or more passing regions are arranged in a region of the parallax barrier corresponding to a partial region for displaying the multiple-parallax video, which is part of a display region of the video display device.

12. The video display device of claim 1, wherein the video display device stores n barrier parameters that define n variations of wave units and executes the following processes (1) and (2):
(1) executing process (1-1), (1-2), and (1-3) for each of the n barrier parameters;
(1-1) select one barrier parameter (i) and estimate a moiré pattern for the barrier pattern (i),
(1-2) perform a frequency analysis for the moiré pattern for the barrier pattern (i), and
(1-3) calculate an evaluation value of the moiré pattern for the barrier pattern (i) by comparing a result of the frequency analysis to a first reference data of a moiré pattern that has good parallax separation, low cross-talk, and a first slant angle, and to a second reference data of a moiré pattern with a thin moiré effect and a second slant angle,
(2) acquiring evaluation values for each of the n barrier parameters, specifying a barrier parameter that corresponds to a lowest one of the evaluation values, and performing barrier adjustment of the parallax barrier according to the barrier parameter specified.

13. The video display device of claim 12, wherein
the first slant angle is 18.435° from the vertical direction and the second slant angle is 23° from the vertical direction.

14. The video display device of claim 12, wherein
the frequency analysis includes:
calculating a difference dPF1 between an average power spectrum in a predefined frequency of the moiré pattern estimated for the barrier pattern (i) and an average power spectrum in a predefined frequency of the first reference data; and
calculating a difference dPF2 between an average power spectrum in a predefined frequency of the moiré pattern estimated for the barrier pattern (i) and an average power spectrum in a predefined frequency of the second reference data, and
each of the evaluation values Eval is calculated by applying dPF1, dPF2 to Eval=(dPFMax1−dPF1)×(1.0−w)+w×dPF2 where dPFMax1 is a maximum value of dPF1 and w is a weighting factor from 0 to 1.

* * * * *